(12) United States Patent
Bao et al.

(10) Patent No.: US 12,671,519 B2
(45) Date of Patent: Jun. 30, 2026

(54) DATA PROCESSING METHOD, APPARATUS, AND SYSTEM FOR ADJUSTING A DATA TRANSMISSION RATE

(71) Applicant: Shenzhen Yinwang Intelligent Technologies Co., Ltd., Shenzhen (CN)

(72) Inventors: Pengxin Bao, Chengdu (CN); Xuehuan Wang, Chengdu (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 294 days.

(21) Appl. No.: 18/339,581

(22) Filed: Jun. 22, 2023

(65) Prior Publication Data

US 2023/0344548 A1      Oct. 26, 2023

Related U.S. Application Data

(63) Continuation of application No. PCT/CN2020/139663, filed on Dec. 25, 2020.

(51) Int. Cl.
H04L 1/00          (2006.01)
H04L 1/20          (2006.01)
(52) U.S. Cl.
CPC ............ H04L 1/0002 (2013.01); H04L 1/203 (2013.01)
(58) Field of Classification Search
CPC ............................. H04L 1/0002; H04L 1/203
See application file for complete search history.

(56) References Cited

U.S. PATENT DOCUMENTS

| | | | |
|---|---|---|---|
| 10,340,984 B2 * | 7/2019 | Tomasi | H04B 5/77 |
| 2010/0029320 A1 * | 2/2010 | Malladi | H04L 27/2614 |
| | | | 375/261 |
| 2011/0193961 A1 | 8/2011 | Peterson | |
| 2017/0093521 A1 | 3/2017 | Wang et al. | |
| 2018/0249204 A1 | 8/2018 | Yang et al. | |
| 2019/0123849 A1 * | 4/2019 | Baldemair | H04L 1/0009 |
| 2019/0288783 A1 | 9/2019 | Zhong | |
| 2019/0363826 A1 * | 11/2019 | Qiao | H04L 1/0057 |
| 2019/0363869 A1 | 11/2019 | Li et al. | |
| 2021/0099912 A1 | 4/2021 | Zhang et al. | |

FOREIGN PATENT DOCUMENTS

| | | |
|---|---|---|
| CN | 1655547 A | 8/2005 |
| CN | 102237971 A | 11/2011 |
| CN | 105306888 A | 2/2016 |
| CN | 108242969 A | 7/2018 |
| CN | 110572780 A | 12/2019 |
| CN | 110859012 A | 3/2020 |
| CN | 111050024 A | 4/2020 |
| CN | 111954016 A | 11/2020 |

* cited by examiner

*Primary Examiner* — Chandrahas B Patel
(74) *Attorney, Agent, or Firm* — Conley Rose, P.C.

(57)          ABSTRACT

A data processing method includes obtaining a target value and/or an adjustment value of a data transmission rate by a first chip; determining a data adjustment manner and/or configuring a parameter of a sensor based on the target value and/or the adjustment value by the first chip.

20 Claims, 30 Drawing Sheets

Camera                                                                    MDC

DATA PROCESSING METHOD, APPARATUS, AND SYSTEM FOR ADJUSTING A DATA TRANSMISSION RATE

CROSS-REFERENCE TO RELATED APPLICATIONS

This application is a continuation application of International Patent Application No. PCT/CN2020/139663, filed on Dec. 25, 2020, the disclosure of which is hereby incorporated by reference in its entirety.

TECHNICAL FIELD

This application relates to the field of communication technologies, and in particular, to a data processing method, apparatus, and system.

BACKGROUND

With a development trend of electric and intelligent vehicles, a camera and an electronic control unit (ECU) have gradually become common configurations of the vehicles. The camera may be connected to the ECU in a wired manner. An image sensor and a serializer may be integrated into the camera, and a deserializer and a processing chip may be integrated into the ECU. The image sensor sends data to the serializer, the serializer sends the received data to the deserializer, the deserializer sends the received data to the processing chip, and the processing chip processes and analyzes the data. The serializer may be connected to the deserializer through a cable and a connector, and electromagnetic interference is coupled to the cable and the connector, affecting data transmission quality.

A shield layer is added to the cable and the connector to reduce electromagnetic interference. However, the shield layer increases costs of the cable and the connector, and affects flexibility of cable deployment. In addition, a shield capability of the cable decreases as the shield layer ages. Under impact of the electromagnetic interference, data transmission stability is reduced, affecting driving safety. Therefore, how to improve data transmission stability and reliability in a transmission system becomes an urgent problem to be resolved.

SUMMARY

Embodiments of this application provide a data processing method, apparatus, and system, so that a transmission rate of a transmission link can be adjusted based on a channel condition of the transmission link, to improve data transmission stability.

According to a first aspect, an embodiment of this application provides a data processing method. The method includes a first chip that obtains a target value and/or an adjustment value of a data transmission rate; and the first chip determines a data adjustment manner based on the target value and/or the adjustment value, and/or the first chip configures a parameter of a sensor based on the target value and/or the adjustment value, where the data comes from the sensor. In this way, the sensor outputs the data based on the configured parameter, and/or the output data is adjusted based on the data adjustment manner. This can ensure that the data can still be normally transmitted when a transmission system is interfered, to improve data transmission stability and reliability.

In a possible implementation, the data adjustment manner includes adjusting a frame rate or adjusting a quantity of rows in a frame.

In a possible implementation, the parameter of the sensor includes one or more of a frame rate, a resolution, or a pixel quantization depth.

In a possible implementation, that a first chip obtains a target value and/or an adjustment value of a data transmission rate includes that a first condition is met, the first chip obtains the target value and/or the adjustment value, where the first condition includes one or more of the following: a signal noise ratio is less than a first value, a bit error rate is greater than a second value, or a packet error rate is greater than a third value.

In a possible implementation, that a first chip obtains a target value and/or an adjustment value of a data transmission rate includes the first chip that determines the target value and/or the adjustment value.

In a possible implementation, that a first chip obtains a target value and/or an adjustment value of a data transmission rate includes the first chip that receives the target value and/or the adjustment value from a second chip.

In a possible implementation, the method further includes the first chip that indicates the data adjustment manner to the second chip.

According to a second aspect, an embodiment of this application provides a data processing method. The method includes a second chip that obtains a target value and/or an adjustment value of a data transmission rate; and the second chip determines a data adjustment manner based on the target value and/or the adjustment value, and/or the second chip configures a parameter of a sensor based on the target value and/or the adjustment value, where the data comes from the sensor. In this way, the data is processed based on the data adjustment manner determined and/or the parameter of the sensor configured based on the target value and/or the adjustment value. This can ensure that the data can still be normally transmitted when a transmission system is interfered, to improve data transmission stability and reliability.

In a possible implementation, the data adjustment manner includes adjusting a frame rate or adjusting a quantity of rows in a frame.

In a possible implementation, the parameter of the sensor includes one or more of a frame rate, a resolution, or a pixel quantization depth.

In a possible implementation, that a second chip obtains a target value and/or an adjustment value of a data transmission rate includes, when a first condition is met, the second chip obtains the target value and/or the adjustment value, where the first condition includes one or more of the following, such as a signal noise ratio is less than a first value, a bit error ratio is greater than a second value, or a packet error ratio is greater than a third value.

In a possible implementation, that a second chip obtains a target value and/or an adjustment value of a data transmission rate includes the second chip that determines the target value and/or the adjustment value.

In a possible implementation, that a second chip obtains a target value and/or an adjustment value of a data transmission rate includes the second chip that receives the target value and/or the adjustment value from a first chip.

In a possible implementation, the method further includes the second chip that indicates the data adjustment manner to the first chip.

In a possible implementation, the method further includes the second chip that stores the data adjustment manner in a second register.

According to a third aspect, an embodiment of this application provides a data processing method. The method includes a first chip that obtains a target value and/or an adjustment value of a data transmission rate; and a second chip determines a data adjustment manner based on the target value and/or the adjustment value, and/or the second chip configures a parameter of a sensor based on the target value and/or the adjustment value, where the data comes from the sensor. In this way, the sensor outputs the data based on the configured parameter, and/or the output data is adjusted based on the data adjustment manner. This can ensure that the data can still be normally transmitted when a transmission system is interfered, to improve data transmission stability and reliability.

In a possible implementation, the data adjustment manner includes adjusting a frame rate or adjusting a quantity of rows in a frame.

In a possible implementation, the parameter of the sensor includes one or more of a frame rate, a resolution, or a pixel quantization depth.

In a possible implementation, that a first chip obtains a target value and/or an adjustment value of a data transmission rate includes, when a first condition is met, the first chip obtains the target value and/or the adjustment value, where the first condition includes one or more of the following: a signal noise ratio is less than a first value, a bit error ratio is greater than a second value, or a packet error ratio is greater than a third value.

In a possible implementation, that a first chip obtains a target value and/or an adjustment value of a data transmission rate includes the first chip determines the target value and/or the adjustment value.

In a possible implementation, that a first chip obtains a target value and/or an adjustment value of a data transmission rate includes the first chip receives the target value and/or the adjustment value from the second chip.

According to a fourth aspect, an embodiment of this application provides a data processing method. The method includes: A second chip obtains a target value and/or an adjustment value of a data transmission rate; and a first chip determines a data adjustment manner based on the target value and/or the adjustment value, and/or the first chip configures a parameter of a sensor based on the target value and/or the adjustment value, where the data comes from the sensor. In this way, the data is processed based on the data adjustment manner determined and/or the parameter of the sensor configured based on the target value and/or the adjustment value. This can ensure that the data can still be normally transmitted when a transmission system is interfered, to improve data transmission stability and reliability.

In a possible implementation, the data adjustment manner includes: adjusting a frame rate or adjusting a quantity of rows in a frame.

In a possible implementation, the parameter of the sensor includes one or more of a frame rate, a resolution, or a pixel quantization depth.

In a possible implementation, that a second chip obtains a target value and/or an adjustment value of a data transmission rate includes, when a first condition is met, the second chip obtains the target value and/or the adjustment value, where the first condition includes one or more of the following such as a signal noise ratio is less than a first value, a bit error ratio is greater than a second value, or a packet error ratio is greater than a third value.

In a possible implementation, that a second chip obtains a target value and/or an adjustment value of a data transmission rate includes the second chip determines the target value and/or the adjustment value.

In a possible implementation, that a second chip obtains a target value and/or an adjustment value of a data transmission rate includes the second chip receives the target value and/or the adjustment value from the first chip.

According to a fifth aspect, an embodiment of this application provides a data processing apparatus. The data processing apparatus may include a first processing unit and a first communication unit. The first communication unit is configured to obtain a target value and/or an adjustment value of a data transmission rate. The first processing unit is configured to determine a data adjustment manner based on the target value and/or the adjustment value; and/or the first processing unit is configured to configure a parameter of a sensor based on the target value and/or the adjustment value, where the data comes from the sensor. In this way, the sensor outputs the data based on the configured parameter, and/or the output data is adjusted based on the data adjustment manner. This can ensure that the data can still be normally transmitted when a transmission system is interfered, to improve data transmission stability and reliability.

In a possible implementation, the data adjustment manner includes adjusting a frame rate or adjusting a quantity of rows in a frame.

In a possible implementation, the parameter of the sensor includes one or more of a frame rate, a resolution, or a pixel quantization depth.

In a possible implementation, the first communication unit is configured to, when a first condition is met, obtain the target value and/or the adjustment value, where the first condition includes one or more of the following such as a signal noise ratio is less than a first value, a bit error ratio is greater than a second value, or a packet error ratio is greater than a third value.

In a possible implementation, the first communication unit is configured to receive the target value and/or the adjustment value from a second communication unit.

In a possible implementation, the first processing unit is configured to indicate the data adjustment manner to a second processing unit.

In a possible implementation, the first processing unit is configured to determine the target value and/or the adjustment value.

In a possible implementation, the data processing apparatus may further include a storage unit, and the storage unit may be a memory. The storage unit is configured to store instructions, and the first processing unit executes the instructions stored in the storage unit, to implement the data processing method according to any one of the first aspect or the possible implementations of the first aspect.

According to a sixth aspect, an embodiment of this application provides a data processing apparatus. The data processing apparatus may include a second communication unit and a second processing unit. The second communication unit is configured to obtain a target value and/or an adjustment value of a data transmission rate. The second processing unit is configured to determine a data adjustment manner based on the target value and/or the adjustment value; and/or the second processing unit is configured to configure a parameter of a sensor based on the target value and/or the adjustment value, where the data comes from the sensor. In this way, the data is processed based on the data adjustment manner determined and/or the parameter of the sensor configured based on the target value and/or the adjustment value. This can ensure that the data can still be normally transmitted when a transmission system is interfered, to improve data transmission stability and reliability.

In a possible implementation, the data adjustment manner includes adjusting a frame rate or adjusting a quantity of rows in a frame.

In a possible implementation, the parameter of the sensor includes one or more of a frame rate, a resolution, or a pixel quantization depth.

In a possible implementation, the second communication unit is configured to, when a first condition is met, obtain the target value and/or the adjustment value, where the first condition includes one or more of the following such as a signal noise ratio is less than a first value, a bit error ratio is greater than a second value, or a packet error ratio is greater than a third value.

In a possible implementation, the second communication unit is configured to receive the target value and/or the adjustment value from a first communication unit.

In a possible implementation, the second processing unit is configured to determine the target value and/or the adjustment value.

In a possible implementation, the second processing unit is configured to indicate the data adjustment manner to a first processing unit.

In a possible implementation, the second processing unit is configured to store the data adjustment manner in a second register.

In a possible implementation, the data processing apparatus may further include a storage unit, and the storage unit may be a memory. The storage unit is configured to store instructions, and the second processing unit executes the instructions stored in the storage unit, to implement the data processing method according to any one of the second aspect or the possible implementations of the second aspect.

According to a seventh aspect, an embodiment of this application provides a computer-readable storage medium. The computer-readable storage medium stores a computer program or instructions. When the computer program or the instructions is/are run on a computer, the computer is enabled to perform the data processing method according to any one of the implementations of the first aspect to the fourth aspect.

According to an eighth aspect, an embodiment of this application provides a computer program product including instructions. When the instructions are run on a computer, the computer is enabled to perform the data processing method according to any one of the implementations of the first aspect to the fourth aspect.

According to a ninth aspect, an embodiment of this application provides a data processing apparatus. The apparatus includes a processor and a storage medium, where the storage medium stores instructions. When the instructions are run by the processor, the data processing method according to any one of the implementations of the first aspect and the fourth aspect is implemented.

According to a tenth aspect, an embodiment of this application provides a data processing system. The data processing system is configured to perform the data processing method according to the third aspect and the possible implementations of the third aspect, or is configured to perform the data processing method according to the fourth aspect and the possible implementations of the fourth aspect.

According to an eleventh aspect, an embodiment of this application provides a data processing system. The system includes any one or more of the following such as the data processing apparatus according to the fifth aspect and the possible implementations of the fifth aspect, or the data processing apparatus according to the sixth aspect and the possible implementations of the sixth aspect.

According to a twelfth aspect, this application provides a chip or a chip system. The chip or the chip system includes at least one processor and a communication interface. The communication interface is coupled to the at least one processor. The at least one processor is configured to run a computer program or instructions, to perform the data processing method according to any one of the implementations of the first aspect to the fourth aspect. The communication interface in the chip may be one or more of an input/output interface, a pin, or a circuit.

In a possible implementation, the chip or the chip system described in this application further includes at least one memory, and the at least one memory stores instructions. The memory may be a storage unit inside the chip, for example, a register or a cache, or may be a storage unit (for example, a read-only memory (ROM) or a random-access memory (RAM)) of the chip.

According to a thirteenth aspect, this application provides a data processing apparatus, including a processor and a communication interface. The communication interface is configured to perform message receiving and sending operations. The processor runs instructions to perform the data processing method according to any one of the implementations of the first aspect to the fourth aspect.

DESCRIPTION OF EMBODIMENTS

To clearly describe technical solutions in embodiments of this application, terms such as "first" and "second" are used in embodiments of this application to distinguish between same items or similar items that provide basically same functions or purposes. For example, a first chip and a second chip are merely used to distinguish between different chips, and a sequence of the first chip and the second chip is not limited. A person skilled in the art may understand that the terms such as "first" and "second" do not limit a quantity or an execution sequence, and the terms such as "first" and "second" do not indicate a definite difference.

It should be noted that, in embodiments of this application, the word "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word "example", "for example", or the like is intended to present a related concept in a specific manner.

In embodiments of this application, "at least one" means one or more, and "a plurality of" means two or more. "And/or" describes an association relationship between associated objects, and indicates that three relationships may exist. For example, A and/or B may represent the following cases such as only A exists, both A and B exist, and only B exists, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one item (piece) of a, b, or c may indicate a, b, c, a and b, a and c, b and c, or a, b, and c, where a, b, and c may be singular or plural.

The method in embodiments of this application may be applied to a vehicle-mounted scenario, may be applied to a video conference scenario, or may be applied to a live broadcast scenario. This is not limited in embodiments of this application. The following provides descriptions by using the vehicle-mounted application scenario as an example.

As a vehicle evolves towards electrification and intelligence, a camera and an ECU become common configurations of an intelligent vehicle. For example, the camera may be connected to a multi-domain electronic controller (MDC) in a wired manner or a wireless manner. A method for connecting the camera to the MDC is not limited in this application.

Figure 1:
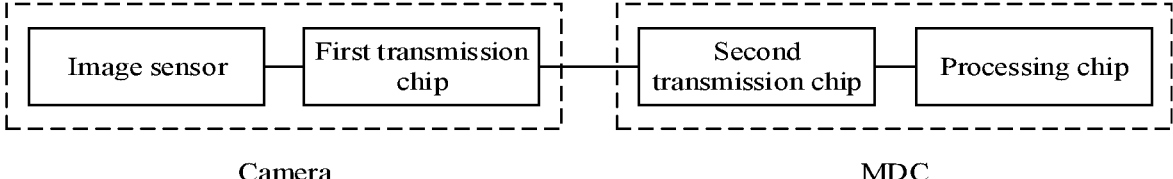
FIG. 1 is a schematic diagram of a wired connection between a camera and a multi-domain controller (MDC) according to an embodiment of this application.

For example, FIG. 1 is a schematic diagram of a wired connection between the camera and the MDC according to an embodiment of this application. As shown in FIG. 1, an image sensor and a first transmission chip may be integrated into the camera, and a second transmission chip and a processing chip may be integrated into the MDC. It should be noted that another chip or component may alternatively be integrated into the camera or the MDC. The chip shown in FIG. 1 is an example. This is not limited in this embodiment of this application.

The image sensor and the first transmission chip may communicate with each other through a Mobile Industry Processor Interface (MIPI) or a parallel port. The second transmission chip and the processing chip may communicate with each other through an interface such as an MIPI interface or a parallel port. The first transmission chip may be connected to the second transmission chip through a cable and a connector.

For example, image data of the image sensor is transmitted to the first transmission chip through the MIPI interface, the first transmission chip receives the data from the MIPI interface, the first transmission chip transmits the received data to the second transmission chip through the cable, and the second transmission chip transmits the received data to the processing chip through the MIPI interface. The processing chip processes and analyzes the data, and may make a decision on a vehicle control method based on an analysis result.

For example, the camera and the MDC are applied to an autonomous vehicle. An electromagnetic environment inside the autonomous vehicle is complex, and there may also be unpredictable electromagnetic interference outside the autonomous vehicle. The electromagnetic interference is coupled to the cable and the connector that connect the first transmission chip to the second transmission chip. Consequently, a transmission link is affected, and the transmission link cannot operate normally. For example, the electromagnetic interference causes a loss of data transmitted in the transmission link. In a vehicle equipped with an advanced driving assistance system (ADAS), a data loss poses a threat to driving safety.

In a possible implementation for suppressing the electromagnetic interference, a shield layer is added to the transmission cable and the connector. The shield layer can attenuate impact of the electromagnetic interference on the cable, to suppress the electromagnetic interference.

However, the shield layer can resist limited electromagnetic interference. A shield capability of the cable is fixed after the cable is produced. Once burst interference exceeds the shield capability of the cable, the shield layer of the cable cannot resist the electromagnetic interference. In addition, the shield capability of the cable decreases as the shield layer ages. If the shield layer is too thick, cable costs are increased and flexibility of cable deployment is affected.

In another possible implementation for suppressing the electromagnetic interference, the electromagnetic interference is suppressed by using a solution combining an error correction code and interleaving. The error correction code is a type of channel encoding. A principle of the error correction code is that a transmit end adds redundant information to transmitted data based on a specific rule, where the redundant information has a correlation relationship with the transmitted data; and a receive end decodes the transmitted data based on a corresponding rule, and the receive end may correct data that is incorrectly transmitted. The interleaving means that encoded transmitted data is disrupted based on a specific rule. The Interleaving may randomize data that is incorrectly transmitted, to resist interference within longer duration.

However, the error correction code and the interleaving are designed to resist interference within specific duration. Once the solution combining the error correction code and the interleaving is determined, duration for resisting interference is determined, and a capability of the cable to resist electromagnetic interference is determined. Once duration of the electromagnetic interference exceeds maximum resistance duration of the cable, the solution combining the error correction code and the interleaving cannot resist impact of the electromagnetic interference. Consequently, the transmission link cannot operate normally.

Based on this, an embodiment of this application provides a data processing method. When a target value and/or an adjustment value of a data transmission rate are/is obtained, based on the target value and/or the adjustment value, a data adjustment manner is determined, and/or a type and a value of a parameter of a sensor are determined. This method can ensure that data can still be normally transmitted when a transmission system is interfered, to improve data transmission stability and reliability.

Figure 2:
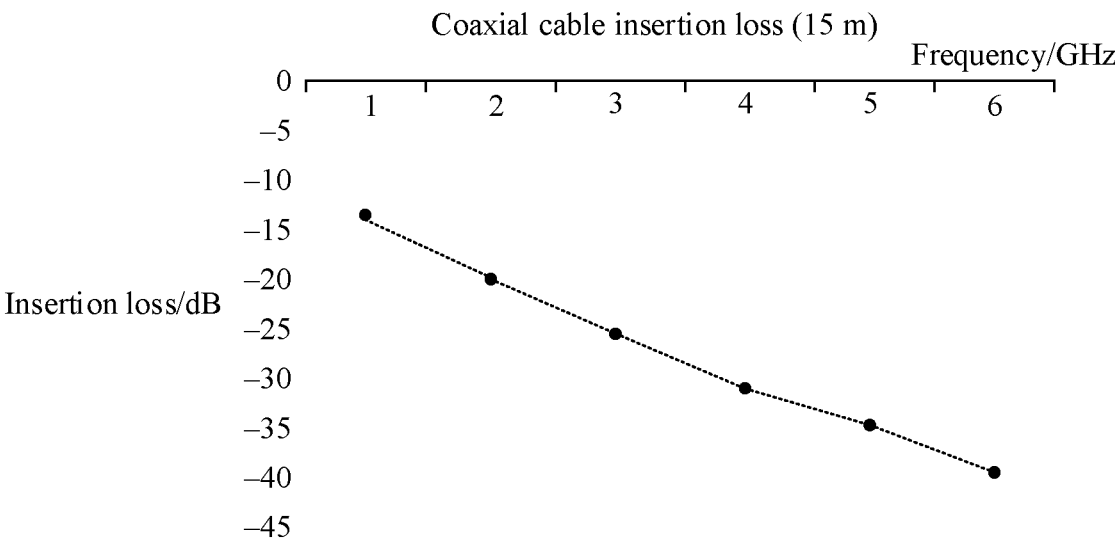
FIG. 2 is a schematic diagram of a cable insertion loss and a wired transmission frequency according to an embodiment of this application.

A higher rate indicates a higher occupied bandwidth, and requires a higher cut-off frequency of the cable. A higher cut-off frequency indicates a larger cable insertion loss. Therefore, a higher rate is more likely to be affected by electromagnetic interference. On the contrary, a lower rate is less likely to be affected by the electromagnetic interference. For example, FIG. 2 is a schematic diagram of a cable insertion loss and a wired transmission frequency according to an embodiment of this application. As shown in FIG. 2, a higher cable frequency indicates a larger cable insertion loss.

The following describes terms and some steps in this embodiment of this application. It should be noted that execution bodies of these steps may be different in different embodiments. To avoid repetition, the execution bodies are not limited herein when these steps are described. In subsequent embodiments involving interaction between a plurality of execution bodies, any execution body uses a similar technical means when performing these steps. For specific implementations of these steps, details are not described in subsequent embodiments.

A first chip described in this embodiment of this application may be a first transmission chip. A second chip described in this embodiment of this application may be a second transmission chip and/or a processing chip. For example, the first transmission chip receives data from an image sensor, the first transmission chip sends the data to the second transmission chip, the second transmission chip sends the received data to the processing chip, and the processing chip processes the data and makes a decision based on a processing result.

A possible implementation for obtaining one or more of a signal-to-noise ratio (SNR), a bit error rate (BER), or a packet error rate (PER) of a current link described in this embodiment of this application includes a chip or device configured to perform the step obtains one or more of the SNR, the BER, or the PER through calculation based on related data.

Another possible implementation for obtaining one or more of an SNR, a BER, or a PER of a current link described in this embodiment of this application includes a chip or device configured to perform the step receives one or more of the SNR, the BER, or the PER from another chip or device, or reads one or more of the SNR, the BER, or the PER from a register of each of another device and chip.

The target value of the data transmission rate described in this embodiment of this application may be a specific rate value. For example, the target value may be 1 gigabits per second (Gbps). It may be understood that a specific value of the target value may be set based on an actual application scenario. This is not limited in this embodiment of this application.

The adjustment value of the data transmission rate described in this embodiment of this application may be a specific step value. When the data transmission rate is adjusted, the step value may be increased or decreased based on the current data transmission rate. For example, an initial rate is 3 Gbps, and the adjustment value is −1 Gbps. When the data transmission rate is adjusted, the initial rate may be decreased by 1 Gbps, and an adjusted data transmission rate is 2 Gbps. It may be understood that a specific value of the adjustment value may be set based on an actual application scenario. This is not limited in this embodiment of this application.

In this embodiment of this application, if the target value and the adjustment value of the data transmission rate are simultaneously determined, when the data transmission rate is adjusted, the target value may be obtained based on the current data transmission rate and the adjustment value. For example, if an initial rate is 5 Gbps, the target value is 3 Gbps, and the adjustment value is −2 Gbps, the target value of 3 Gbps may be obtained by decreasing the initial rate by 2 Gbps. It may be understood that the specific value of the target value and the specific value of the adjustment value may be set based on an actual application scenario. This is not limited in this embodiment of this application.

A possible implementation for obtaining the target value and/or the adjustment value of the data transmission rate described in this embodiment of this application includes, when a first condition is met, the chip or device configured to perform the step obtains the target value and/or the adjustment value of the data transmission rate through calculation based on a related parameter. For example, the related parameter may include one or more of the SNR, the BER, or the PER. This is not limited in this application.

In this embodiment of this application, the first condition may include one or more of the following such as the SNR is less than a first value, the BER is greater than a second value, or the PER is greater than a third value. In a possible implementation, the first condition may further include the following such as an eye height in an eye pattern parameter is less than a fourth value. A specific value of the first value, a specific value of the second value, a specific value of the third value, and a specific value of the fourth value may be set based on an actual application scenario. This is not limited in this embodiment of this application. It may be understood that specific content of the first condition may be set based on an actual application scenario. This is not limited in this embodiment of this application.

For example, if the SNR is 20 decibels (dB), and the first value is 25 dB, the SNR is less than the first value. This belongs to the foregoing described case in which the first condition is met. Further, the chip or device configured to perform the step may obtain the target value and/or the adjustment value of the data transmission rate through calculation based on the SNR.

As an example of the specific implementation, the target value and/or the adjustment value may be obtained through calculation based on a ratio of the SNR to the data transmission rate. For example, when the SNR is 30 dB, the data transmission rate is 6 Gbps. When the SNR is 20 dB, the data transmission rate is 4 Gbps. In this case, the target value of the data transmission rate is 5 Gbps, and the adjustment value is 5 Gbps. It may be understood that the chip or device configured to perform the step may obtain the target value and/or the adjustment value based on another correspondence between the SNR and the data transmission rate, or may obtain the target value and/or the adjustment value based on a correspondence between another parameter and the data transmission rate. This is not limited in this embodiment of this application.

Another possible implementation for obtaining the target value and/or the adjustment value of the data transmission rate described in this embodiment of this application includes, when a first condition is met, the chip or device configured to perform the step may receive the target value and/or the adjustment value of the data transmission rate from another chip or device. A manner in which the another chip or device obtains the target value and/or the adjustment value of the data transmission rate through calculation based on a related parameter may be similar to the foregoing manner in which the target value and/or the adjustment value of the data transmission rate are/is calculated. Details are not described herein again. For example, the related parameter may include one or more of the SNR, the BER, or the PER, or may be another parameter. This is not limited in this application.

The data adjustment manner described in this embodiment of this application may include adjusting a frame rate or adjusting a quantity of rows in a frame. For example, adjusting the frame rate may mean that a frame rate of an image is reduced, and adjusting the quantity of rows in the frame may mean that some rows in an image frame are discarded.

In this embodiment of this application, an initial frame rate of the image is determined, and therefore the data adjustment manner of the image is also determined. For example, Table 1 shows a relationship between an initial frame rate and a frame rate reduction coefficient, and a reduced frame rate is a product of the initial frame rate and the frame rate reduction coefficient. For example, if the initial frame rate is 60 frames/second, and the frame rate reduction coefficient is 4/5, a reduced frame rate is 48 frames/second. If the initial frame rate is 40 frames/second, and the frame rate reduction coefficient is 1/2, a reduced frame rate is 20 frames/second. It may be understood that a specific value of the initial frame rate and a specific value of the frame rate reduction coefficient may be set based on an actual application scenario. This is not limited in this embodiment of this application.

TABLE 1

| Initial frame rate (unit: frame/second) | Frame rate reduction coefficient |
|---|---|
| 60 | $4/5$, $3/4$, $2/3$, $1/2$, $1/3$, $1/4$, $1/5$, . . . |
| 50 | $2/3$, $1/2$, $1/3$, $1/5$, . . . |
| 40 | $3/4$, $1/2$, $1/4$, . . . |
| 30 | $4/5$, $2/3$, $1/2$, $1/3$, $1/5$, . . . |
| 25 | $4/5$, $3/5$, $1/5$, . . . |

In this embodiment of this application, discarded rows in the image frame may be discarded based on a ratio of the target value to the initial rate. The discarded rows may be consecutive rows, or the discarded rows may be inconsecutive rows. A specific implementation of the discarded rows in the image frame may be set based on an actual application scenario. This is not limited in this embodiment of this application.

For example, the initial rate is 6 Gbps, and the target value is 3 Gbps. When one image frame includes 1080 rows in total, a total quantity of discarded rows needs to be 540.

A possible implementation for determining the data adjustment manner described in this embodiment of this application includes the chip or device is configured to perform the step may determine the data adjustment manner based on a related parameter. The related parameter may be the target value and/or the adjustment value described above.

For example, the chip or device configured to perform the step may determine the data adjustment manner based on a frame rate corresponding to the target value and/or the adjustment value. For example, the initial rate is 6 Gbps, and the target value is 3 Gbps. When an initial frame rate corresponding to the initial rate is 50 frames/second, a frame rate corresponding to the target value is 25 frames/second. It may be understood that a correspondence between the target value and the initial frame rate may be set based on an actual application scenario. This is not limited in this embodiment of this application.

Another possible implementation for determining the data adjustment manner described in this embodiment of this application includes the chip or device configured to perform the step may receive the data adjustment manner from another chip or device. A manner in which the another chip or device determines the data adjustment manner based on a related parameter may be similar to the foregoing manner in which the data adjustment manner is determined. Details are not described herein again. For example, the related parameter may be the target value and/or the adjustment value described above, or may be another parameter. This is not limited in this embodiment of this application.

The parameter of the sensor described in this embodiment of this application may be one or more of a frame rate, a resolution, or a pixel quantization depth. The parameter of the sensor may be used to adjust an output format of data of the sensor. There is an association relationship between the output format of the data of the sensor and the data transmission rate. For example, a lower frame rate, a lower resolution, or a lower pixel quantization depth of the data of the sensor indicates a lower data transmission rate corresponding to the data of the sensor.

A possible implementation for determining the type and the value of the parameter of the sensor described in this embodiment of this application is as follows. The chip or device is configured to perform the step may determine the type and the value of the parameter of the sensor based on the data of the sensor.

For example, the chip or device configured to perform the step may determine the type and the value of the parameter of the sensor based on the target value and/or the adjustment value. For example, a rate of 6 Gbps during data transmission is decreased to the target value (for example, 3 Gbps), and a frame rate of the sensor may be decreased from 50 frames/second to 25 frames/second.

The following uses specific embodiments to describe in detail the technical solutions of embodiments of this application and how to resolve the technical problems by using the technical solutions of embodiments of this application. The following several specific embodiments may be implemented independently or combined with each other, and same or similar concepts or processes may not be repeatedly described in some embodiments.

Figure 3:
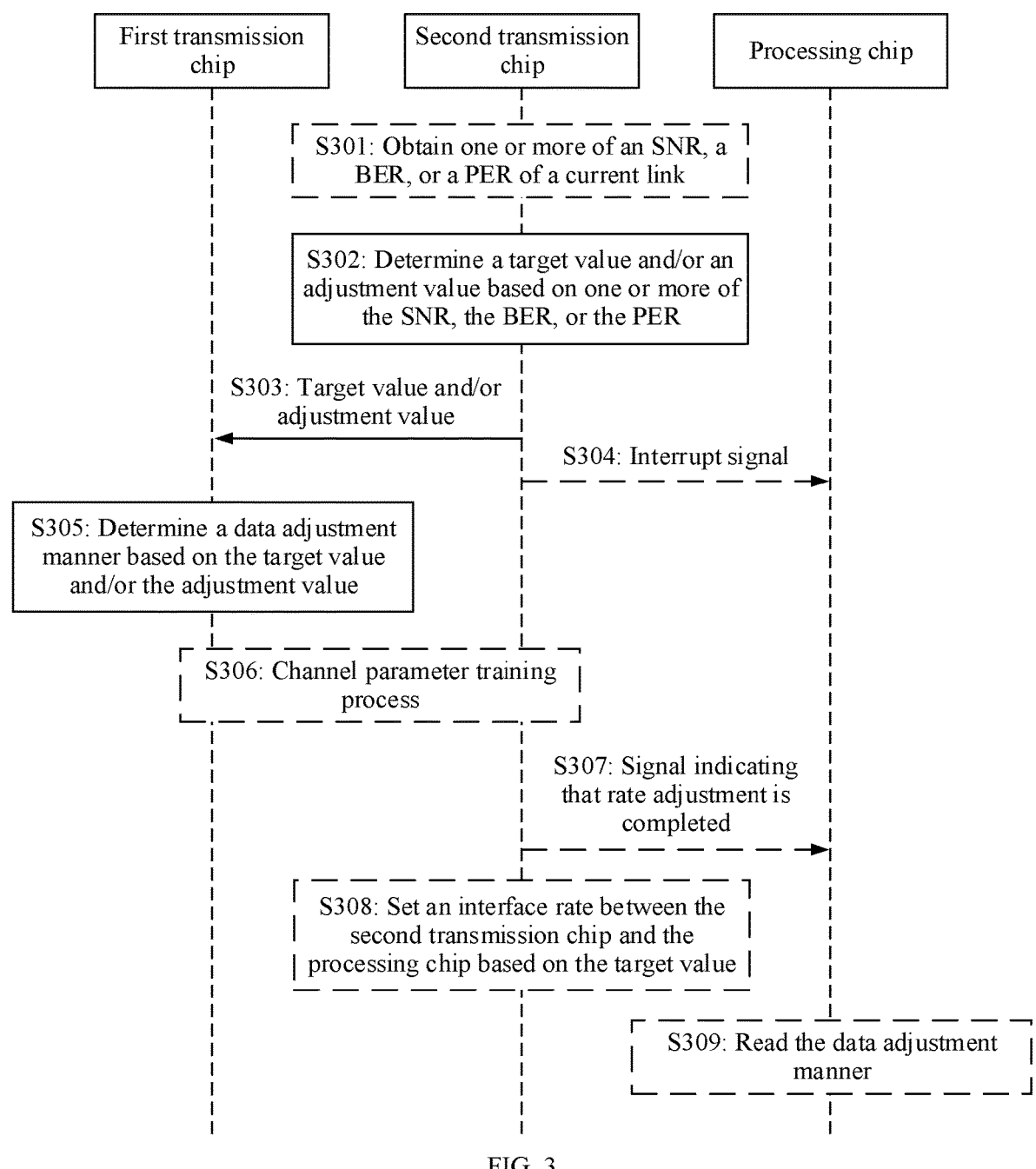
FIG. 3 is a schematic flowchart of a data processing method according to an embodiment of this application.

For example, FIG. 3 is a schematic flowchart of a data processing method according to an embodiment of this application. In the embodiment corresponding to FIG. 3, a second transmission chip may obtain a target value and/or an adjustment value of a data transmission rate through calculation, and the second transmission chip sends the target value and/or the adjustment value to a first transmission chip. Further, the first transmission chip determines a data adjustment manner based on the target value and/or the adjustment value. For a specific implementation in which the first transmission chip determines the data adjustment manner, refer to the descriptions of the foregoing steps. Details are not described herein again.

As shown in FIG. 3, the method may include the following steps.

S301: The second transmission chip obtains one or more of an SNR, a BER, or a PER of a current link.

S302: The second transmission chip determines the target value and/or the adjustment value of the data transmission rate based on one or more of the obtained SNR, BER, or PER.

In this embodiment of this application, when a first condition is met, the second transmission chip may determine the target value and/or the adjustment value based on one or more of the obtained SNR, BER, or PER. For a manner in which the second transmission chip determines the target value and/or the adjustment value, refer to the descriptions of the foregoing steps. Details are not described herein again.

S303: The second transmission chip sends the target value and/or the adjustment value to the first transmission chip.

In this embodiment of this application, when the second transmission chip sends the target value and/or the adjustment value to the first transmission chip, the target value and/or the adjustment value may be carried at a physical layer, or may be carried at a media access control media access control (MAC) layer or above the MAC layer.

S304: The second transmission chip sends an interrupt signal to a processing chip.

For example, the second transmission chip may send the interrupt signal to the processing chip through a general-purpose input/output (GPIO) interface.

S305: The first transmission chip determines the data adjustment manner based on the target value and/or the adjustment value.

S306: The first transmission chip and the second transmission chip train a channel parameter.

In this embodiment of this application, the first transmission chip sends a training sequence (for example, a pseudo-random sequence) to the second transmission chip, the second transmission chip calculates the channel parameter based on the training sequence, the second transmission chip sends the channel parameter to the first transmission chip, and the first transmission chip may configure a sending parameter and a receiving parameter based on the channel parameter. A specific implementation in which the second transmission chip calculates the channel parameter may be set based on an actual application scenario. This is not limited in this embodiment of this application.

In this embodiment of this application, the first transmission chip may send the data adjustment manner to the second transmission chip by using the training sequence, and the second transmission chip may store the data adjustment manner in a second register. In this case, the processing chip may subsequently read the data adjustment manner from the second register.

S307: The second transmission chip sends, to the processing chip, a signal indicating that rate adjustment is completed.

For example, the second transmission chip may send, to the processing chip through the GPIO interface, the signal indicating that the rate adjustment is completed.

S308: The second transmission chip sets an interface rate between the second transmission chip and the processing chip based on the target value.

For example, the second transmission chip may set a C-PHY rate or a D-PHY rate between the second transmission chip and the processing chip based on the target value.

S309: The processing chip reads the data adjustment manner.

In this embodiment of this application, the processing chip may read the data adjustment manner from the second register, and the processing chip may adaptively adjust, based on the data adjustment manner, a manner of processing data from the second transmission chip.

It should be noted that S301, S304, and S306 to S309 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, the second transmission chip obtains one or more of the SNR, the BER, or the PER of the current link. When the first condition is met, the second transmission chip determines the target value and/or the adjustment value based on one or more of the obtained SNR, BER, or PER, and the second transmission chip sends the target value and/or the adjustment value to the first transmission chip. Further, the first transmission chip determines the data adjustment manner based on the target value and/or the adjustment value, and data output by an image sensor may be adjusted based on the data adjustment manner. This can ensure that the data can still be normally transmitted when a transmission system is interfered, to improve data transmission stability and reliability.

Figure 4:
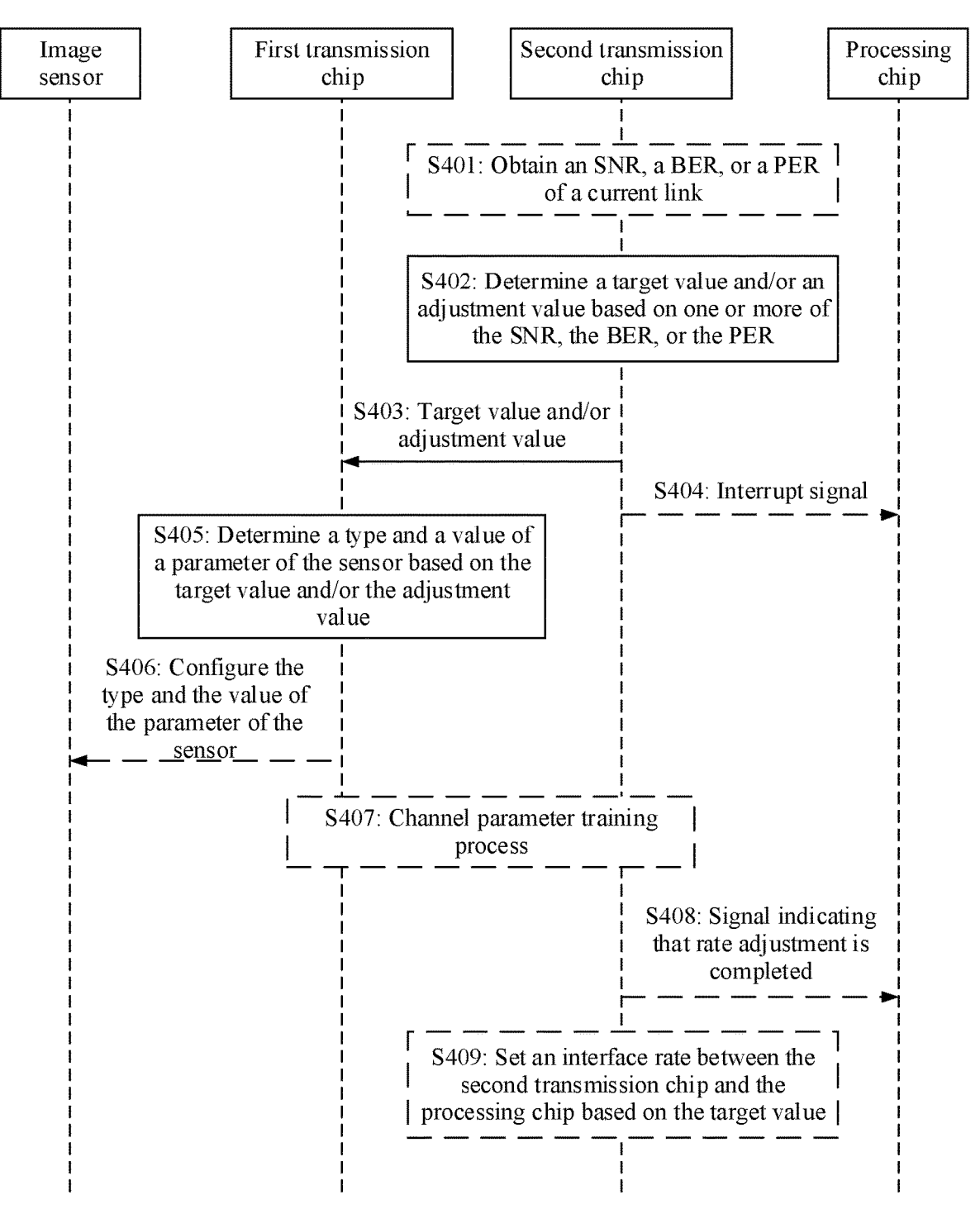
FIG. 4 is a schematic flowchart of a data processing method according to an embodiment of this application.

For example, FIG. 4 is a schematic flowchart of a data processing method according to an embodiment of this application. In the embodiment corresponding to FIG. 4, a second transmission chip may obtain a target value and/or an adjustment value of a data transmission rate through calculation, and the second transmission chip sends the target value and/or the adjustment value to a first transmission chip. Further, the first transmission chip determines a type and a value of a parameter of a sensor based on the target value and/or the adjustment value. For a specific implementation in which the first transmission chip determines the type and the value of the parameter of the sensor, refer to the descriptions of the foregoing steps. Details are not described herein again.

As shown in FIG. 4, the method may include the following steps.

S401: The second transmission chip obtains one or more of an SNR, a BER, or a PER of a current link.

S402: The second transmission chip determines the target value and/or the adjustment value of the data transmission rate based on one or more of the obtained SNR, BER, or PER.

S403: The second transmission chip sends the target value and/or the adjustment value to the first transmission chip.

S404: The second transmission chip sends an interrupt signal to a processing chip.

S405: The first transmission chip determines the type and the value of the parameter of the sensor based on the target value and/or the adjustment value.

S406: The first transmission chip configures the type and the value of the parameter of the sensor for the image sensor.

In this embodiment of this application, the first transmission chip may configure the parameter of the sensor through an Inter-Integrated Circuit (I2C) bus, and the image sensor outputs data based on the configured parameter.

S407: The first transmission chip and the second transmission chip train a channel parameter.

S408: The second transmission chip sends, to the processing chip, a signal indicating that rate adjustment is completed.

S409: The second transmission chip sets an interface rate between the second transmission chip and the processing chip based on the target value.

In this embodiment of this application, for S401 to S404, refer to the content adaptation descriptions of S301 to S304. For S407 to S409, refer to the content adaptation descriptions of S306 to S308. Details are not described herein again.

It should be noted that S401, S404, and S406 to S409 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, the second transmission chip obtains one or more of the SNR, the BER, or the PER of the current link. When the first condition is met, the second transmission chip determines the target value and/or the adjustment value based on one or more of the obtained SNR, BER, or PER, and the second transmission chip sends the target value and/or the adjustment value to the first transmission chip. Further, the first transmission chip determines the type and the value of the parameter of the sensor based on the target value and/or the adjustment value, and the image sensor outputs the data based on the configured type and value of the parameter. This can ensure that the data can still be normally transmitted when a transmission system is interfered, to improve data transmission stability and reliability.

Figure 5:
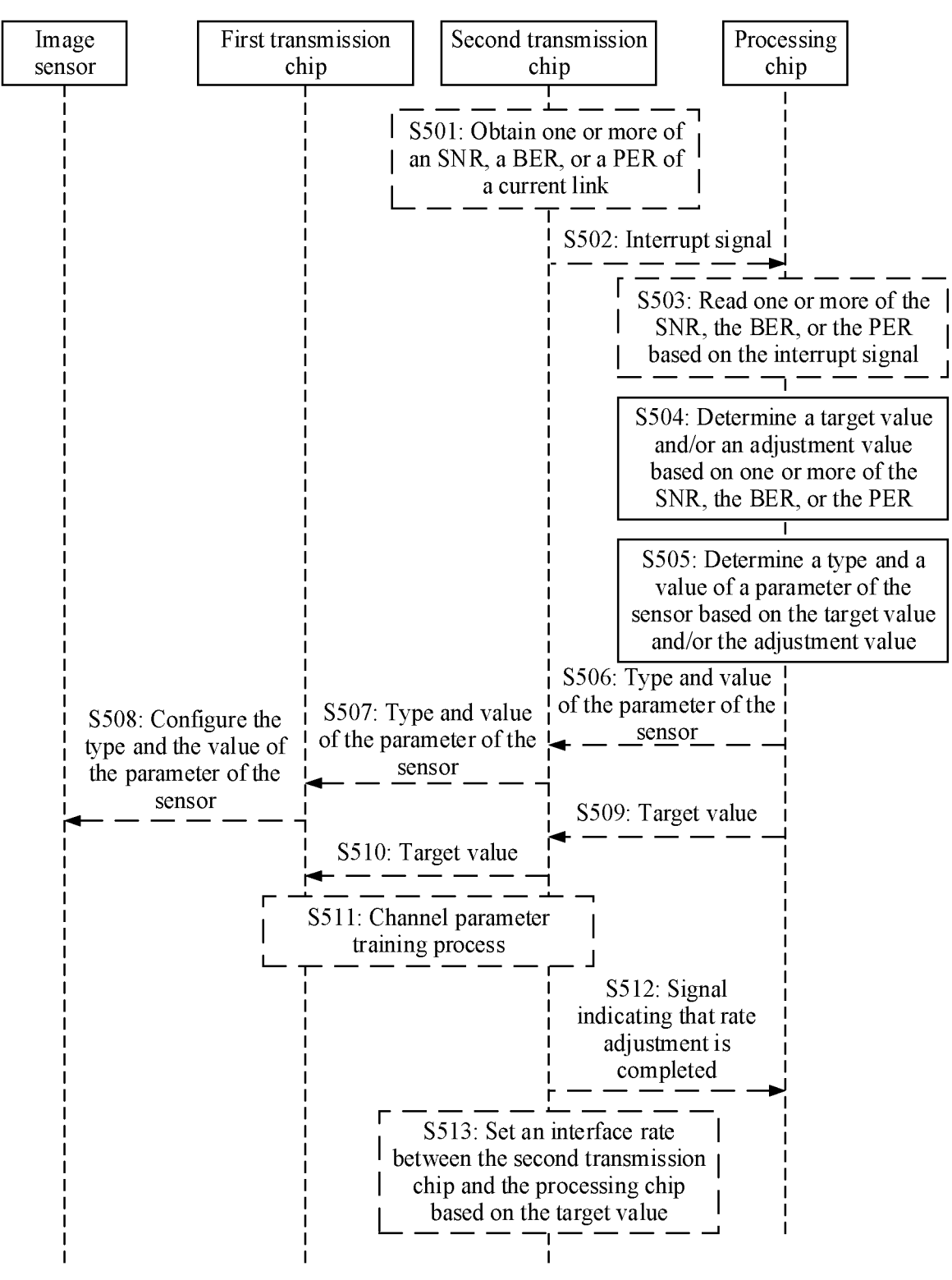
FIG. 5 is a schematic flowchart of a data processing method according to an embodiment of this application.

For example, FIG. 5 is a schematic flowchart of a data processing method according to an embodiment of this application. In the embodiment corresponding to FIG. 5, a processing chip may obtain a target value and/or an adjustment value of a data transmission rate through calculation. Further, the processing chip determines a type and a value of a parameter of a sensor based on the target value and/or the adjustment value. For a specific implementation in which the processing chip determines the type and the value of the parameter of the sensor, refer to the descriptions of the foregoing steps. Details are not described herein again.

As shown in FIG. 5, the method may include the following steps.

S501: A second transmission chip obtains one or more of an SNR, a BER, or a PER of a current link.

In this embodiment of this application, the second transmission chip stores one or more of the obtained SNR, BER, or PER in a first register, and the processing chip may subsequently read one or more of the SNR, BER, or PER from the first register.

S502: The second transmission chip sends an interrupt signal to the processing chip.

For example, the second transmission chip may send the interrupt signal to the processing chip through a GPIO interface.

S503: The processing chip reads one or more of the SNR, the BER, or the PER based on the interrupt signal.

In this embodiment of this application, after the processing chip receives the interrupt signal, the processing chip may read one or more of the SNR, the BER, or the PER from the first register of the second transmission chip, and the processing chip may determine the target value and/or the adjustment value based on one or more of the SNR, the BER, or the PER.

S504: The processing chip determines the target value and/or the adjustment value of the data transmission rate based on one or more of the SNR, the BER, or the PER.

S505: The processing chip determines the type and the value of the parameter of the sensor based on the target value and/or the adjustment value.

S506: The processing chip sends the type and the value of the parameter of the sensor to the second transmission chip.

In this embodiment of this application, the processing chip may send the type and the value of the parameter of the sensor through an I2C bus.

S507: The second transmission chip sends the type and the value of the parameter of the sensor to a first transmission chip.

In this embodiment of this application, when the second transmission chip sends the type and the value of the parameter of the sensor to the first transmission chip, the type and the value of the parameter of the sensor may be carried at a physical layer, or may be carried at a MAC layer or above the MAC layer.

S508: The first transmission chip configures the type and the value of the parameter of the sensor for the image sensor.

In this embodiment of this application, the first transmission chip may configure the type and the value of the parameter of the sensor through the I2C bus, and the image sensor outputs data based on the configured type and value of the parameter.

S509: The processing chip sends the target value to the second transmission chip.

In this embodiment of this application, the second transmission chip may set an interface rate between the second transmission chip and the processing chip based on the target value.

S510: The second transmission chip sends the target value to the first transmission chip.

In this embodiment of this application, the first transmission chip and the second transmission chip may train a channel parameter based on the target value.

In this embodiment of this application, when the second transmission chip sends the target value to the first transmission chip, the target value may be carried at the physical layer, or may be carried at the MAC layer or above the MAC layer.

S511: The first transmission chip and the second transmission chip train the channel parameter.

S512: The second transmission chip sends, to the processing chip, a signal indicating that rate adjustment is completed.

S513: The second transmission chip sets the interface rate between the second transmission chip and the processing chip based on the target value.

In this embodiment of this application, for S511 to S513, refer to the content adaptation descriptions of S306 to S308. Details are not described herein again.

It should be noted that S501 to S503, and S506 to S513 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, the processing chip may read one or more of the SNR, the BER, or the PER from the first register of the second transmission chip, and the processing chip determines the target value and/or the adjustment value of the data transmission rate based on one or more of the SNR, the BER, or the PER. Further, the processing chip determines the type and the value of the parameter of the sensor based on the target value and/or the adjustment value, and the image sensor outputs the data based on the configured type and value of the parameter. This can ensure that the data can still be normally transmitted when a transmission system is interfered, to improve data transmission stability and reliability.

Figure 6:
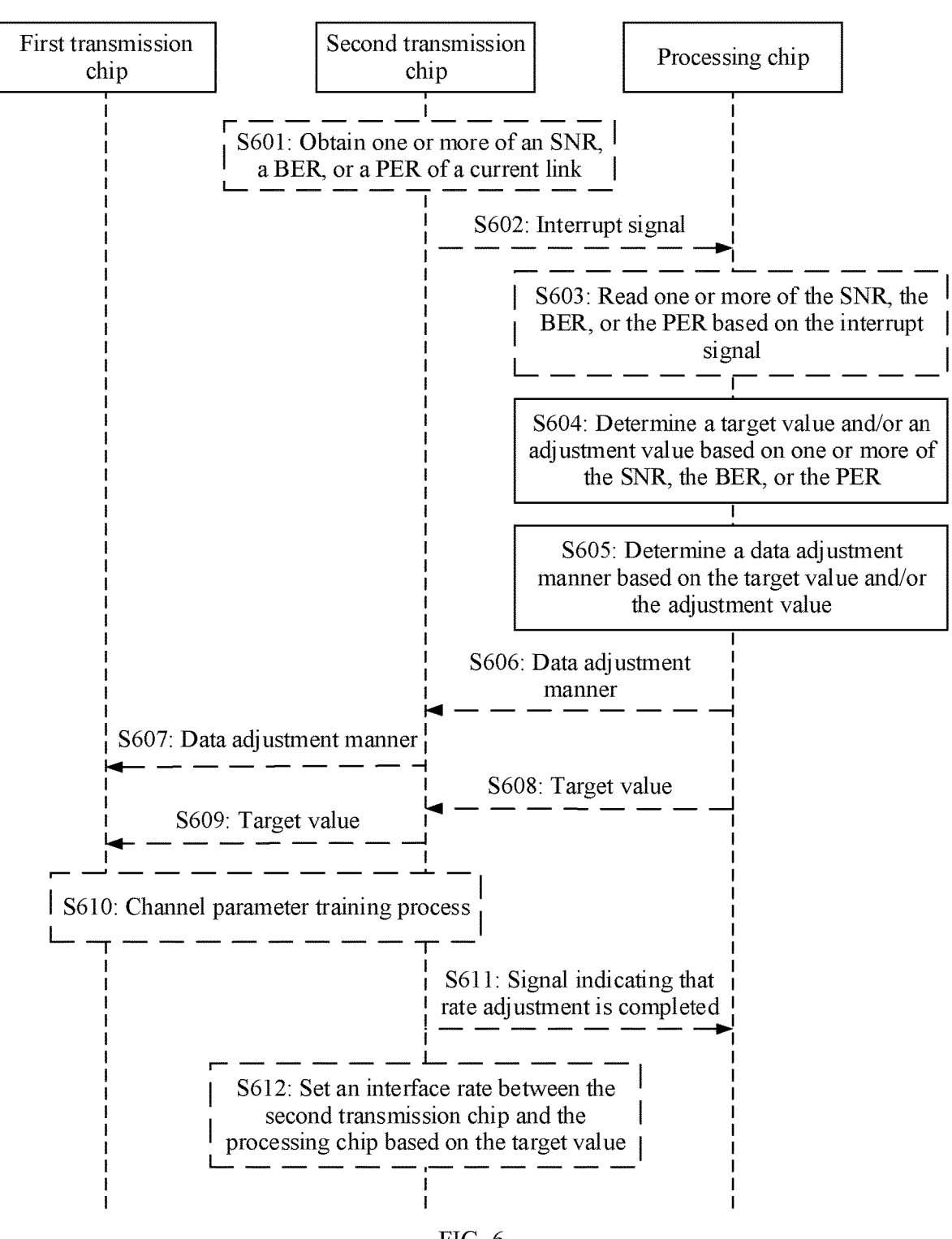
FIG. 6 is a schematic flowchart of a data processing method according to an embodiment of this application.

For example, FIG. 6 is a schematic flowchart of a data processing method according to an embodiment of this application. In the embodiment corresponding to FIG. 6, a processing chip may obtain a target value and/or an adjustment value of a data transmission rate through calculation. Further, the processing chip determines a data adjustment manner based on the target value and/or the adjustment value. For a specific implementation in which the processing chip determines the data adjustment manner, refer to the descriptions of the foregoing steps. Details are not described herein again.

As shown in FIG. 6, the method may include the following steps.

S601: A second transmission chip obtains one or more of an SNR, a BER, or a PER of a current link.

S602: The second transmission chip sends an interrupt signal to the processing chip.

S603: The processing chip reads one or more of the SNR, the BER, or the PER based on the interrupt signal.

S604: The processing chip determines the target value and/or the adjustment value of the data transmission rate based on one or more of the SNR, the BER, or the PER.

S605: The processing chip determines the data adjustment manner based on the target value and/or the adjustment value.

S606: The processing chip sends the data adjustment manner to the second transmission chip.

For example, the processing chip may send the data adjustment manner to the second transmission chip through an I2C bus.

S607: The second transmission chip sends the data adjustment manner to a first transmission chip.

In this embodiment of this application, when the second transmission chip sends the data adjustment manner to the first transmission chip, the data adjustment manner may be carried at a physical layer, or may be carried at a MAC layer or above the MAC layer.

S608: The processing chip sends the target value to the second transmission chip.

In this embodiment of this application, the processing chip may send the target value to the second transmission chip through the I2C bus, and the second transmission chip may set an interface rate between the second transmission chip and the processing chip based on the target value.

S609: The second transmission chip sends the target value to the first transmission chip.

In this embodiment of this application, when the second transmission chip sends the target value to the first transmission chip, the target value may be carried at the physical layer, or may be carried at the MAC layer or above the MAC layer.

In this embodiment of this application, the first transmission chip and the second transmission chip may train a channel parameter based on the target value.

S610: The first transmission chip and the second transmission chip train the channel parameter.

S611: The second transmission chip sends, to the processing chip, a signal indicating that rate adjustment is completed.

S612: The second transmission chip sets the interface rate between the second transmission chip and the processing chip based on the target value.

In this embodiment of this application, for S601 to S603, refer to the content adaptation descriptions of S501 to S503. For S610 to S612, refer to the content adaptation descriptions of S306 to S308. Details are not described herein again.

It should be noted that S601 to S603, and S606 to S612 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, the processing chip may read one or more of the SNR, the BER, or the PER from the first register of the second transmission chip, and the processing chip determines the target value and/or the adjustment value of the data transmission rate based on one or more of the SNR, the BER, or the PER. Further, the processing chip determines the data adjustment manner based on the target value and/or the adjustment value, and data output by the image sensor may be adjusted based on the data adjustment manner. This can ensure that the data can still be normally transmitted when a transmission system is interfered, to improve data transmission stability and reliability.

Figure 7:
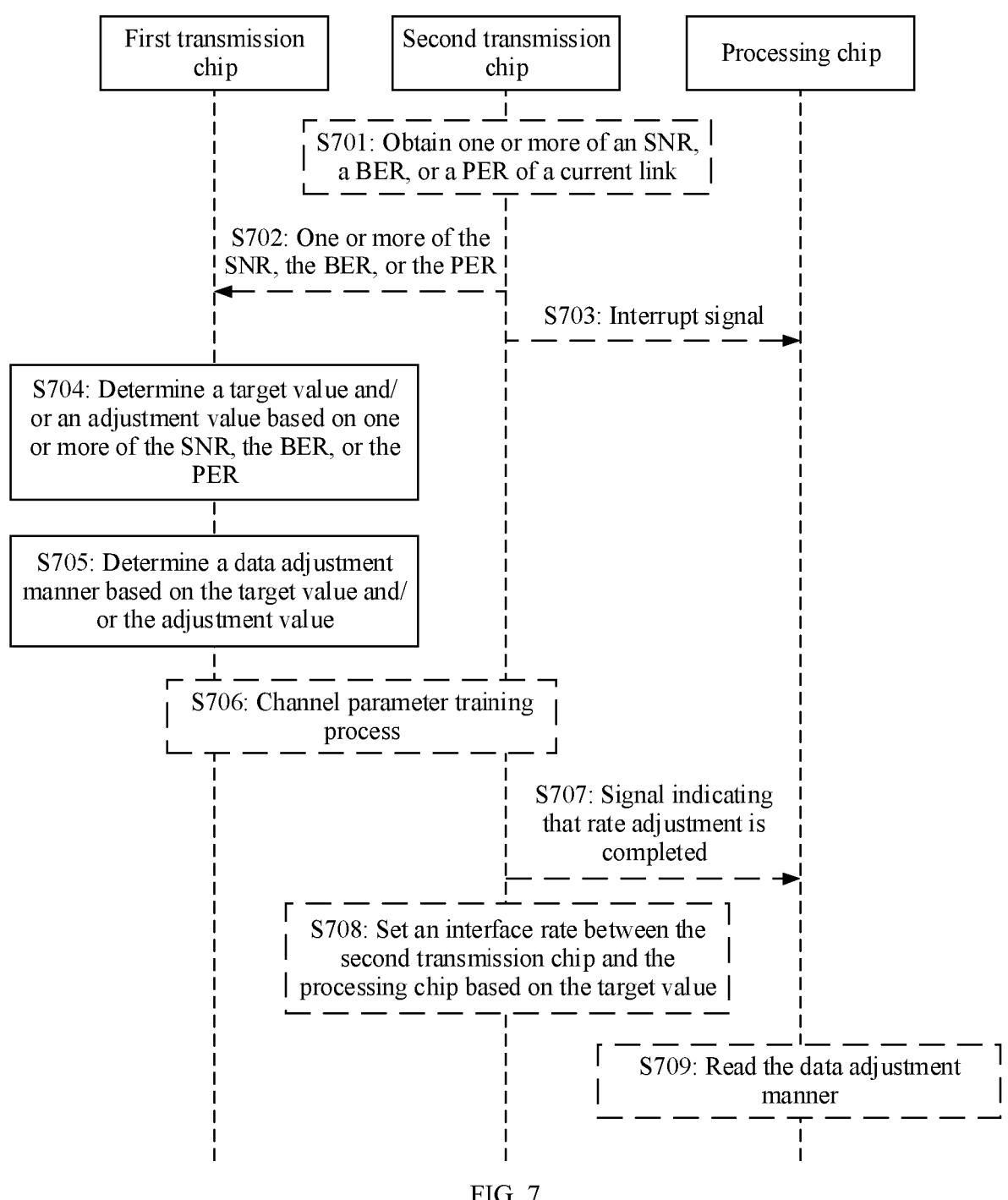
FIG. 7 is a schematic flowchart of a data processing method according to an embodiment of this application.

For example, FIG. 7 is a schematic flowchart of a data processing method according to an embodiment of this application. In the embodiment corresponding to FIG. 7, a first transmission chip may obtain a target value and/or an adjustment value of a data transmission rate through calculation, and the first transmission chip determines a data adjustment manner based on the target value and/or the adjustment value. For a specific implementation in which the first transmission chip determines the data adjustment manner, refer to the descriptions of the foregoing steps. Details are not described herein again.

As shown in FIG. 7, the method may include the following steps.

S701: A second transmission chip obtains one or more of an SNR, a BER, or a PER of a current link.

S702: The second transmission chip sends one or more of the SNR, the BER, or the PER to the first transmission chip.

In this embodiment of this application, when a first condition is met, the second transmission chip sends one or more of the SNR, the BER, or the PER to the first transmission chip. For specific content of the first condition, refer to the descriptions of the foregoing steps. Details are not described herein again.

In this embodiment of this application, when the second transmission chip sends one or more of the SNR, the BER, or the PER to the first transmission chip, one or more of the SNR, the BER, or the PER may be carried at a physical layer, or may be carried at a MAC layer or above the MAC layer.

S703: The second transmission chip sends an interrupt signal to a processing chip.

For example, the second transmission chip may send the interrupt signal to the processing chip through a GPIO interface.

S704: The first transmission chip determines the target value and/or the adjustment value of the data transmission rate based on one or more of the SNR, the BER, or the PER.

S705: The first transmission chip determines the data adjustment manner based on the target value and/or the adjustment value.

S706: The first transmission chip and the second transmission chip train a channel parameter.

In this embodiment of this application, the first transmission chip sends a training sequence (for example, a pseudo-random sequence) to the second transmission chip, the second transmission chip calculates the channel parameter based on the training sequence, the second transmission chip sends the channel parameter to the first transmission chip, and the first transmission chip may configure a sending parameter and a receiving parameter based on the channel parameter. An implementation in which the second transmission chip calculates the channel parameter may be set based on an actual application scenario. This is not limited in this embodiment of this application.

In this embodiment of this application, the first transmission chip may send the data adjustment manner to the second transmission chip by using the training sequence, and the second transmission chip may store the data adjustment manner in a second register. In this case, the processing chip may subsequently read the data adjustment manner from the second register.

S707: The second transmission chip sends, to the processing chip, a signal indicating that rate adjustment is completed.

For example, the second transmission chip may send, to the processing chip through the GPIO interface, the signal indicating that the rate adjustment is completed.

S708: The second transmission chip sets an interface rate between the second transmission chip and the processing chip based on the target value.

For example, the second transmission chip may set a C-PHY rate or a D-PHY rate between the second transmission chip and the processing chip based on the target value.

S709: The processing chip reads the data adjustment manner.

In this embodiment of this application, the processing chip may read the data adjustment manner from the second register of the second transmission chip, and the processing chip may adaptively adjust, based on the data adjustment manner, a manner of processing data from the second transmission chip.

It should be noted that S701 to S703, and S706 to S709 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, when the first condition is met, the second transmission sends one or more of the SNR, the BER, or the PER to the first transmission chip, and the first transmission chip determines the target value and/or the adjustment value of the data transmission rate based on one or more of the SNR, the BER, or the PER. Further, the first transmission chip determines the data adjustment manner based on the target value and/or the adjustment value, and data output by the image sensor may be adjusted based on the data adjustment manner. This can ensure that the data can still be normally transmitted when a transmission system is interfered, to improve data transmission stability and reliability.

Figure 8:
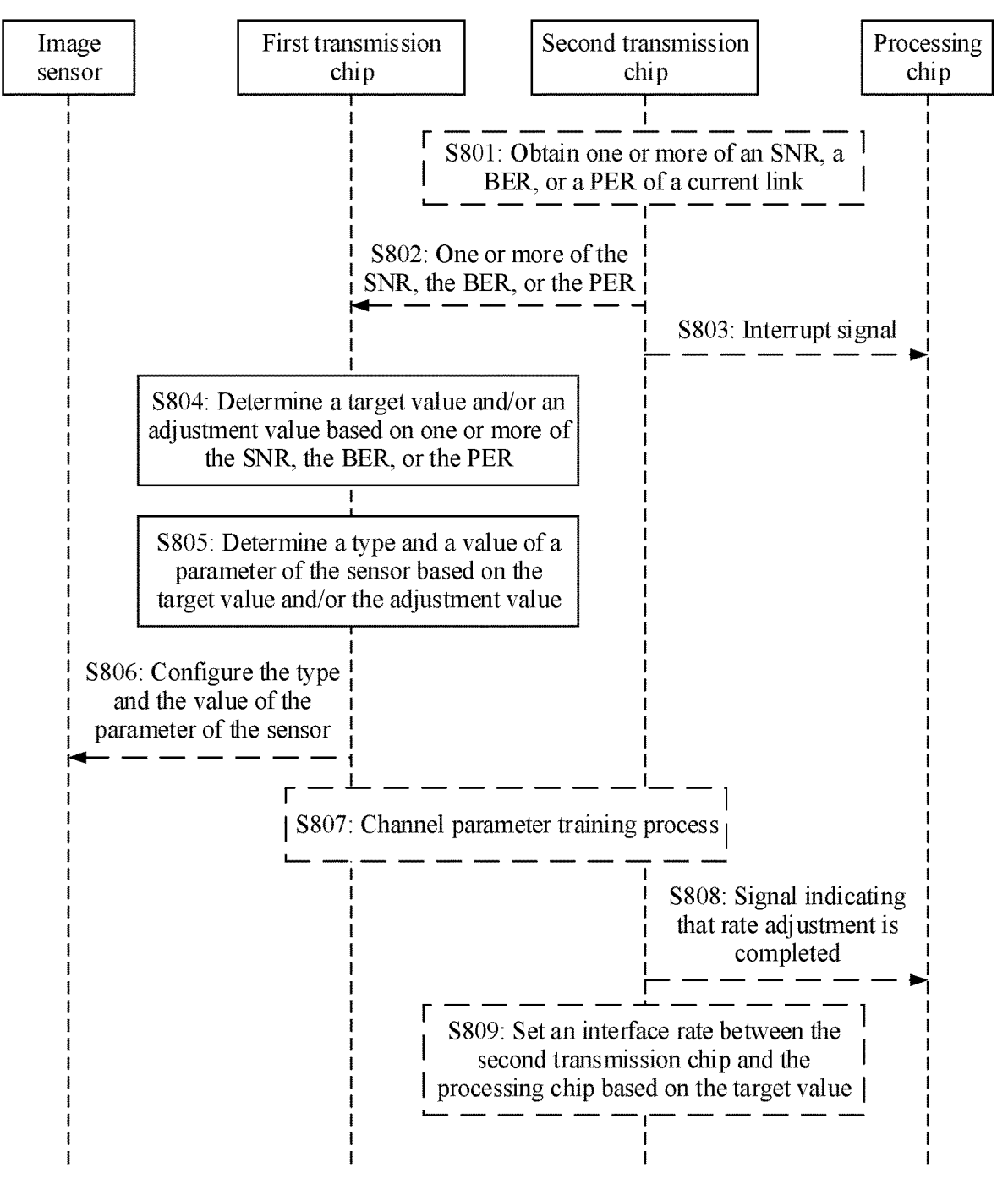
FIG. 8 is a schematic flowchart of a data processing method according to an embodiment of this application.

For example, FIG. 8 is a schematic flowchart of a data processing method according to an embodiment of this application. In the embodiment corresponding to FIG. 8, a first transmission chip may obtain a target value and/or an adjustment value of a data transmission rate through calculation. Further, the first transmission chip determines a type and a value of a parameter of a sensor based on the target value and/or the adjustment value. For a specific implementation in which the first transmission chip determines the type and the value of the parameter of the sensor, refer to the descriptions of the foregoing steps. Details are not described herein again.

As shown in FIG. 8, the method may include the following steps.

S801: A second transmission chip obtains one or more of an SNR, a BER, or a PER of a current link.

S802: The second transmission chip sends one or more of the SNR, the BER, or the PER to the first transmission chip.

S803: The second transmission chip sends an interrupt signal to a processing chip.

S804: The first transmission chip determines the target value and/or the adjustment value of the data transmission rate based on one or more of the SNR, the BER, or the PER.

S805: The first transmission chip determines the type and the value of the parameter of the sensor based on the target value and/or the adjustment value.

S806: The first transmission chip configures the type and the value of the parameter of the sensor for the image sensor.

In this embodiment of this application, the first transmission chip may configure the type and the value of the parameter of the sensor through an I2C bus, and the image sensor outputs data based on the configured type and value of the parameter.

S807: The first transmission chip and the second transmission chip train a channel parameter.

S808: The second transmission chip sends, to the processing chip, a signal indicating that rate adjustment is completed.

S809: The second transmission chip sets an interface rate between the second transmission chip and the processing chip based on the target value.

In this embodiment of this application, for S801 to S803, refer to the content adaptation descriptions of S701 to S703. For S807 to S809, refer to the content adaptation descriptions of S306 to S308. Details are not described herein again.

It should be noted that S801 to S803, and S806 to S809 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, when the first condition is met, the second transmission chip sends one or more of the SNR, the BER, or the PER to the first transmission chip, and the first transmission chip determines the target value and/or the adjustment value of the data transmission rate based on one or more of the SNR, the BER, or the PER. Further, the first transmission chip determines the type and the value of the parameter of the sensor based on the target value and/or the adjustment value, and the image sensor outputs the data based on the configured type and value of the parameter. This can ensure that the data can still be normally transmitted when a transmission system is interfered, to improve data transmission stability and reliability.

Figure 9:
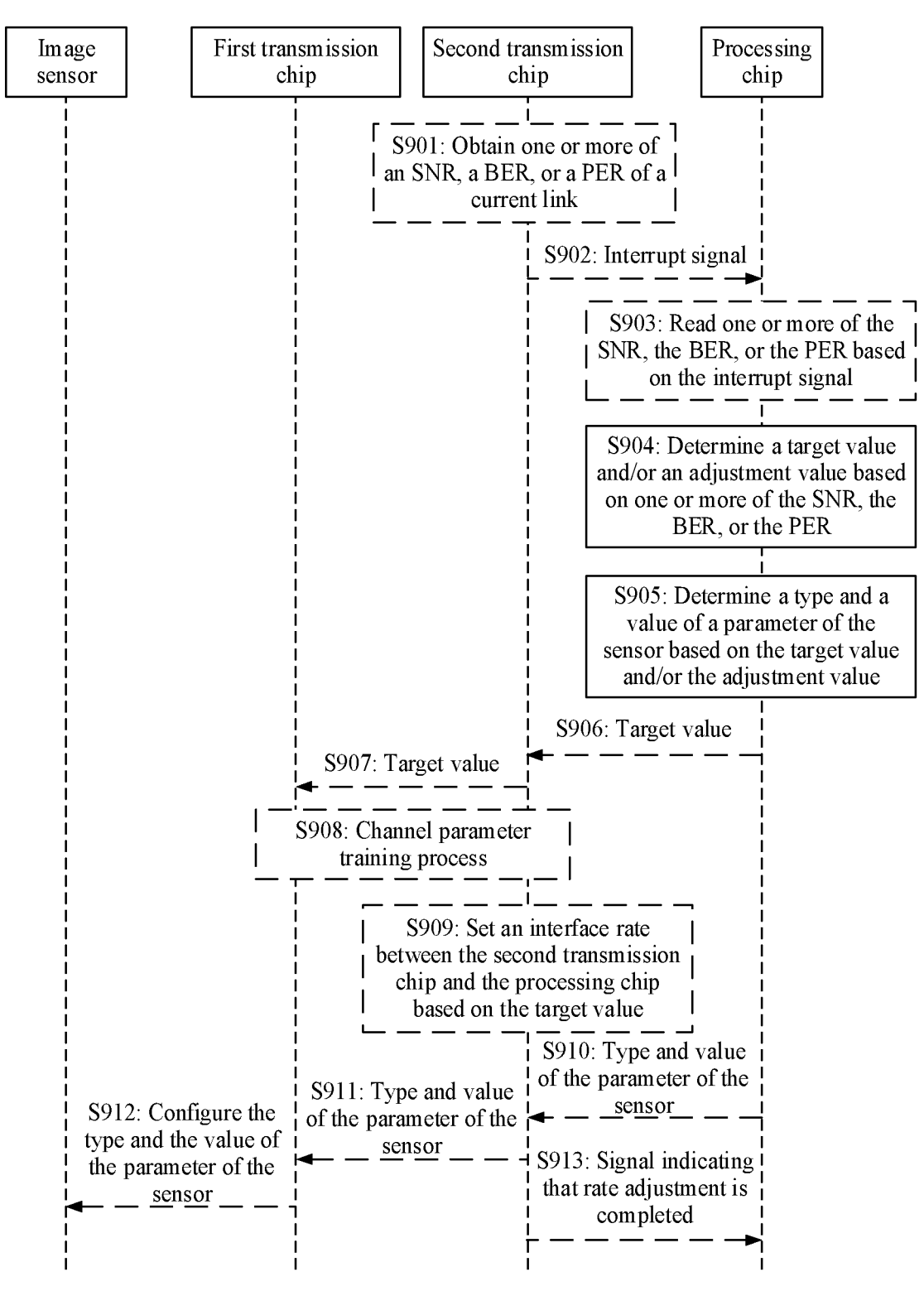
FIG. 9 is a schematic flowchart of a data processing method according to an embodiment of this application.

For example, FIG. 9 is a schematic flowchart of a data processing method according to an embodiment of this application. In the embodiment corresponding to FIG. 9, a processing chip may obtain a target value and/or an adjustment value of a data transmission rate through calculation. Further, the processing chip determines a type and a value of a parameter of a sensor based on the target value and/or the adjustment value. For an implementation in which the processing chip determines the type and the value of the parameter of the sensor, refer to the descriptions of the foregoing steps. Details are not described herein again.

As shown in FIG. 9, the method may include the following steps.

S901: A second transmission chip obtains one or more of an SNR, a BER, or a PER of a current link.

S902: The second transmission chip sends an interrupt signal to the processing chip.

S903: The processing chip reads one or more of the SNR, the BER, or the PER based on the interrupt signal.

S904: The processing chip determines the target value and/or the adjustment value of the data transmission rate based on one or more of the SNR, the BER, or the PER.

S905: The processing chip determines the type and the value of the parameter of the sensor based on the target value and/or the adjustment value.

S906: The processing chip sends the target value to the second transmission chip.

S907: The second transmission chip sends the target value to a first transmission chip.

S908: The first transmission chip and the second transmission chip train a channel parameter.

S909: The second transmission chip sets an interface rate between the second transmission chip and the processing chip based on the target value.

S910: The processing chip sends the type and the value of the parameter of the sensor to the second transmission chip.

S911: The second transmission chip sends the type and the value of the parameter of the sensor to the first transmission chip.

S912: The first transmission chip configures the type and the value of the parameter of the sensor for the image sensor.

S913: The second transmission chip sends, to the processing chip, a signal indicating that rate adjustment is completed.

In this embodiment of this application, for S901 to S903, refer to the content adaptation descriptions of S501 to S503. For S906 and S907, refer to the content adaptation descriptions of S509 and S510. For S910 to S912, refer to the content adaptation descriptions of S506 to S508. For S908, S909, and S913, refer to the content adaptation descriptions of S306 to S308. Details are not described herein again.

It should be noted that S901 to S903, and S906 to S913 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, the processing chip may read one or more of the SNR, the BER, or the PER from the first register of the second transmission chip, and the processing chip determines the target value and/or the adjustment value of the data transmission rate based on one or more of the SNR, the BER, or the PER. Further, the processing chip determines the type and the value of the parameter of the sensor based on the target value and/or the adjustment value, and the image sensor outputs the data based on the configured type and value of the parameter. This can ensure that the data can still be normally transmitted when a transmission system is interfered, to improve data transmission stability and reliability.

Figure 10:
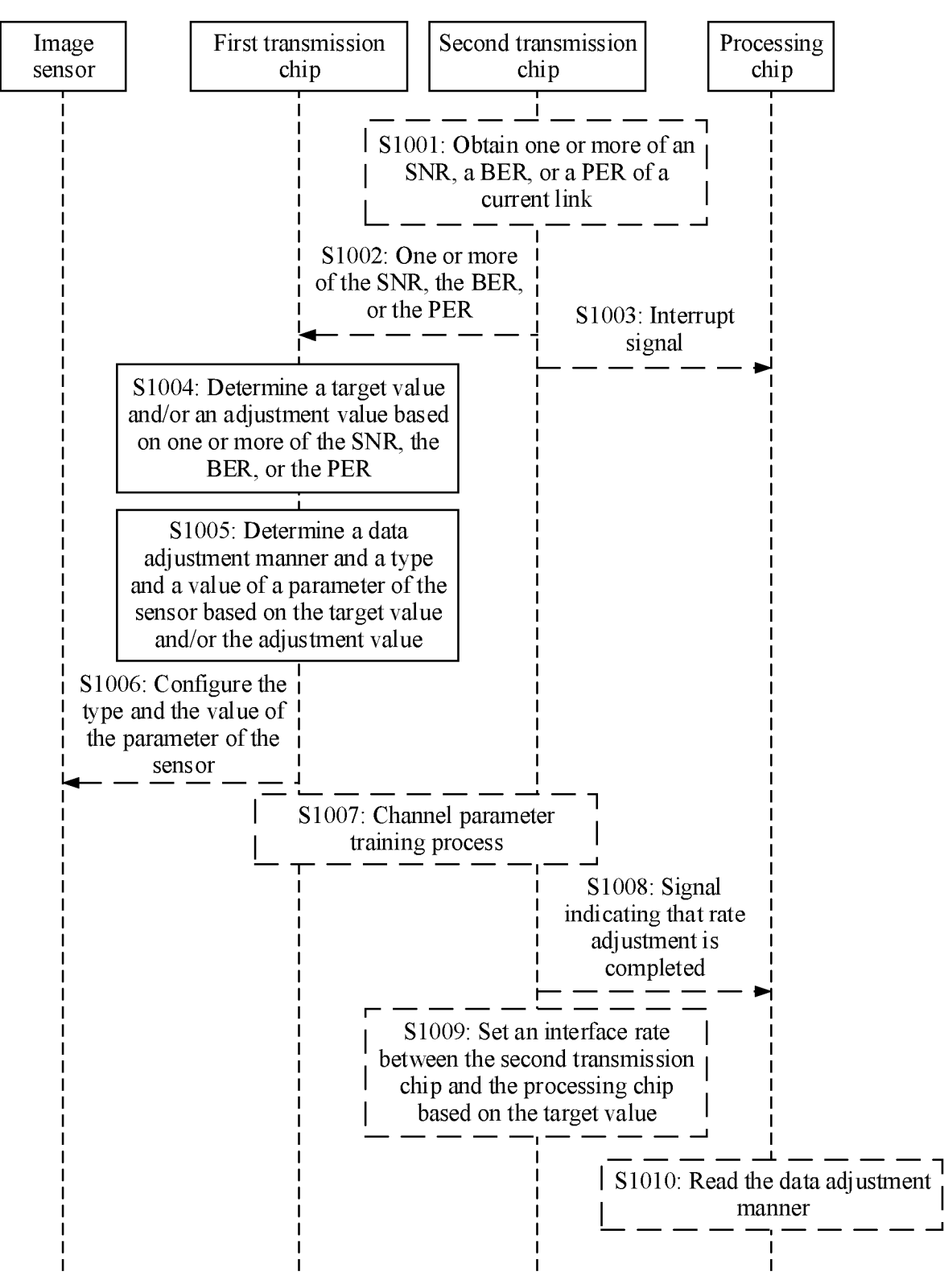
FIG. 10 is a schematic flowchart of a data processing method according to an embodiment of this application.

For example, FIG. 10 is a schematic flowchart of a data processing method according to an embodiment of this application. In the embodiment corresponding to FIG. 10, a first transmission chip may obtain a target value and/or an adjustment value of a data transmission rate through calculation, and the first transmission chip determines a data adjustment manner and a type and a value of a parameter of a sensor based on the target value and/or the adjustment value. For a specific implementation in which the first transmission chip determines the data adjustment manner and the type and the value of the parameter of the sensor, refer to the descriptions of the foregoing steps. Details are not described herein again.

As shown in FIG. 10, the method may include the following steps.

S1001: A second transmission chip obtains one or more of an SNR, a BER, or a PER of a current link.

S1002: The second transmission chip sends one or more of the SNR, the BER, or the PER to the first transmission chip.

S1003: The second transmission chip sends an interrupt signal to a processing chip.

S1004: The first transmission chip determines the target value and/or the adjustment value of the data transmission rate based on one or more of the SNR, the BER, or the PER.

S1005: The first transmission chip determines the data adjustment manner and the type and the value of the parameter of the sensor based on the target value and/or the adjustment value.

S1006: The first transmission chip configures the type and the value of the parameter of the sensor for the image sensor.

For example, the first transmission chip may configure the type and the value of the parameter of the sensor through an I2C bus, and the image sensor outputs data based on the configured type and value of the parameter.

S1007: The first transmission chip and the second transmission chip train a channel parameter.

S1008: The second transmission chip sends, to the processing chip, a signal indicating that rate adjustment is completed.

S1009: The second transmission chip sets an interface rate between the second transmission chip and the processing chip based on the target value.

S1010: The processing chip reads the data adjustment manner.

In this embodiment of this application, for S1001 to S1003, refer to the content adaptation descriptions of S701 to S703. For S1007 to S1010, refer to the content adaptation descriptions of S306 to S309. Details are not described herein again.

It should be noted that S1001 to S1003, and S1006 to S1010 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, when the first condition is met, the second transmission chip sends one or more of the SNR, the BER, or the PER to the first transmission chip, and the first transmission chip determines the target value and/or the adjustment value of the data transmission rate based on one or more of the SNR, the BER, or the PER. Further, the first transmission chip determines the data adjustment manner and the type and the value of the parameter of the sensor based on the target value and/or the adjustment value, the image sensor outputs the data based on the configured type and value of the parameter, and the output data is further adjusted based on the data adjustment manner. This can ensure that the data can still be normally transmitted when a transmission system is interfered, to improve data transmission stability and reliability.

Figure 11:
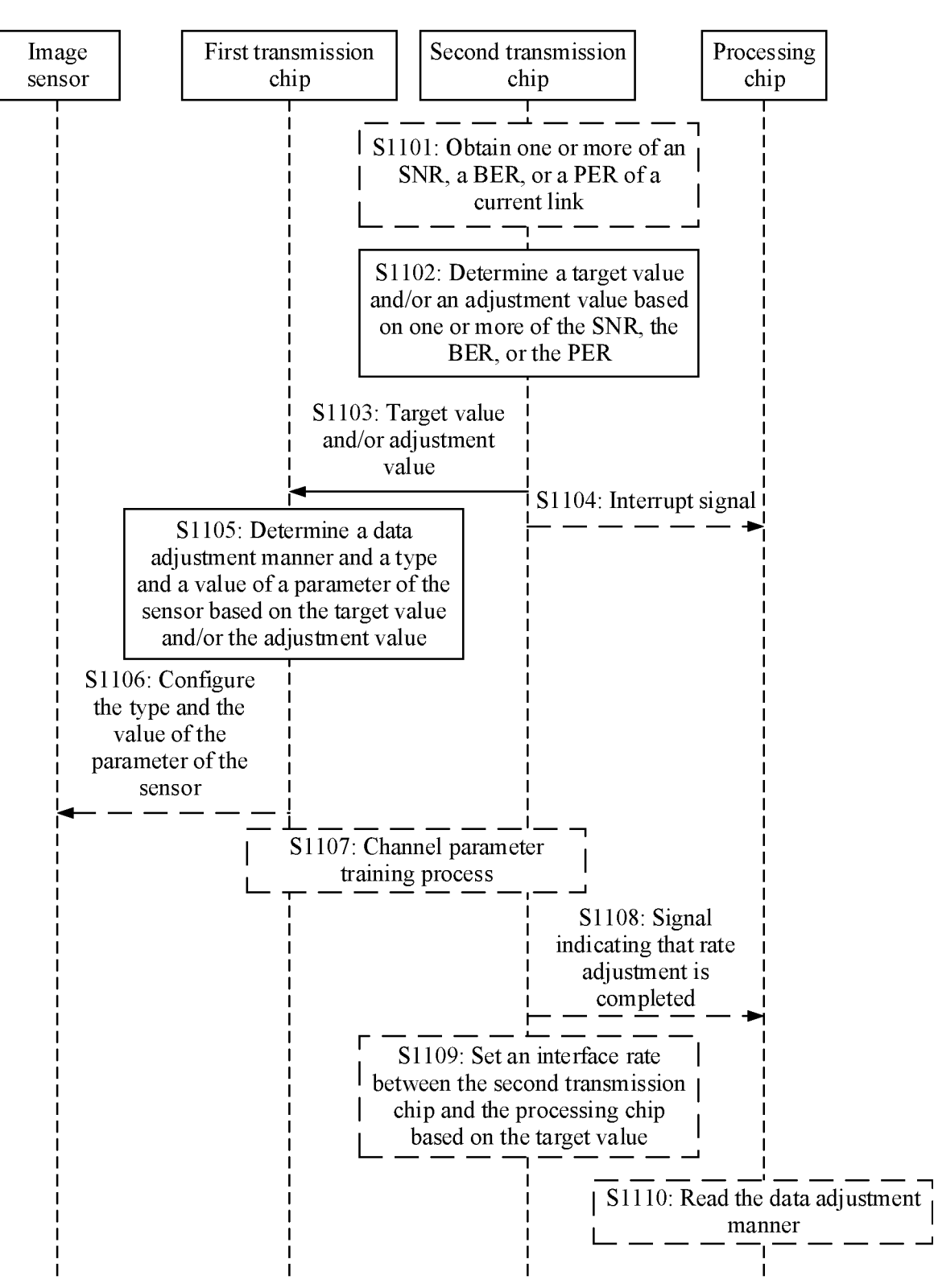
FIG. 11 is a schematic flowchart of a data processing method according to an embodiment of this application.

For example, FIG. 11 is a schematic flowchart of a data processing method according to an embodiment of this application. In the embodiment corresponding to FIG. 11, a second transmission chip may obtain a target value and/or an adjustment value of a data transmission rate through calculation, and the second transmission chip sends the target value and/or the adjustment value to a first transmission chip. Further, the first transmission chip determines a data adjustment manner and a type and a value of a parameter of a sensor based on the target value and/or the adjustment value. For a specific implementation in which the first transmission chip determines the data adjustment manner and the type and the value of the parameter of the sensor, refer to the descriptions of the foregoing steps. Details are not described herein again.

As shown in FIG. 11, the method may include the following steps.

S1101: The second transmission chip obtains one or more of an SNR, a BER, or a PER of a current link.

S1102: The second transmission chip determines the target value and/or the adjustment value of the data transmission rate based on one or more of the obtained SNR, BER, or PER.

S1103: The second transmission chip sends the target value and/or the adjustment value to the first transmission chip.

S1104: The second transmission chip sends an interrupt signal to a processing chip.

S1105: The first transmission chip determines the data adjustment manner and the type and the value of the parameter of the sensor based on the target value and/or the adjustment value.

S1106: The first transmission chip configures the type and the value of the parameter of the sensor for the image sensor.

In this embodiment of this application, the first transmission chip may configure the type and the value of the parameter of the sensor through an I2C bus, and the image sensor outputs data based on the configured type and value of the parameter.

S1107: The first transmission chip and the second transmission chip train a channel parameter.

S1108: The second transmission chip sends, to the processing chip, a signal indicating that rate adjustment is completed.

S1109: The second transmission chip sets an interface rate between the second transmission chip and the processing chip based on the target value.

S1110: The processing chip reads the data adjustment manner.

In this embodiment of this application, for S1101 to S1104, refer to the content adaptation descriptions of S301 to S304. For S1107 to S1110, refer to the content adaptation descriptions of S306 to S309. Details are not described herein again.

It should be noted that S1101, S1104, and S1106 to S1110 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, the second transmission chip obtains one or more of the SNR, the BER, or the PER of the current link. When the first condition is met, the second transmission chip determines the target value and/or the adjustment value based on one or more of the obtained SNR, BER, or PER, and the second transmission chip sends the target value and/or the adjustment value to the first transmission chip. Further, the first transmission chip determines the data adjustment manner and the type and the value of the parameter of the sensor based on the target value and/or the adjustment value, the image sensor outputs the data based on the configured type and value of the parameter, and the output data is further adjusted based on the data adjustment manner. This can ensure that the data can still be normally transmitted when a transmission system is interfered, to improve data transmission stability and reliability.

Figure 12:
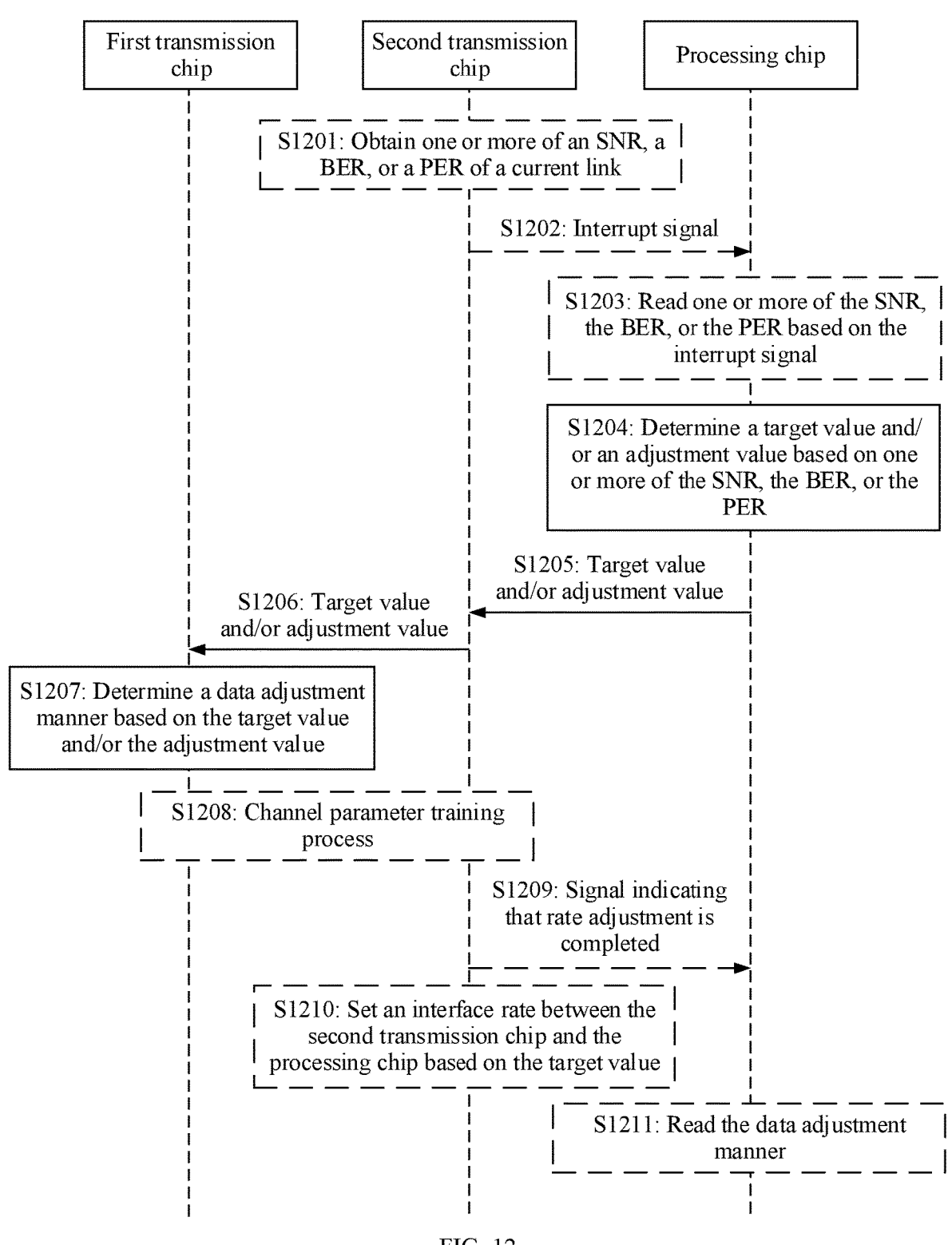
FIG. 12 is a schematic flowchart of a data processing method according to an embodiment of this application.

For example, FIG. 12 is a schematic flowchart of a data processing method according to an embodiment of this application. In the embodiment corresponding to FIG. 12, a processing chip may obtain a target value and/or an adjustment value of a data transmission rate through calculation, and the processing chip sends the target value and/or the adjustment value to a first transmission chip. Further, the first transmission chip determines a data adjustment manner based on the target value and/or the adjustment value. For a specific implementation in which the first transmission chip determines the data adjustment manner, refer to the descriptions of the foregoing steps. Details are not described herein again.

As shown in FIG. 12, the method may include the following steps.

S1201: A second transmission chip obtains one or more of an SNR, a BER, or a PER of a current link.

In this embodiment of this application, the second transmission chip stores one or more of the obtained SNR, BER, or PER in a first register, and the processing chip may subsequently read one or more of the SNR, BER, or PER from the first register.

S1202: The second transmission chip sends an interrupt signal to the processing chip.

For example, the second transmission chip may send the interrupt signal to the processing chip through a GPIO interface.

S1203: The processing chip reads one or more of the SNR, the BER, or the PER based on the interrupt signal.

In this embodiment of this application, after the processing chip receives the interrupt signal, the processing chip may read one or more of the SNR, the BER, or the PER from the first register of the second transmission chip, and the processing chip may determine the target value and/or the adjustment value based on one or more of the SNR, the BER, or the PER.

S1204: The processing chip determines the target value and/or the adjustment value of the data transmission rate based on one or more of the SNR, the BER, or the PER.

S1205: The processing chip sends the target value and/or the adjustment value to the second transmission chip.

S1206: The second transmission chip sends the target value and/or the adjustment value to the first transmission chip.

In this embodiment of this application, when the second transmission chip sends the target value and/or the adjustment value to the first transmission chip, the target value and/or the adjustment value may be carried at a physical layer, or may be carried at a MAC layer or above the MAC layer.

S1207: The first transmission chip determines the data adjustment manner based on the target value and/or the adjustment value.

S1208: The first transmission chip and the second transmission chip train a channel parameter.

S1209: The second transmission chip sends, to the processing chip, a signal indicating that rate adjustment is completed.

S1210: The second transmission chip sets an interface rate between the second transmission chip and the processing chip based on the target value and/or the adjustment value.

S1211: The processing chip reads the data adjustment manner.

In this embodiment of this application, for S1208 to S1211, refer to the content adaptation descriptions of S306 to S309. Details are not described herein again.

It should be noted that S1201 to S1203, and S1208 to S1211 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, after the processing chip receives the interrupt signal, the processing chip reads one or more of the SNR, the BER, or the PER from the first register of the second transmission chip, the processing chip determines the target value and/or the adjustment value based on one or more of the SNR, the BER, or the PER, and the processing chip sends the target value and/or the adjustment value to the first transmission chip. Further, the first transmission chip determines the data adjustment manner based on the target value and/or the adjustment value, and data output by an image sensor may be adjusted based on the data adjustment manner. This can ensure that the data can still be normally transmitted when a transmission system is interfered, to improve data transmission stability and reliability.

Figure 13:
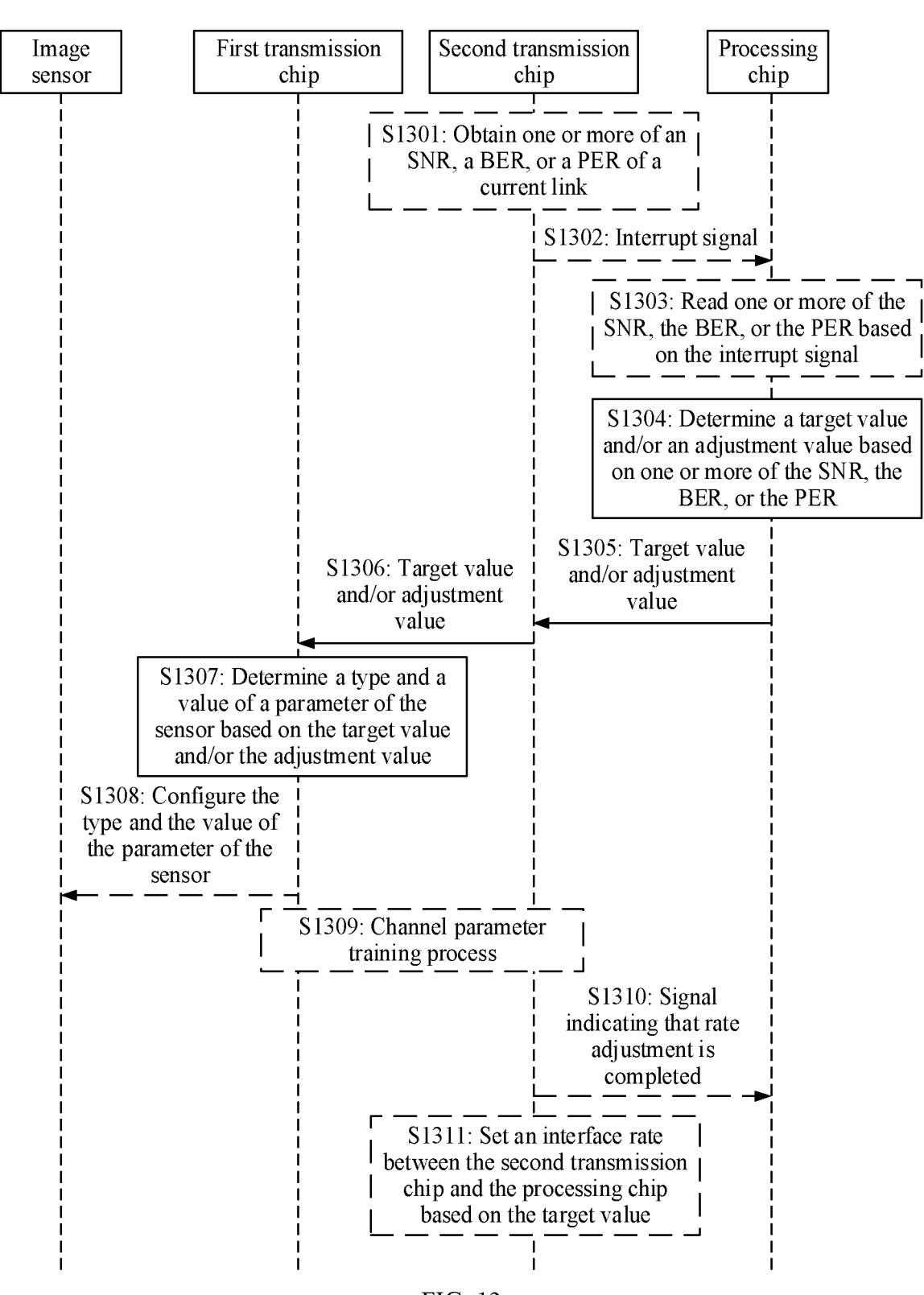
FIG. 13 is a schematic flowchart of a data processing method according to an embodiment of this application.

For example, FIG. 13 is a schematic flowchart of a data processing method according to an embodiment of this application. In the embodiment corresponding to FIG. 13, a processing chip may obtain a target value and/or an adjustment value of a data transmission rate through calculation, and the processing chip sends the target value and/or the adjustment value to a first transmission chip. Further, the first transmission chip determines a type and a value of a parameter of a sensor based on the target value and/or the adjustment value. For a specific implementation in which the first transmission chip determines the type and the value of the parameter of the sensor, refer to the descriptions of the foregoing steps. Details are not described herein again.

As shown in FIG. 13, the method may include the following steps.

S1301: A second transmission chip obtains one or more of an SNR, a BER, or a PER of a current link.

S1302: The second transmission chip sends an interrupt signal to the processing chip.

S1303: The processing chip reads one or more of the SNR, the BER, or the PER based on the interrupt signal.

S1304: The processing chip determines the target value and/or the adjustment value of the data transmission rate based on one or more of the SNR, the BER, or the PER.

S1305: The processing chip sends the target value and/or the adjustment value to the second transmission chip.

S1306: The second transmission chip sends the target value and/or the adjustment value to the first transmission chip.

S1307: The first transmission chip determines the type and the value of the parameter of the sensor based on the target value and/or the adjustment value.

S1308: The first transmission chip configures the type and the value of the parameter of the sensor for the image sensor.

In this embodiment of this application, the first transmission chip may configure the type and the value of the parameter of the sensor through an I2C bus, and the image sensor outputs data based on the configured type and value of the parameter.

S1309: The first transmission chip and the second transmission chip train a channel parameter.

S1310: The second transmission chip sends, to the processing chip, a signal indicating that rate adjustment is completed.

S1311: The second transmission chip sets an interface rate between the second transmission chip and the processing chip based on the target value and/or the adjustment value.

In this embodiment of this application, for S1301 to S1303, refer to the content adaptation descriptions of S1201 to S1203. For S1309 to S1311, refer to the content adaptation descriptions of S306 to S308. Details are not described herein again.

It should be noted that S1301 to S1303, and S1308 to S1311 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, after the processing chip receives the interrupt signal, the processing chip reads one or more of the SNR, the BER, or the PER from the first register of the second transmission chip, the processing chip determines the target value and/or the adjustment value based on one or more of the SNR, the BER, or the PER, and the processing chip sends the target value and/or the adjustment value to the first transmission chip. Further, the first transmission chip determines the type and the value of the parameter of the sensor based on the target value and/or the adjustment value, and the image sensor outputs the data based on the configured type and value of the parameter. This can ensure that the data can still be normally transmitted when a transmission system is interfered, to improve data transmission stability and reliability.

Figure 14:
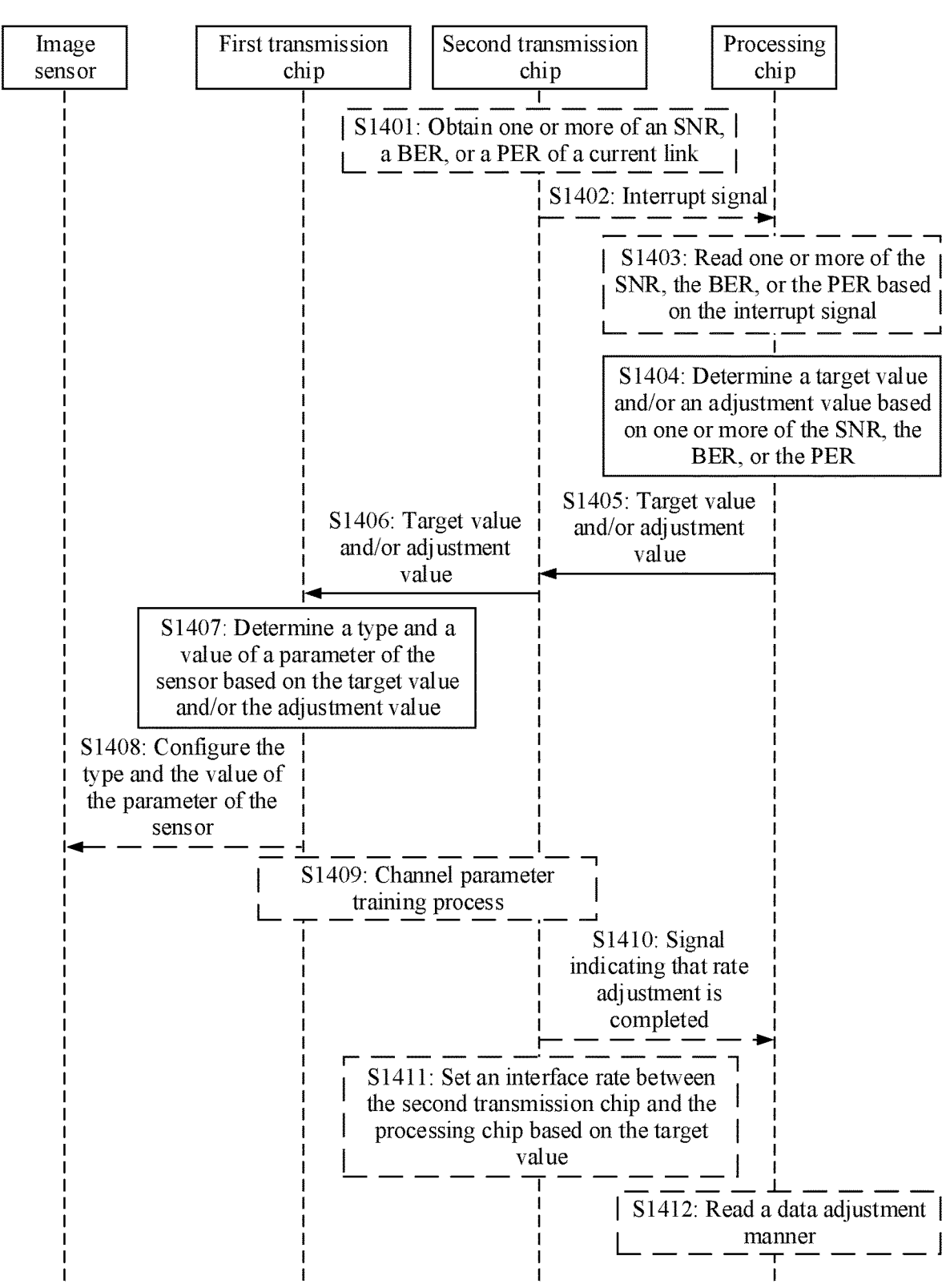
FIG. 14 is a schematic flowchart of a data processing method according to an embodiment of this application.

For example, FIG. 14 is a schematic flowchart of a data processing method according to an embodiment of this application. In the embodiment corresponding to FIG. 14, a processing chip may obtain a target value and/or an adjustment value of a data transmission rate through calculation, and the processing chip sends the target value and/or the adjustment value to a first transmission chip. Further, the first transmission chip determines a data adjustment manner and a type and a value of a parameter of a sensor based on the target value and/or the adjustment value. For a specific implementation in which the first transmission chip determines the data adjustment manner and the type and the value of the parameter of the sensor, refer to the descriptions of the foregoing steps. Details are not described herein again.

As shown in FIG. 14, the method may include the following steps.

S1401: A second transmission chip obtains one or more of an SNR, a BER, or a PER of a current link.

S1402: The second transmission chip sends an interrupt signal to the processing chip.

S1403: The processing chip reads one or more of the SNR, the BER, or the PER based on the interrupt signal.

S1404: The processing chip determines the target value and/or the adjustment value of the data transmission rate based on one or more of the SNR, the BER, or the PER.

S1405: The processing chip sends the target value and/or the adjustment value to the second transmission chip.

S1406: The second transmission chip sends the target value and/or the adjustment value to the first transmission chip.

S1407: The first transmission chip determines the type and the value of the parameter of the sensor based on the target value and/or the adjustment value.

S1408: The first transmission chip configures the type and the value of the parameter of the sensor for the image sensor.

In this embodiment of this application, the first transmission chip may configure the type and the value of the parameter of the sensor through an I2C bus, and the image sensor outputs data based on the configured type and value of the parameter.

S1409: The first transmission chip and the second transmission chip train a channel parameter.

S1410: The second transmission chip sends, to the processing chip, a signal indicating that rate adjustment is completed.

S1411: The second transmission chip sets an interface rate between the second transmission chip and the processing chip based on the target value and/or the adjustment value.

S1412: The processing chip reads the data adjustment manner.

In this embodiment of this application, the processing chip may read the data adjustment manner from the second register, and the processing chip may adaptively adjust, based on the data adjustment manner, a manner of processing data from the second transmission chip.

In this embodiment of this application, for S1401 to S1403, refer to the content adaptation descriptions of S1201 to S1203. For S1409 to S1411, refer to the content adaptation descriptions of S306 to S309. Details are not described herein again.

It should be noted that S1401 to S1403, and S1408 to S1412 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, after the processing chip receives the interrupt signal, the processing chip reads one or more of the SNR, the BER, or the PER from the first register of the second transmission chip, the processing chip determines the target value and/or the adjustment value based on one or more of the SNR, the BER, or the PER, and the processing chip sends the target value and/or the adjustment value to the first transmission chip. Further, the first transmission chip determines the data adjustment manner and the type and the value of the parameter of the sensor based on the target value and/or the adjustment value, the image sensor outputs the data based on the configured type and value of the parameter, and the output data is further adjusted based on the data adjustment manner. This can ensure that the data can still be normally transmitted when a transmission system is interfered, to improve data transmission stability and reliability.

Figure 15:
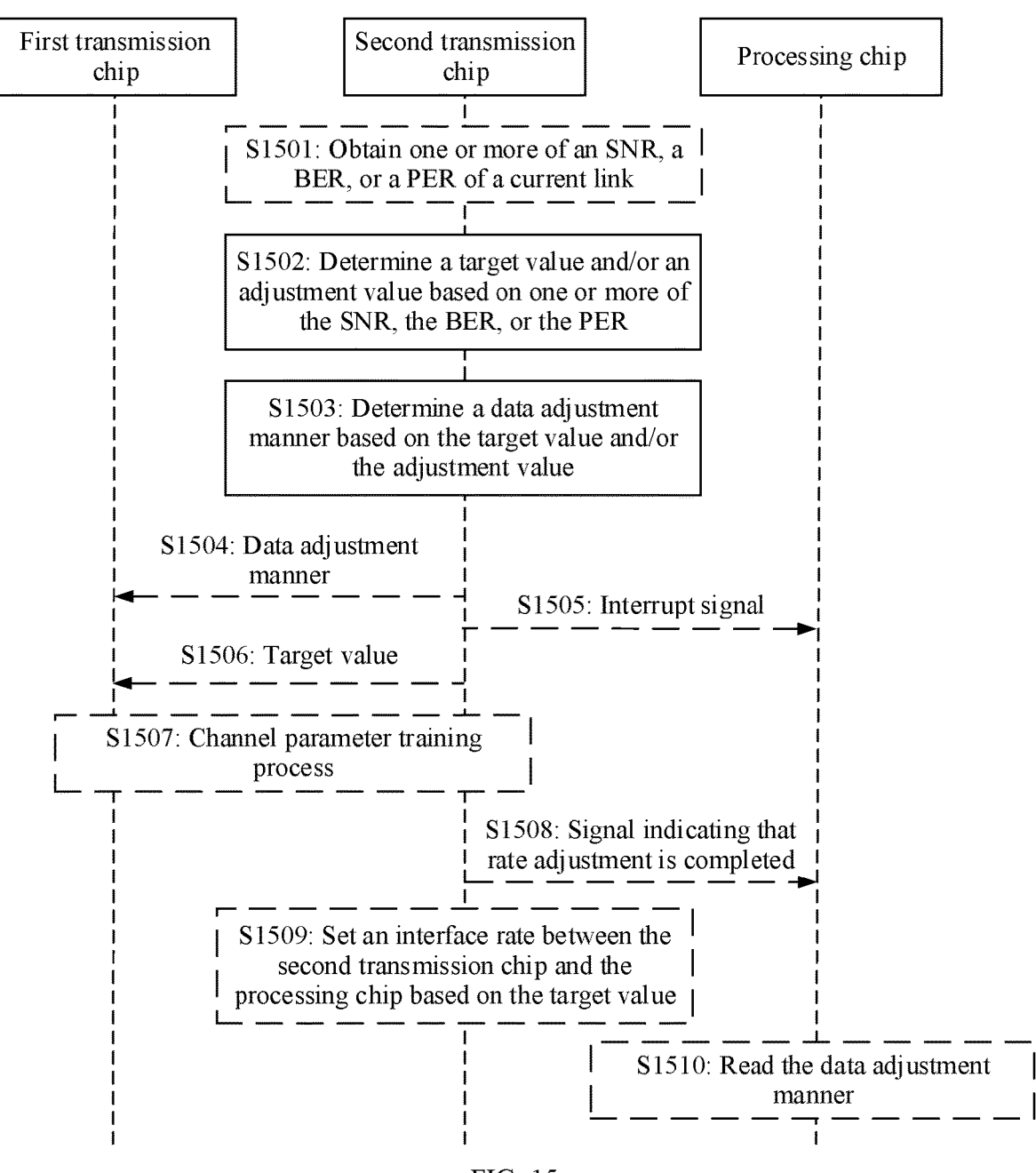
FIG. 15 is a schematic flowchart of a data processing method according to an embodiment of this application.

For example, FIG. 15 is a schematic flowchart of a data processing method according to an embodiment of this application. In the embodiment corresponding to FIG. 15, a second transmission chip may obtain a target value and/or an adjustment value of a data transmission rate through calculation. Further, the second transmission chip determines a data adjustment manner based on the target value and/or the adjustment value. For a specific implementation in which the second transmission chip determines the data adjustment manner, refer to the descriptions of the foregoing steps. Details are not described herein again.

As shown in FIG. 15, the method may include the following steps.

S1501: The second transmission chip obtains one or more of an SNR, a BER, or a PER.

S1502: The second transmission chip determines the target value and/or the adjustment value of the data transmission rate based on one or more of the obtained SNR, BER, or PER.

In this embodiment of this application, when a first condition is met, the second transmission chip may determine the target value and/or the adjustment value based on one or more of the obtained SNR, BER, or PER. For a manner in which the second transmission chip determines the target value and/or the adjustment value, refer to the descriptions of the foregoing steps. Details are not described herein again.

S1503: The second transmission chip determines the data adjustment manner based on the target value and/or the adjustment value.

In this embodiment of this application, the second transmission chip may store the data adjustment manner in a second register, and a processing chip may subsequently read the data adjustment manner from the second register.

S1504: The second transmission chip sends the data adjustment manner to a first transmission chip.

In this embodiment of this application, when the second transmission chip sends the data adjustment manner to the first transmission chip, the data adjustment manner may be carried at a physical layer, or may be carried at a MAC layer or above the MAC layer.

S1505: The second transmission chip sends an interrupt signal to the processing chip.

For example, the second transmission chip may send the interrupt signal to the processing chip through a GPIO interface.

S1506: The second transmission chip sends the target value to the first transmission chip.

In this embodiment of this application, when the second transmission chip sends the target value to the first transmission chip, the target value may be carried at the physical layer, or may be carried at the MAC layer or above the MAC layer.

In this embodiment of this application, the first transmission chip and the second transmission chip may train a channel parameter based on the target value.

S1507: The first transmission chip and the second transmission chip train the channel parameter.

S1508: The second transmission chip sends, to the processing chip, a signal indicating that rate adjustment is completed.

S1509: The second transmission chip sets an interface rate between the second transmission chip and the processing chip based on the target value.

S1510: The processing chip reads the data adjustment manner.

In this embodiment of this application, for S1507 to S1510, refer to the content adaptation descriptions of S306 to S309. Details are not described herein again.

It should be noted that S1501, and S1504 to S1510 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, the second transmission chip obtains one or more of the SNR, the BER, or the PER of the current link. When the first condition is met, the second transmission chip determines the target value and/or the adjustment value based on one or more of the obtained SNR, BER, or PER. Further, the second transmission chip determines the data adjustment manner based on the target value and/or the adjustment value, and data output by an image sensor may be adjusted based on the data adjustment manner. This can ensure that the data can still be normally transmitted when a transmission system is interfered, to improve data transmission stability and reliability.

Figure 16:
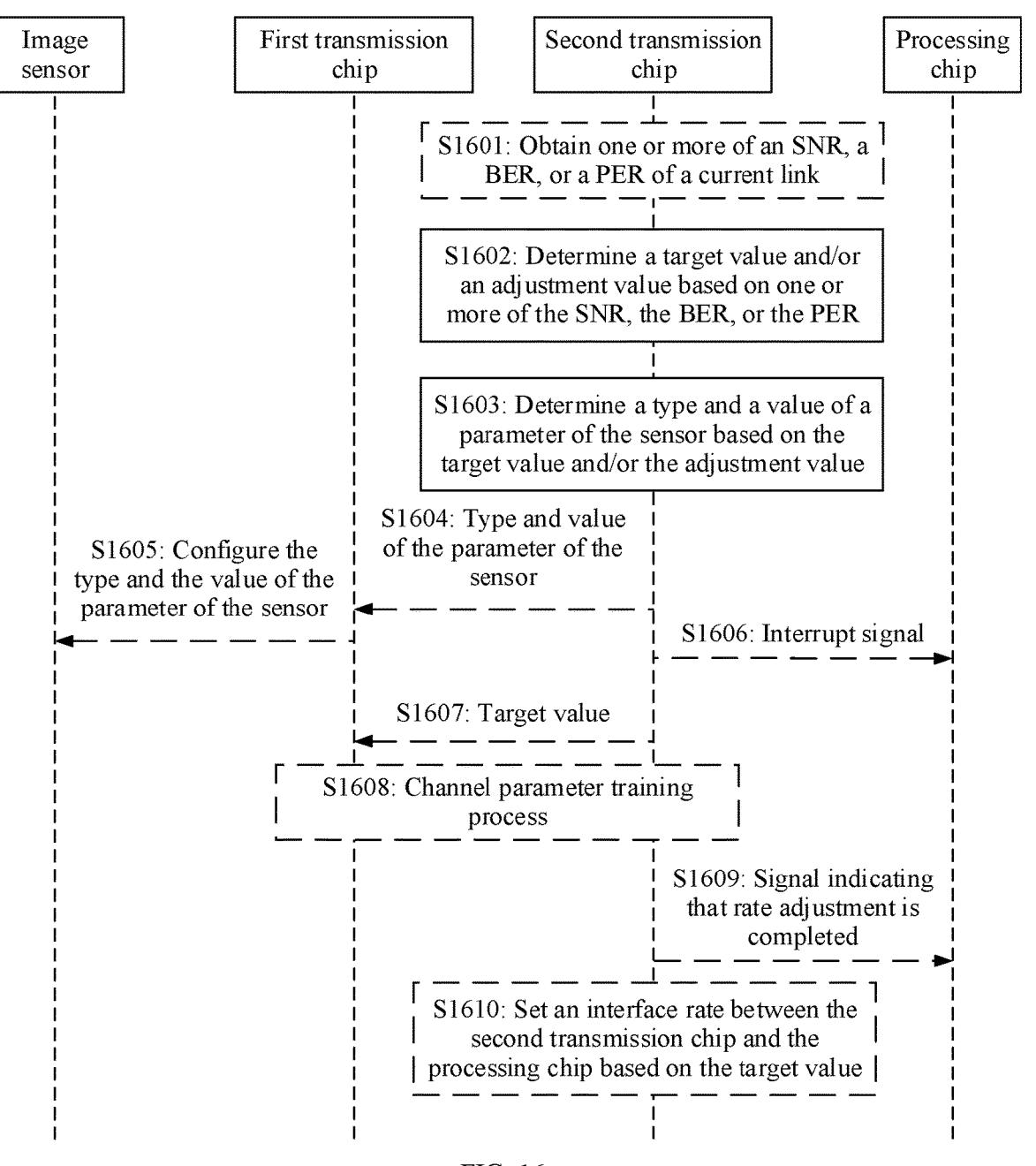
FIG. 16 is a schematic flowchart of a data processing method according to an embodiment of this application.

For example, FIG. 16 is a schematic flowchart of a data processing method according to an embodiment of this application. In the embodiment corresponding to FIG. 16, a second transmission chip may obtain a target value and/or an adjustment value of a data transmission rate through calculation. Further, the second transmission chip determines a type and a value of a parameter of a sensor based on the target value and/or the adjustment value. For a specific implementation in which the second transmission chip determines the type and the value of the parameter of the sensor, refer to the descriptions of the foregoing steps. Details are not described herein again.

As shown in FIG. 16, the method may include the following steps.

S1601: The second transmission chip obtains one or more of an SNR, a BER, or a PER.

S1602: The second transmission chip determines the target value and/or the adjustment value of the data transmission rate based on one or more of the obtained SNR, BER, or PER.

S1603: The second transmission chip determines the type and the value of the parameter of the sensor based on the target value and/or the adjustment value.

S1604: The second transmission chip sends the type and the value of the parameter of the sensor to a first transmission chip.

In this embodiment of this application, when the second transmission chip sends the type and the value of the parameter of the sensor to the first transmission chip, the type and the value of the parameter of the sensor may be carried at a physical layer, or may be carried at a MAC layer or above the MAC layer.

S1605: The first transmission chip configures the type and the value of the parameter of the sensor for the image sensor.

In this embodiment of this application, the first transmission chip may configure the type and the value of the parameter of the sensor through an I2C bus, and the image sensor outputs data based on the configured type and value of the parameter.

S1606: The second transmission chip sends an interrupt signal to a processing chip.

S1607: The second transmission chip sends the target value to the first transmission chip.

S1608: The first transmission chip and the second transmission chip train a channel parameter.

S1609: The second transmission chip sends, to the processing chip, a signal indicating that rate adjustment is completed.

S1610: The second transmission chip sets an interface rate between the second transmission chip and the processing chip based on the target value.

In this embodiment of this application, for S1601 to S1607, refer to the content adaptation descriptions of S1501 to S1506. For S1608 to S1610, refer to the content adaptation descriptions of S306 to S308. Details are not described herein again.

It should be noted that S1601, and S1604 to S1610 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, the second transmission chip obtains one or more of the SNR, the BER, or the PER. When the first condition is met, the second transmission chip determines the target value and/or the adjustment value based on one or more of the obtained SNR, BER, or PER. Further, the second transmission chip determines the type and the value of the parameter of the sensor based on the target value and/or the adjustment value, and the image sensor outputs the data based on the configured type and value of the parameter. This can ensure that the data can still be normally transmitted when a transmission system is interfered, to improve data transmission stability and reliability.

Figure 17:
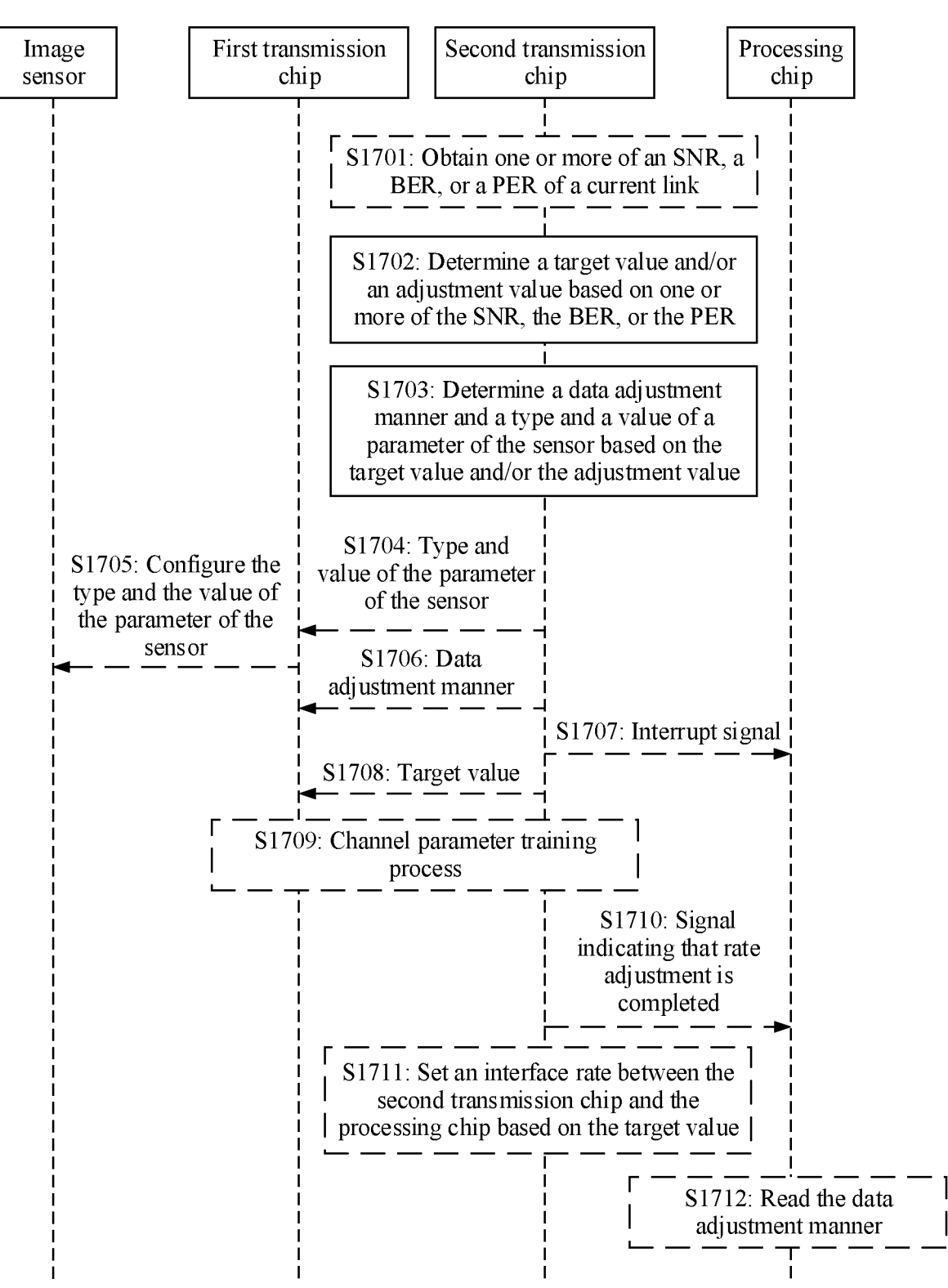
FIG. 17 is a schematic flowchart of a data processing method according to an embodiment of this application.

For example, FIG. 17 is a schematic flowchart of a data processing method according to an embodiment of this application. In the embodiment corresponding to FIG. 17, a second transmission chip may obtain a target value and/or an adjustment value of a data transmission rate through calculation. Further, the second transmission chip determines a data adjustment manner and a type and a value of a parameter of a sensor based on the target value and/or the adjustment value. For a specific implementation in which the second transmission chip determines the data adjustment manner and the type and the value of the parameter of the sensor, refer to the descriptions of the foregoing steps. Details are not described herein again.

As shown in FIG. 17, the method may include the following steps.

S1701: The second transmission chip obtains one or more of an SNR, a BER, or a PER.

S1702: The second transmission chip determines the target value and/or the adjustment value of the data transmission rate based on one or more of the obtained SNR, BER, or PER.

S1703: The second transmission chip determines the data adjustment manner and the type and the value of the parameter of the sensor based on the target value and/or the adjustment value.

In this embodiment of this application, the second transmission chip may store the data adjustment manner in a second register, and a processing chip may subsequently read the data adjustment manner from the second register.

S1704: The second transmission chip sends the type and the value of the parameter of the sensor to a first transmission chip.

S1705: The first transmission chip configures the type and the value of the parameter of the sensor for the image sensor.

S1706: The second transmission chip sends the data adjustment manner to the first transmission chip.

S1707: The second transmission chip sends an interrupt signal to the processing chip.

S1708: The second transmission chip sends the target value to the first transmission chip.

S1709: The first transmission chip and the second transmission chip train a channel parameter.

S1710: The second transmission chip sends, to the processing chip, a signal indicating that rate adjustment is completed.

S1711: The second transmission chip sets an interface rate between the second transmission chip and the processing chip based on the target value.

S1712: The processing chip reads the data adjustment manner.

In this embodiment of this application, for S1701 to S1703, refer to the content adaptation descriptions of S1501 to S1503. For S1704 and S1705, refer to the content adaptation descriptions of S1604 and S1605. For S1706 to S1708, refer to the content adaptation descriptions of S1504 to S1506. For S1709 to S1712, refer to the content adaptation descriptions of S306 to S309. Details are not described herein again.

It should be noted that S1701, and S1704 to S1712 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, the second transmission chip obtains one or more of the SNR, the BER, or the PER. When the first condition is met, the second transmission chip determines the target value and/or the adjustment value based on one or more of the obtained SNR, BER, or PER. Further, the second transmission chip determines the data adjustment manner and the type and the value of the parameter of the sensor based on the target value and/or the adjustment value, the image sensor outputs the data based on the configured type and value of the parameter, and the output data is further adjusted based on the data adjustment manner. This can ensure that the data can still be normally transmitted when a transmission system is interfered, to improve data transmission stability and reliability.

Figure 18:
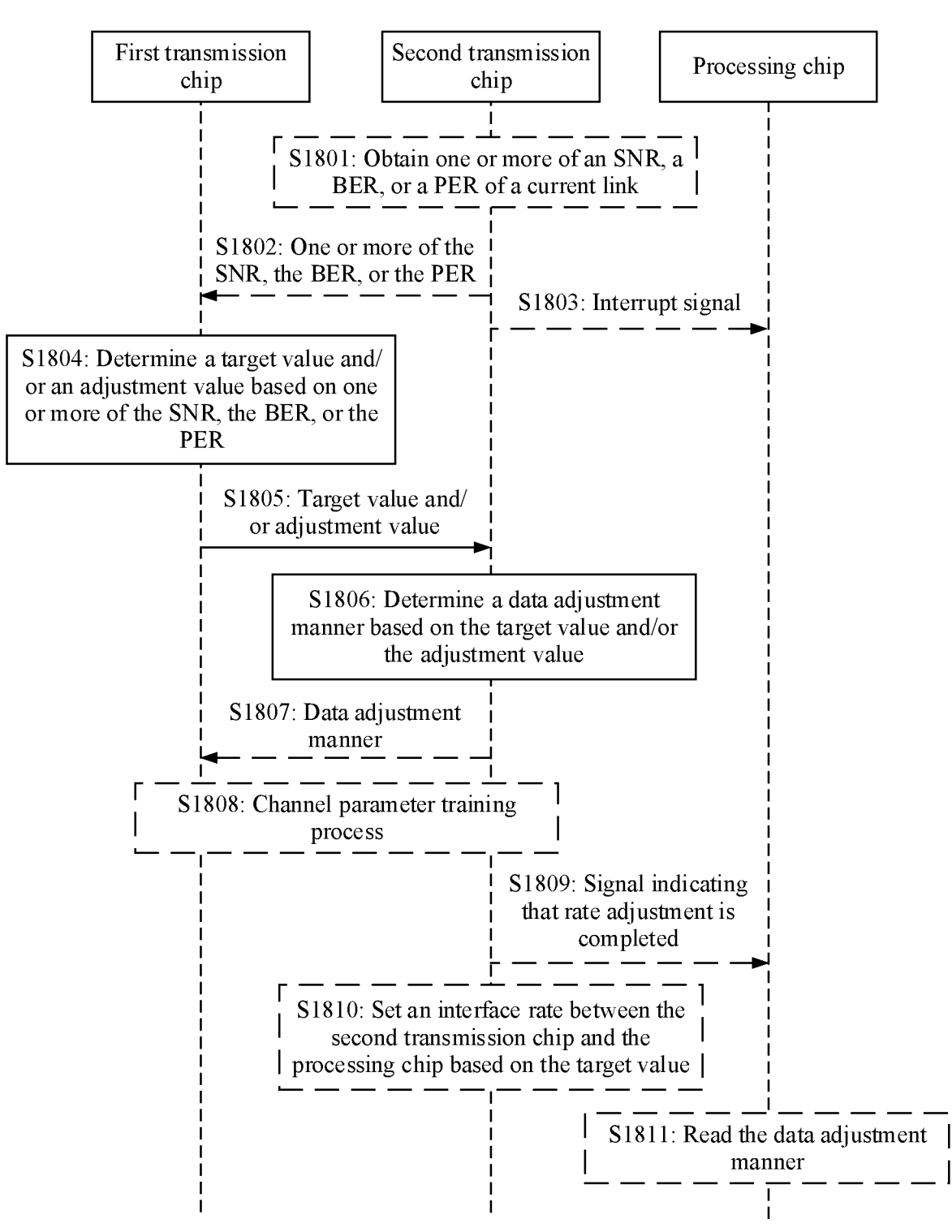
FIG. 18 is a schematic flowchart of a data processing method according to an embodiment of this application.

For example, FIG. 18 is a schematic flowchart of a data processing method according to an embodiment of this application. In the embodiment corresponding to FIG. 18, a first transmission chip may obtain a target value and/or an adjustment value of a data transmission rate through calculation, and the first transmission chip sends the target value and/or the adjustment value to a second transmission chip. Further, the second transmission chip determines a data adjustment manner based on the target value and/or the adjustment value. For a specific implementation in which the second transmission chip determines the data adjustment manner, refer to the descriptions of the foregoing steps. Details are not described herein again.

As shown in FIG. 18, the method may include the following steps.

S1801: The second transmission chip obtains one or more of an SNR, a BER, or a PER of a current link.

S1802: The second transmission chip sends one or more of the SNR, the BER, or the PER to the first transmission chip.

In this embodiment of this application, when a first condition is met, the second transmission chip sends one or more of the SNR, the BER, or the PER to the first transmission chip. For specific content of the first condition, refer to the descriptions of the foregoing steps. Details are not described herein again.

In this embodiment of this application, when the second transmission chip sends one or more of the SNR, the BER, or the PER to the first transmission chip, one or more of the SNR, the BER, or the PER may be carried at a physical layer, or may be carried at a MAC layer or above the MAC layer.

S1803: The second transmission chip sends an interrupt signal to a processing chip.

For example, the second transmission chip may send the interrupt signal to the processing chip through a GPIO interface.

S1804: The first transmission chip determines the target value and/or the adjustment value of the data transmission rate based on one or more of the SNR, the BER, or the PER.

S1805: The first transmission chip sends the target value and/or the adjustment value to the second transmission chip.

S1806: The second transmission chip determines the data adjustment manner based on the target value and/or the adjustment value.

In this embodiment of this application, the second transmission chip may store the data adjustment manner in a second register, and the processing chip may subsequently read the data adjustment manner from the second register.

S1807: The second transmission chip sends the data adjustment manner to the first transmission chip.

In this embodiment of this application, when the second transmission chip sends the data adjustment manner to the first transmission chip, the data adjustment manner may be carried at the physical layer, or may be carried at the MAC layer or above the MAC layer.

S1808: The first transmission chip and the second transmission chip train a channel parameter.

S1809: The second transmission chip sends, to the processing chip, a signal indicating that rate adjustment is completed.

S1810: The second transmission chip sets an interface rate between the second transmission chip and the processing chip based on the target value.

S1811: The processing chip reads the data adjustment manner.

In this embodiment of this application, for S1808 to S1811, refer to the content adaptation descriptions of S306 to S309. Details are not described herein again.

It should be noted that S1801 to S1803, and S1807 to S1811 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, the second transmission chip obtains one or more of the SNR, the BER, or the PER of the current link. When the first condition is met, the second transmission chip sends one or more of the SNR, the BER, or the PER to the first transmission chip, the first transmission chip determines the target value and/or the adjustment value based on one or more of the SNR, the BER, or the PER, and the first transmission chip sends the target value and/or the adjustment value to the second transmission chip. Further, the second transmission chip determines the data adjustment manner based on the target value and/or the adjustment value, and data output by an image sensor may be adjusted based on the data adjustment manner. This can ensure that the data can still be normally transmitted when a transmission system is interfered, to improve data transmission stability and reliability.

Figure 19:
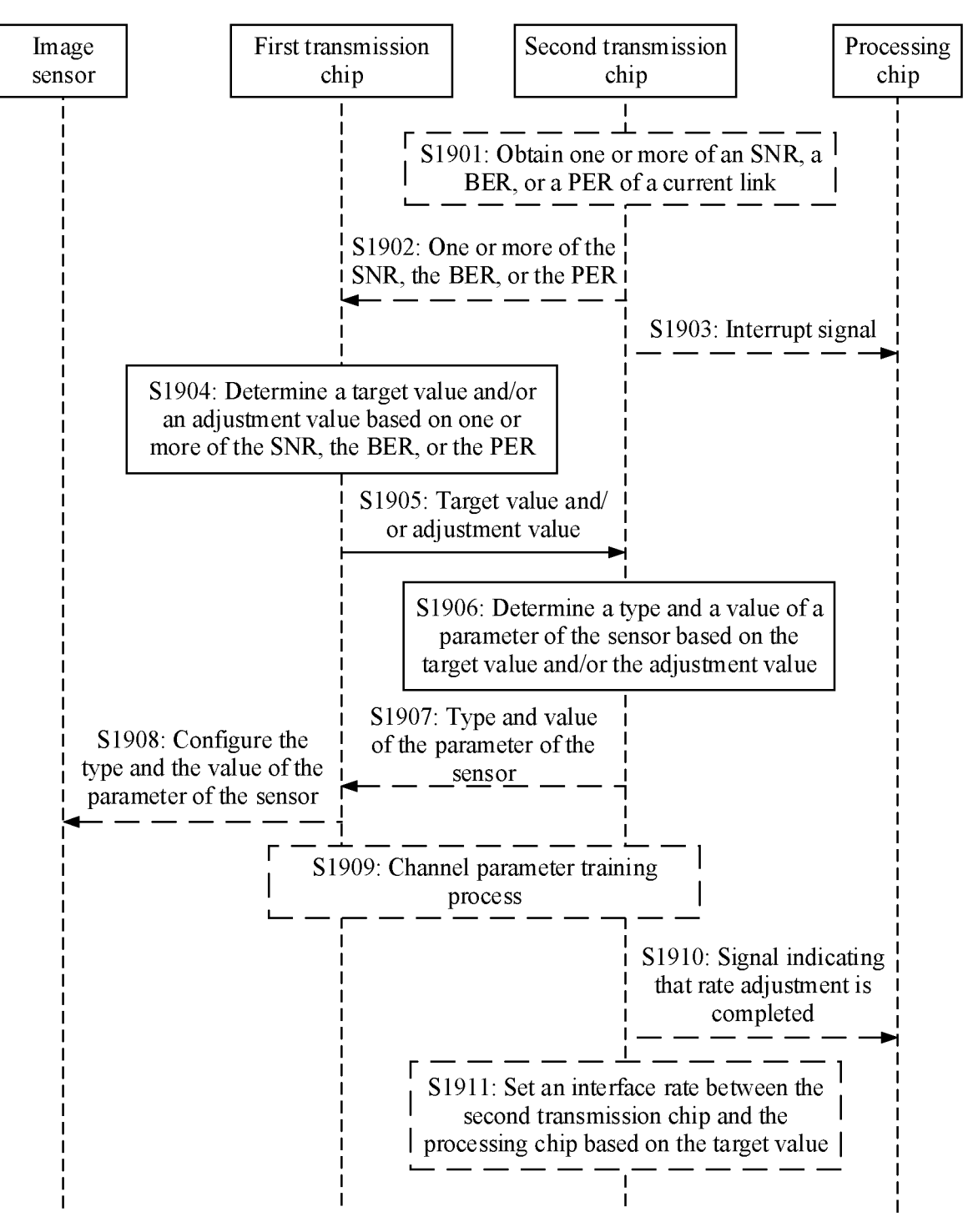
FIG. 19 is a schematic flowchart of a data processing method according to an embodiment of this application.

For example, FIG. 19 is a schematic flowchart of a data processing method according to an embodiment of this application. In the embodiment corresponding to FIG. 19, a first transmission chip may obtain a target value and/or an adjustment value of a data transmission rate through calculation, and the first transmission chip sends the target value and/or the adjustment value to a second transmission chip. Further, the second transmission chip determines a type and a value of a parameter of a sensor based on the target value and/or the adjustment value. For a specific implementation in which the second transmission chip determines the type and the value of the parameter of the sensor, refer to the descriptions of the foregoing steps. Details are not described herein again.

As shown in FIG. 19, the method may include the following steps.

S1901: The second transmission chip obtains one or more of an SNR, a BER, or a PER of a current link.

S1902: The second transmission chip sends one or more of the SNR, the BER, or the PER to the first transmission chip.

S1903: The second transmission chip sends an interrupt signal to a processing chip.

S1904: The first transmission chip determines the target value and/or the adjustment value of the data transmission rate based on one or more of the SNR, the BER, or the PER.

S1905: The first transmission chip sends the target value and/or the adjustment value to the second transmission chip.

S1906: The second transmission chip determines the type and the value of the parameter of the sensor based on the target value and/or the adjustment value.

S1907: The second transmission chip sends the type and the value of the parameter of the sensor to the first transmission chip.

In this embodiment of this application, when the second transmission chip sends the type and the value of the parameter of the sensor to the first transmission chip, the type and the value of the parameter of the sensor may be carried at a physical layer, or may be carried at a MAC layer or above the MAC layer.

S1908: The first transmission chip configures the type and the value of the parameter of the sensor for the image sensor.

In this embodiment of this application, the first transmission chip may configure the type and the value of the parameter of the sensor through an I2C bus, and the image sensor outputs data based on the configured type and value of the parameter.

S1909: The first transmission chip and the second transmission chip train a channel parameter.

S1910: The second transmission chip sends, to the processing chip, a signal indicating that rate adjustment is completed.

S1911: The second transmission chip sets an interface rate between the second transmission chip and the processing chip based on the target value.

In this embodiment of this application, for S1901 to S1903, refer to the content adaptation descriptions of S1801 to S1803. For S1909 to S1911, refer to the content adaptation descriptions of S306 to S1308. Details are not described herein again.

It should be noted that S1901 to S1903, and S1907 to S1911 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, the second transmission chip obtains one or more of the SNR, the BER, or the PER of the current link. When the first condition is met, the second transmission chip sends one or more of the SNR, the BER, or the PER to the first transmission chip, the first transmission chip determines the target value and/or the adjustment value based on one or more of the SNR, the BER, or the PER, and the first transmission chip sends the target value and/or the adjustment value to the second transmission chip. Further, the second transmission chip determines the type and the value of the parameter of the sensor based on the target value and/or the adjustment value, and the image sensor outputs the data based on the configured type and value of the parameter. This can ensure that the data can still be normally transmitted when a transmission system is interfered, to improve data transmission stability and reliability.

Figure 20:
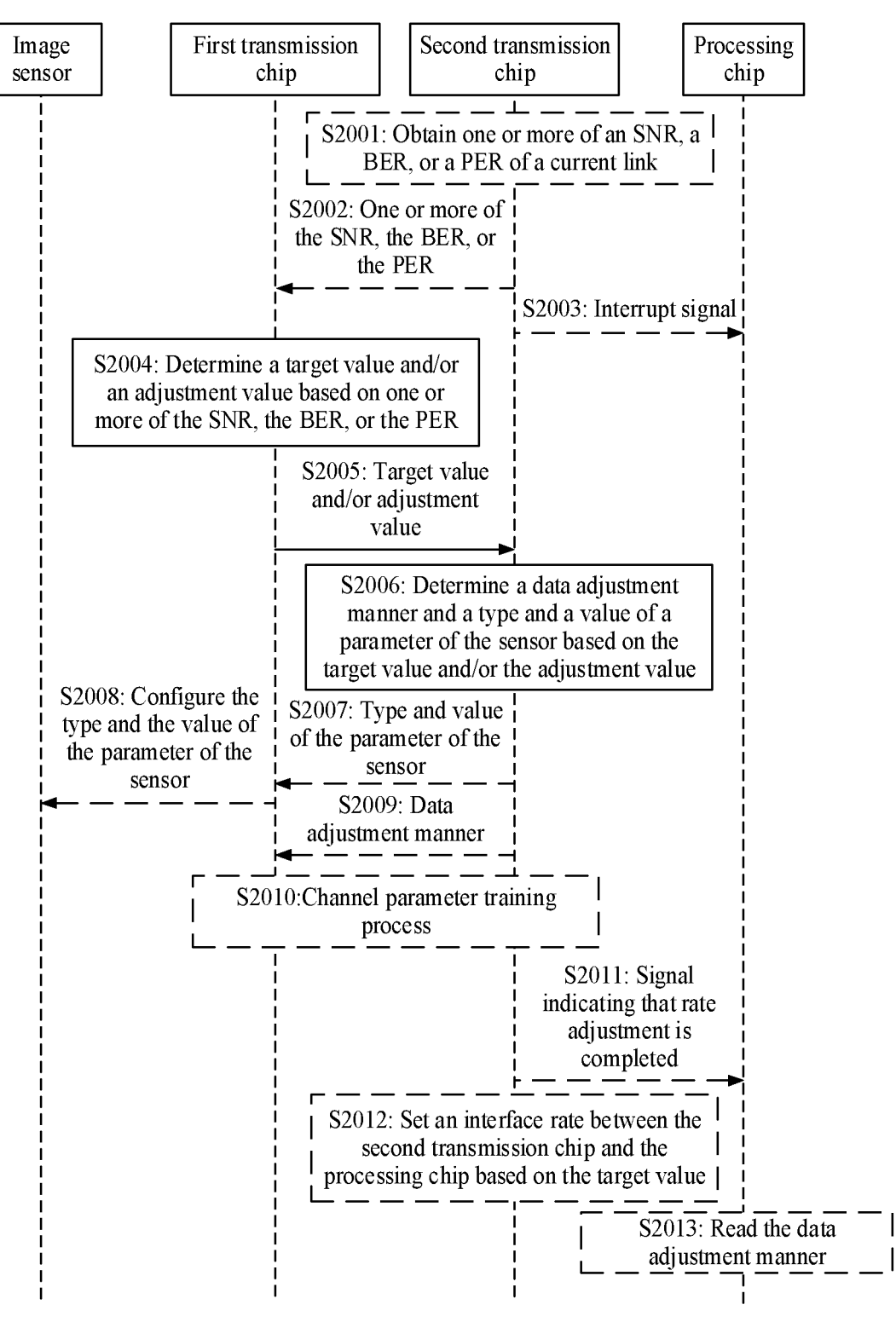
FIG. 20 is a schematic flowchart of a data processing method according to an embodiment of this application.

For example, FIG. 20 is a schematic flowchart of a data processing method according to an embodiment of this application. In the embodiment corresponding to FIG. 17, a first transmission chip may obtain a target value and/or an adjustment value of a data transmission rate through calculation, and the first transmission chip sends the target value and/or the adjustment value to a second transmission chip. Further, the second transmission chip determines a data adjustment manner and a type and a value of a parameter of a sensor based on the target value and/or the adjustment value. For a specific implementation in which the second transmission chip determines the data adjustment manner and the type and the value of the parameter of the sensor, refer to the descriptions of the foregoing steps. Details are not described herein again.

As shown in FIG. 20, the method may include the following steps.

S2001: The second transmission chip obtains one or more of an SNR, a BER, or a PER of a current link.

S2002: The second transmission chip sends one or more of the SNR, the BER, or the PER to the first transmission chip.

S2003: The second transmission chip sends an interrupt signal to a processing chip.

S2004: The first transmission chip determines the target value and/or the adjustment value of the data transmission rate based on one or more of the SNR, the BER, or the PER.

S2005: The first transmission chip sends the target value and/or the adjustment value to the second transmission chip.

S2006: The second transmission chip determines the data adjustment manner and the type and the value of the parameter of the sensor based on the target value and/or the adjustment value.

In this embodiment of this application, the second transmission chip may store the data adjustment manner in a second register, and the processing chip may subsequently read the data adjustment manner from the second register.

S2007: The second transmission chip sends the type and the value of the parameter of the sensor to the first transmission chip.

S2008: The first transmission chip configures the type and the value of the parameter of the sensor for the image sensor.

S2009: The second transmission chip sends the data adjustment manner to the first transmission chip.

S2010: The first transmission chip and the second transmission chip train a channel parameter.

S2011: The second transmission chip sends, to the processing chip, a signal indicating that rate adjustment is completed.

S2012: The second transmission chip sets an interface rate between the second transmission chip and the processing chip based on the target value.

S2013: The processing chip reads the data adjustment manner.

In this embodiment of this application, for S2001 to S2003, refer to the content adaptation descriptions of S1801 to S1803. For S2007 and S2008, refer to the content adaptation descriptions of S1907 and S1908. For S2010 to S2013, refer to the content adaptation descriptions of S306 to S309. Details are not described herein again.

It should be noted that S2001 to S2003, and S2007 to S2013 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, the second transmission chip obtains one or more of the SNR, the BER, or the PER of the current link. When the first condition is met, the second transmission chip sends one or more of the SNR, the BER, or the PER to the first transmission chip, the first transmission chip determines the target value and/or the adjustment value based on one or more of the SNR, the BER, or the PER, and the first transmission chip sends the target value and/or the adjustment value to the second transmission chip. Further, the second transmission chip determines the data adjustment manner and the type and the value of the parameter of the sensor based on the target value and/or the adjustment value, the image sensor outputs the data based on the configured type and value of the parameter, and the output data is further adjusted based on the data adjustment manner. This can ensure that the data can still be normally transmitted when a transmission system is interfered, to improve data transmission stability and reliability.

Figure 21:
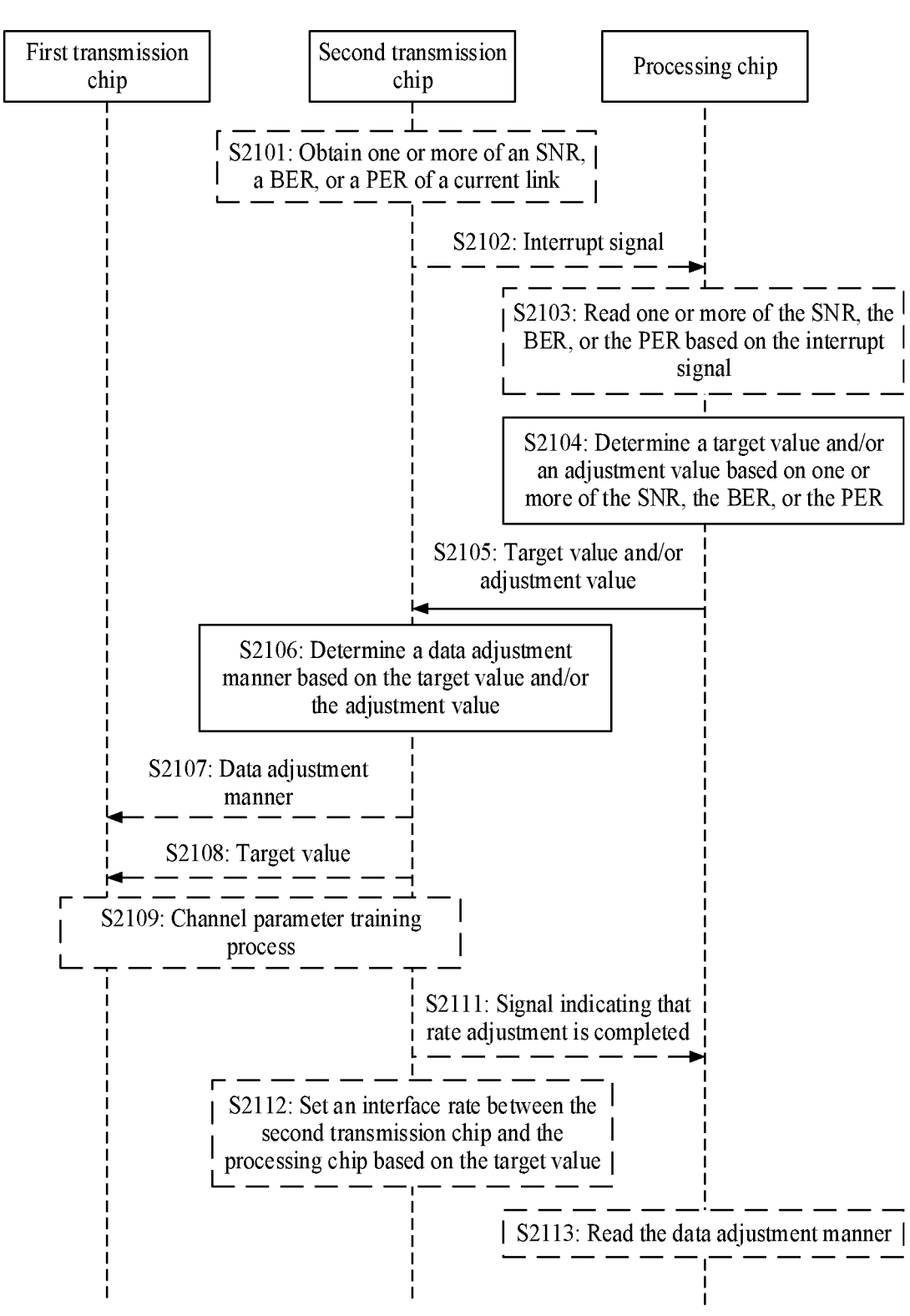
FIG. 21 is a schematic flowchart of a data processing method according to an embodiment of this application.

For example, FIG. 21 is a schematic flowchart of a data processing method according to an embodiment of this application. In the embodiment corresponding to FIG. 21, a processing chip may obtain a target value and/or an adjustment value of a data transmission rate through calculation, and the processing chip sends the target value and/or the adjustment value to a second transmission chip. Further, the second transmission chip determines a data adjustment manner based on the target value and/or the adjustment value. For a specific implementation in which the second transmission chip determines the data adjustment manner, refer to the descriptions of the foregoing steps. Details are not described herein again.

As shown in FIG. 21, the method may include the following steps.

S2101: The second transmission chip obtains one or more of an SNR, a BER, or a PER of a current link.

In this embodiment of this application, the second transmission chip stores one or more of the obtained SNR, BER, or PER in a first register, and the processing chip may subsequently read one or more of the SNR, BER, or PER from the first register.

S2102: The second transmission chip sends an interrupt signal to the processing chip.

For example, the second transmission chip may send the interrupt signal to the processing chip through a GPIO interface.

S2103: The processing chip reads one or more of the SNR, the BER, or the PER based on the interrupt signal.

In this embodiment of this application, after the processing chip receives the interrupt signal, the processing chip may read one or more of the SNR, the BER, or the PER from the first register of the second transmission chip, and the processing chip may determine the target value and/or the adjustment value based on one or more of the SNR, the BER, or the PER.

S2104: The processing chip determines the target value and/or the adjustment value of the data transmission rate based on one or more of the SNR, the BER, or the PER.

S2105: The processing chip sends the target value and/or the adjustment value to the second transmission chip.

In this embodiment of this application, the processing chip may send the target value and/or the adjustment value through an I2C bus.

S2106: The second transmission chip determines the data adjustment manner based on the target value and/or the adjustment value.

In this embodiment of this application, the second transmission chip may store the data adjustment manner in a second register, and the processing chip may subsequently read the data adjustment manner from the second register.

S2107: The second transmission chip sends the data adjustment manner to a first transmission chip.

In this embodiment of this application, when the second transmission chip sends the data adjustment manner to the first transmission chip, the data adjustment manner may be carried at a physical layer, or may be carried at a MAC layer or above the MAC layer.

S2108: The second transmission chip sends the target value to the first transmission chip.

In this embodiment of this application, when the second transmission chip sends the target value to the first transmission chip, the target value may be carried at the physical layer, or may be carried at the MAC layer or above the MAC layer.

In this embodiment of this application, the first transmission chip and the second transmission chip may train a channel parameter based on the target value.

S2109: The first transmission chip and the second transmission chip train the channel parameter.

S2110: The second transmission chip sends, to the processing chip, a signal indicating that rate adjustment is completed.

S2111: The second transmission chip sets an interface rate between the second transmission chip and the processing chip based on the target value.

S2112: The processing chip reads the data adjustment manner.

In this embodiment of this application, for S2109 to S2112, refer to the content adaptation descriptions of S306 to S309. Details are not described herein again.

It should be noted that S2101 to S2103, and S2107 to S2113 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, after the processing chip receives the interrupt signal, the processing chip reads one or more of the SNR, the BER, or the PER from the first register of the second transmission chip, the processing chip determines the target value and/or the adjustment value of the data transmission rate based on one or more of the SNR, the BER, or the PER, and the processing chip sends the target value and/or the adjustment value to the second transmission chip. Further, the second transmission chip determines the data adjustment manner based on the target value and/or the adjustment value, and data output by an image sensor may be adjusted based on the data adjustment manner. This can ensure that the data can still be normally transmitted when a transmission system is interfered, to improve data transmission stability and reliability.

Figure 22:
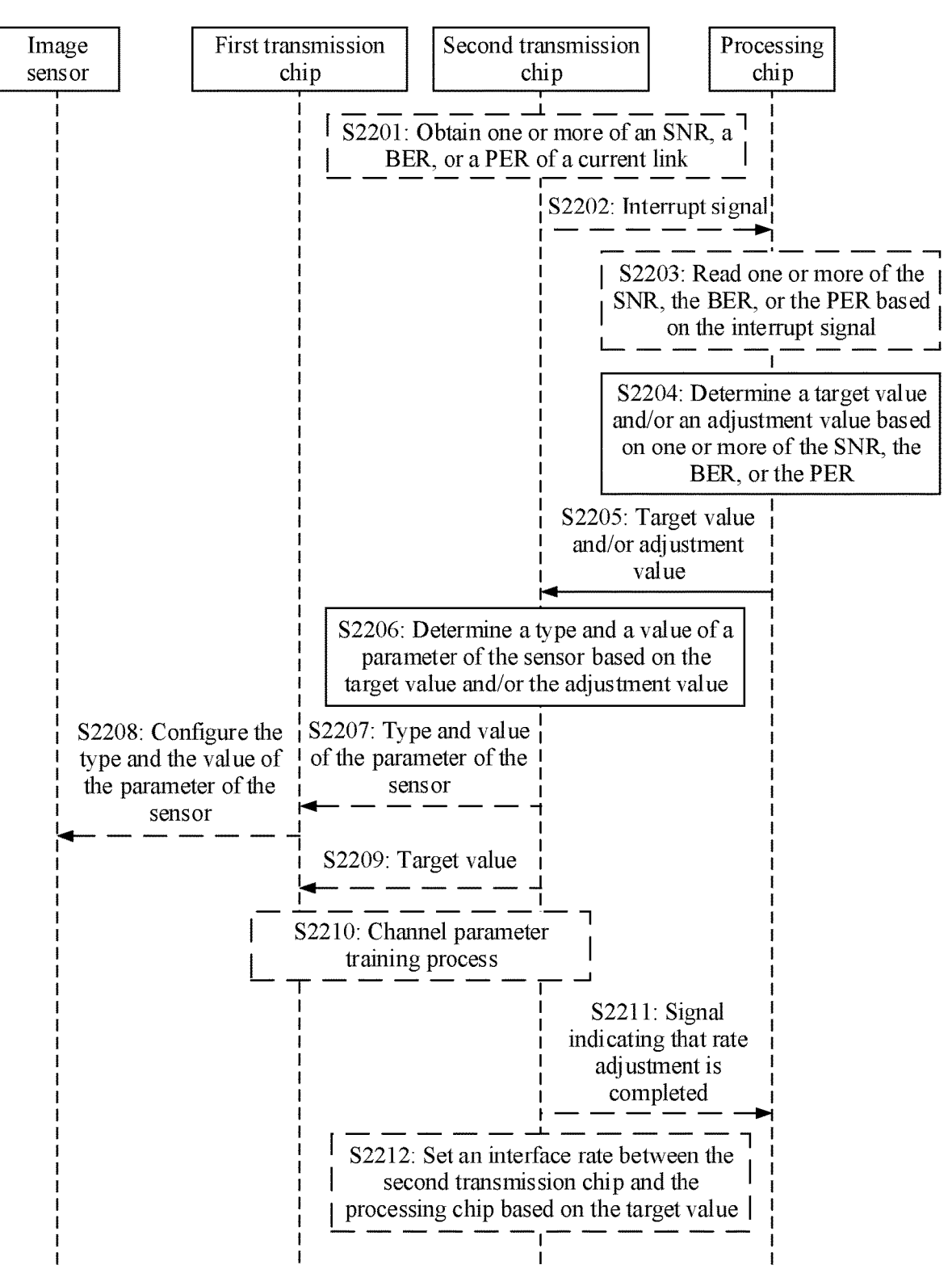
FIG. 22 is a schematic flowchart of a data processing method according to an embodiment of this application.

For example, FIG. 22 is a schematic flowchart of a data processing method according to an embodiment of this application. In the embodiment corresponding to FIG. 22, a processing chip may obtain a target value and/or an adjustment value of a data transmission rate through calculation, and the processing chip sends the target value and/or the adjustment value to a second transmission chip. Further, the second transmission chip determines a type and a value of a parameter of a sensor based on the target value and/or the adjustment value. For a specific implementation in which the second transmission chip determines the type and the value of the parameter of the sensor, refer to the descriptions of the foregoing steps. Details are not described herein again.

As shown in FIG. 22, the method may include the following steps.

S2201: The second transmission chip obtains one or more of an SNR, a BER, or a PER of a current link.

S2202: The second transmission chip sends an interrupt signal to the processing chip.

S2203: The processing chip reads one or more of the SNR, the BER, or the PER based on the interrupt signal.

S2204: The processing chip determines the target value and/or the adjustment value of the data transmission rate based on one or more of the SNR, the BER, or the PER.

S2205: The processing chip sends the target value and/or the adjustment value to the second transmission chip.

S2206: The second transmission chip determines the type and the value of the parameter of the sensor based on the target value and/or the adjustment value.

S2207: The second transmission chip sends the type and the value of the parameter of the sensor to a first transmission chip.

In this embodiment of this application, when the second transmission chip sends the type and the value of the parameter of the sensor to the first transmission chip, the type and the value of the parameter of the sensor may be carried at a physical layer, or may be carried at a MAC layer or above the MAC layer.

S2208: The first transmission chip configures the parameter of the sensor for the image sensor.

In this embodiment of this application, the first transmission chip may configure the parameter of the sensor through an I2C bus, and the image sensor outputs data based on the configured type and value of the parameter.

S2209: The second transmission chip sends the target value to the first transmission chip.

S2210: The first transmission chip and the second transmission chip train a channel parameter.

S2211: The second transmission chip sends, to the processing chip, a signal indicating that rate adjustment is completed.

S2212: The second transmission chip sets an interface rate between the second transmission chip and the processing chip based on the target value.

In this embodiment of this application, for S2201 to S2203, refer to the content adaptation descriptions of S2101 to S2103. For S2209, refer to the content adaptation descriptions of S2108. For S2210 to S2212, refer to the content adaptation descriptions of S306 to S308. Details are not described herein again.

It should be noted that S2201 to S2203, and S2207 to S2212 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, after the processing chip receives the interrupt signal, the processing chip reads one or more of the SNR, the BER, or the PER from the first register of the second transmission chip, the processing chip determines the target value and/or the adjustment value of the data transmission rate based on one or more of the SNR, the BER, or the PER, and the processing chip sends the target value and/or the adjustment value to the second transmission chip. Further, the second transmission chip determines the type and the value of the parameter of the sensor based on the target value and/or the adjustment value, and the image sensor outputs the data based on the configured type and value of the parameter. This can ensure that the data can still be normally transmitted when a transmission system is interfered, to improve data transmission stability and reliability.

Figure 23:
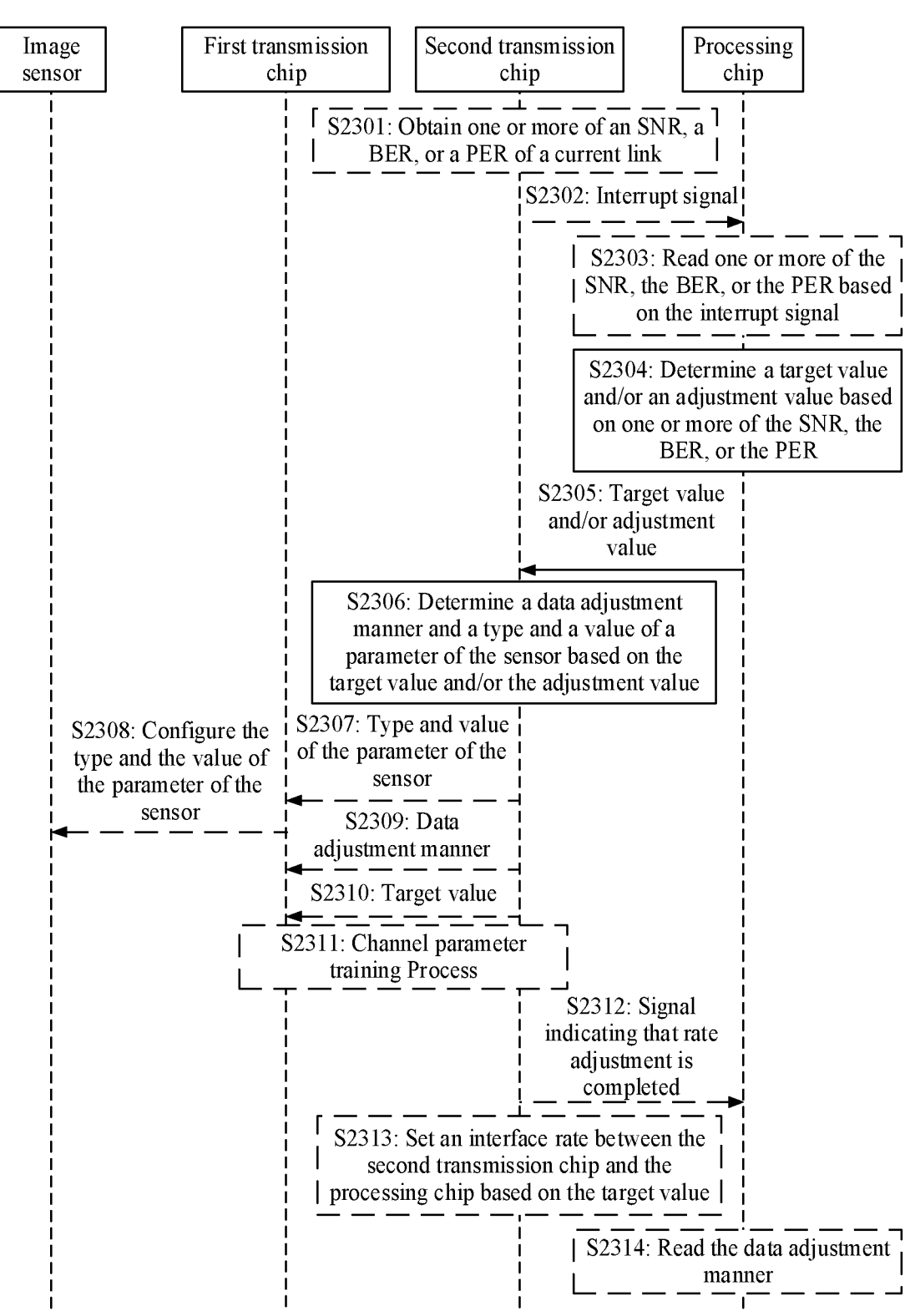
FIG. 23 is a schematic flowchart of a data processing method according to an embodiment of this application.

For example, FIG. 23 is a schematic flowchart of a data processing method according to an embodiment of this application. In the embodiment corresponding to FIG. 23, a processing chip may obtain a target value and/or an adjustment value of a data transmission rate through calculation, and the processing chip sends the target value and/or the adjustment value to a second transmission chip. Further, the second transmission chip determines a data adjustment manner and a type and a value of a parameter of a sensor based on the target value and/or the adjustment value. For a specific implementation in which the second transmission chip determines the data adjustment manner and the type and the value of the parameter of the sensor, refer to the descriptions of the foregoing steps. Details are not described herein again.

As shown in FIG. 23, the method may include the following steps.

S2301: The second transmission chip obtains one or more of an SNR, a BER, or a PER of a current link.

S2302: The second transmission chip sends an interrupt signal to the processing chip.

S2303: The processing chip reads one or more of the SNR, the BER, or the PER based on the interrupt signal.

S2304: The processing chip determines the target value and/or the adjustment value of the data transmission rate based on one or more of the SNR, the BER, or the PER.

S2305: The processing chip sends the target value and/or the adjustment value to the second transmission chip.

S2306: The second transmission chip determines the data adjustment manner and the type and the value of the parameter of the sensor based on the target value and/or the adjustment value.

S2307: The second transmission chip sends the type and the value of the parameter of the sensor to a first transmission chip.

S2308: The first transmission chip configures the type and the value of the parameter of the sensor for the image sensor.

S2309: The second transmission chip sends the data adjustment manner to the first transmission chip.

S2310: The second transmission chip sends the target value to the first transmission chip.

S2311: The first transmission chip and the second transmission chip train a channel parameter.

S2312: The second transmission chip sends, to the processing chip, a signal indicating that rate adjustment is completed.

S2313: The second transmission chip sets an interface rate between the second transmission chip and the processing chip based on the target value.

S2314: The processing chip reads the data adjustment manner.

In this embodiment of this application, for S2301 to S2303, refer to the content adaptation descriptions of S2101 to S2103. For S2307 and S2308, refer to the content adaptation descriptions of S2207 and S2208. For S2309 and S2310, refer to the content adaptation descriptions of S2107 and S2108. For S2311 to S2314, refer to the content adaptation descriptions of S306 to S309. Details are not described herein again.

It should be noted that S2301 to S2303, and S2307 to S2314 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, after the processing chip receives the interrupt signal, the processing chip reads one or more of the SNR, the BER, or the PER from the first register of the second transmission chip, the processing chip determines the target value and/or the adjustment value of the data transmission rate based on one or more of the SNR, the BER, or the PER, and the processing chip sends the target value and/or the adjustment value to the second transmission chip. Further, the second transmission chip determines the data adjustment manner and the type and the value of the parameter of the sensor based on the target value and/or the adjustment value, the image sensor outputs the data based on the configured type and value of the parameter, and the output data is further adjusted based on the data adjustment manner. This can ensure that the data can still be normally transmitted when a transmission system is interfered, to improve data transmission stability and reliability.

Figure 24:
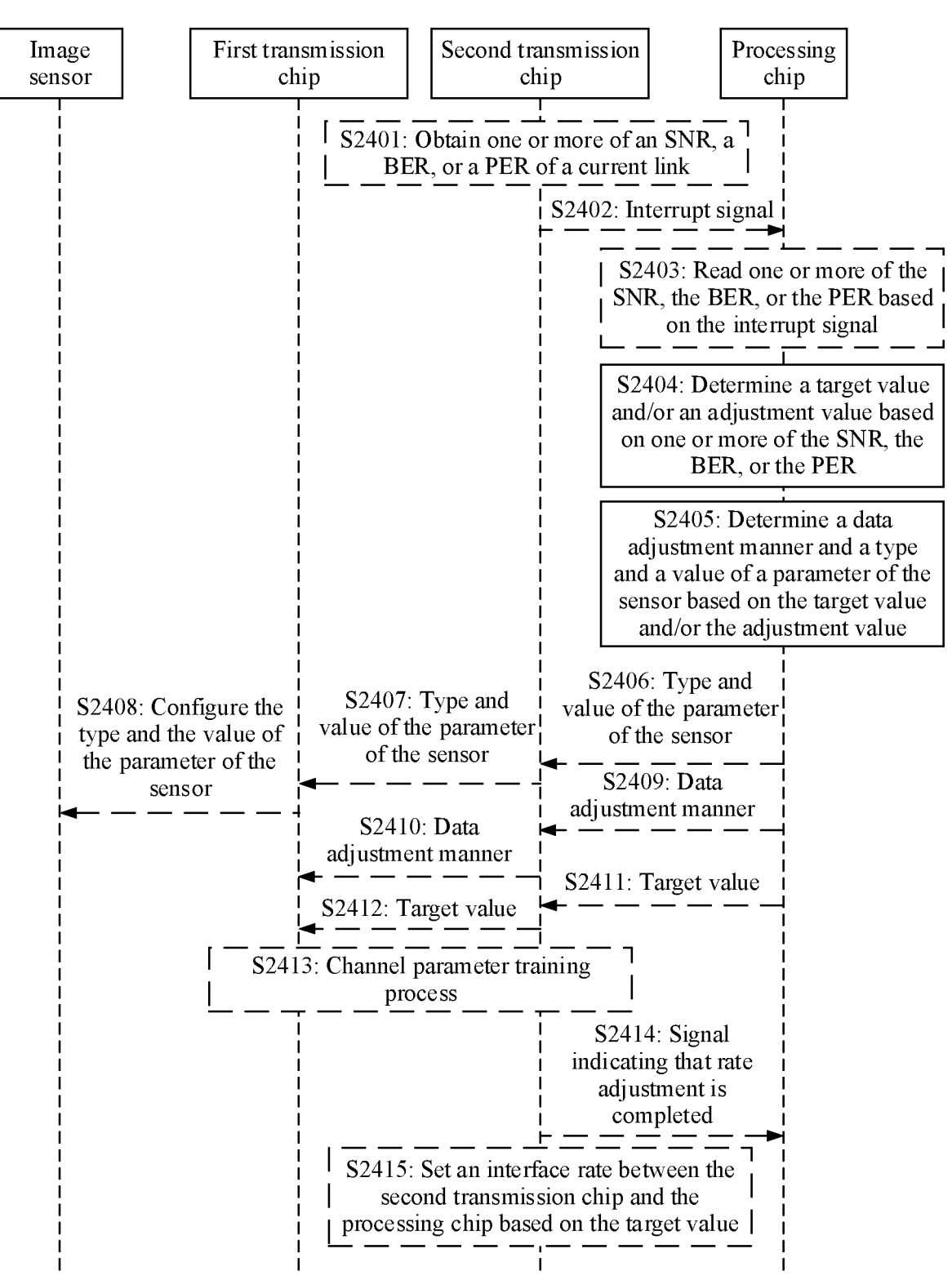
FIG. 24 is a schematic flowchart of a data processing method according to an embodiment of this application.

For example, FIG. 24 is a schematic flowchart of a data processing method according to an embodiment of this application. In the embodiment corresponding to FIG. 24, a processing chip may obtain a target value and/or an adjustment value of a data transmission rate through calculation. Further, the processing chip determines a data adjustment manner and a type and a value of a parameter of a sensor based on the target value and/or the adjustment value. For a specific implementation in which the processing chip determines the data adjustment manner and the type and the value of the parameter of the sensor, refer to the descriptions of the foregoing steps. Details are not described herein again.

As shown in FIG. 24, the method may include the following steps.

S2401: A second transmission chip obtains one or more of an SNR, a BER, or a PER of a current link.

S2402: The second transmission chip sends an interrupt signal to the processing chip.

S2403: The processing chip reads one or more of the SNR, the BER, or the PER based on the interrupt signal.

S2404: The processing chip determines the target value and/or the adjustment value of the data transmission rate based on one or more of the SNR, the BER, or the PER.

S2405: The processing chip determines the data adjustment manner and the type and the value of the parameter of the sensor based on the target value and/or the adjustment value.

S2406: The processing chip sends the type and the value of the parameter of the sensor to the second transmission chip.

S2407: The second transmission chip sends the type and the value of the parameter of the sensor to a first transmission chip.

S2408: The first transmission chip configures the type and the value of the parameter of the sensor for the image sensor.

S2409: The processing chip sends the data adjustment manner to the second transmission chip.

For example, the processing chip may send the data adjustment manner to the second transmission chip through an I2C bus.

S2410: The second transmission chip sends the data adjustment manner to the first transmission chip.

S2411: The processing chip sends the target value to the second transmission chip.

S2412: The second transmission chip sends the target value to the first transmission chip.

S2413: The first transmission chip and the second transmission chip train a channel parameter.

S2414: The second transmission chip sends, to the processing chip, a signal indicating that rate adjustment is completed.

S2415: The second transmission chip sets an interface rate between the second transmission chip and the processing chip based on the target value.

In this embodiment of this application, for S2401 to S2403, refer to the content adaptation descriptions of S501 to S503. For S2406 to S2408, refer to the content adaptation descriptions of S506 to S508. For S2410 to S2412, refer to the content adaptation descriptions of S607 to S609. For S2413 to S2415, refer to the content adaptation descriptions of S306 to S308. Details are not described herein again.

It should be noted that S2401 to S2403, and S2406 to S2415 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, after the processing chip receives the interrupt signal, the processing chip reads one or more of the SNR, the BER, or the PER from the first register of the second transmission chip, and the processing chip determines the target value and/or the adjustment value of the data transmission rate based on one or more of the SNR, the BER, or the PER. Further, the processing chip determines the data adjustment manner and the type and the value of the parameter of the sensor based on the target value and/or the adjustment value, the image sensor outputs the data based on the configured type and value of the parameter, and the output data is further adjusted based on the data adjustment manner. This can ensure that the data can still be normally transmitted when a transmission system is interfered, to improve data transmission stability and reliability.

Figure 25:
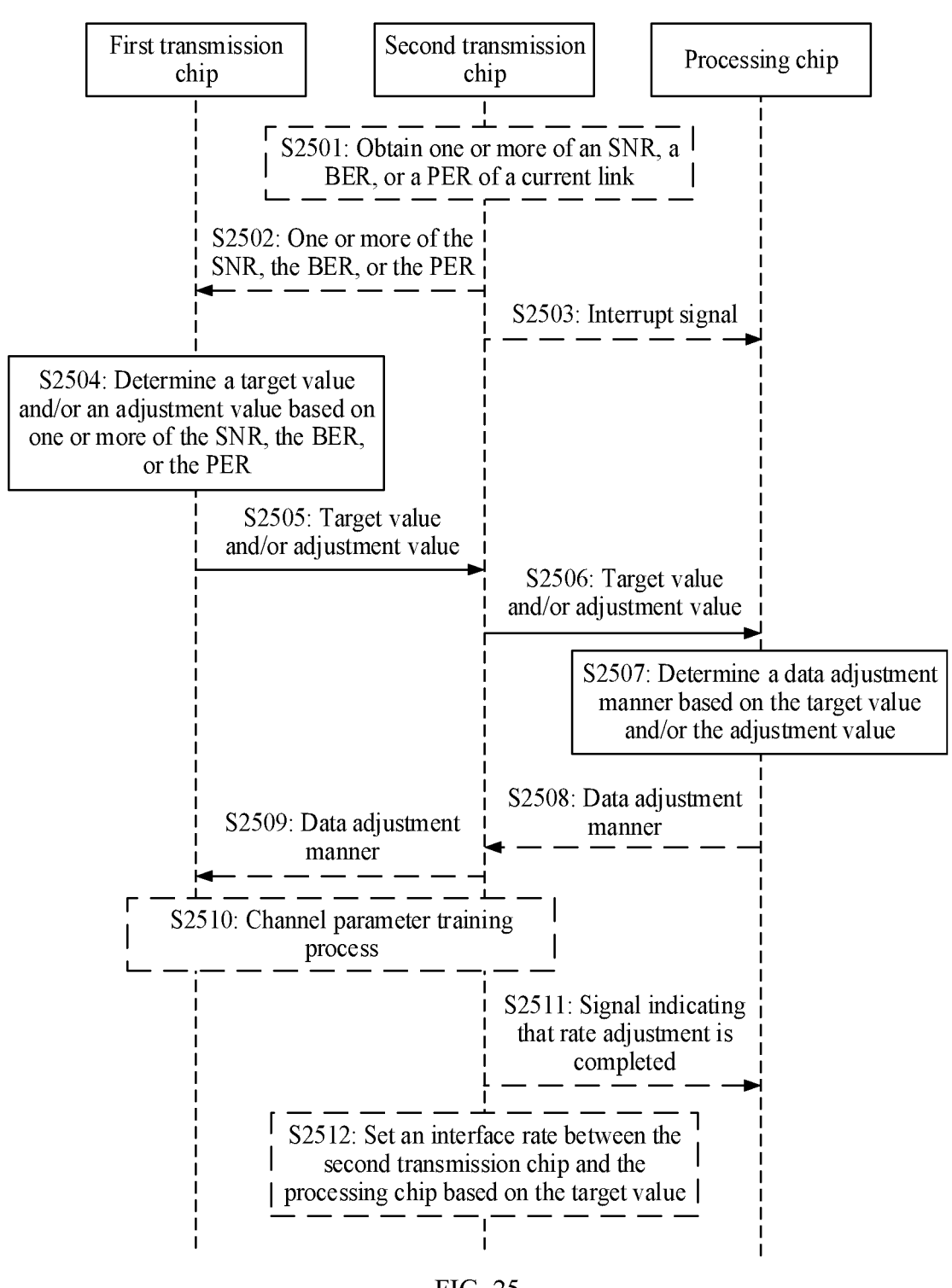
FIG. 25 is a schematic flowchart of a data processing method according to an embodiment of this application.

For example, FIG. 25 is a schematic flowchart of a data processing method according to an embodiment of this application. In the embodiment corresponding to FIG. 25, a first transmission chip may obtain a target value and/or an adjustment value of a data transmission rate through calculation, and the first transmission chip sends the target value and/or the adjustment value to a processing chip. Further, the processing chip determines a data adjustment manner based on the target value and/or the adjustment value. For a specific implementation in which the processing chip determines the data adjustment manner, refer to the descriptions of the foregoing steps. Details are not described herein again.

As shown in FIG. 25, the method may include the following steps.

S2501: A second transmission chip obtains one or more of an SNR, a BER, or a PER of a current link.

S2502: The second transmission chip sends one or more of the SNR, the BER, or the PER to the first transmission chip.

In this embodiment of this application, when a first condition is met, the second transmission chip sends one or more of the SNR, the BER, or the PER to the first transmission chip.

In this embodiment of this application, when the second transmission chip sends one or more of the SNR, the BER, or the PER to the first transmission chip, one or more of the SNR, the BER, or the PER may be carried at a physical layer, or may be carried at a MAC layer or above the MAC layer.

S2503: The second transmission chip sends an interrupt signal to the processing chip.

For example, the second transmission chip may send the interrupt signal to the processing chip through a GPIO interface.

S2504: The first transmission chip determines the target value and/or the adjustment value of the data transmission rate based on one or more of the SNR, the BER, or the PER.

S2505: The first transmission chip sends the target value and/or the adjustment value to the second transmission chip.

S2506: The second transmission chip sends the target value and/or the adjustment value to the processing chip.

S2507: The processing chip determines the data adjustment manner based on the target value and/or the adjustment value.

S2508: The processing chip sends the data adjustment manner to the second transmission chip.

For example, the processing chip may send the data adjustment manner through an I2C bus.

S2509: The second transmission chip sends the data adjustment manner to the first transmission chip.

In this embodiment of this application, when the second transmission chip sends the data adjustment manner to the first transmission chip, the data adjustment manner may be carried at the physical layer, or may be carried at the MAC layer or above the MAC layer.

S2510: The first transmission chip and the second transmission chip train a channel parameter.

S2511: The second transmission chip sends, to the processing chip, a signal indicating that rate adjustment is completed.

S2512: The second transmission chip sets an interface rate between the second transmission chip and the processing chip based on the target value.

In this embodiment of this application, for S2510 to S2512, refer to the content adaptation descriptions of S306 to S308. Details are not described herein again.

For example, the second transmission chip may set a C-PHY rate or a D-PHY rate between the second transmission chip and the processing chip based on the target value.

It should be noted that S2501 to S2503, and S2508 to S2512 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, the second transmission chip obtains one or more of the SNR, the BER, or the PER of the current link. When the first condition is met, the second transmission chip sends one or more of the SNR, the BER, or the PER to the first transmission chip, the first transmission chip determines the target value and/or the adjustment value based on one or more of the SNR, the BER, or the PER, and the first transmission chip sends the target value and/or the adjustment value to the processing chip. Further, the processing chip determines the data adjustment manner based on the target value and/or the adjustment value, and data output by an image sensor may be adjusted based on the data adjustment manner. This can ensure that the data can still be normally transmitted when a transmission system is interfered, to improve data transmission stability and reliability.

Figure 26:
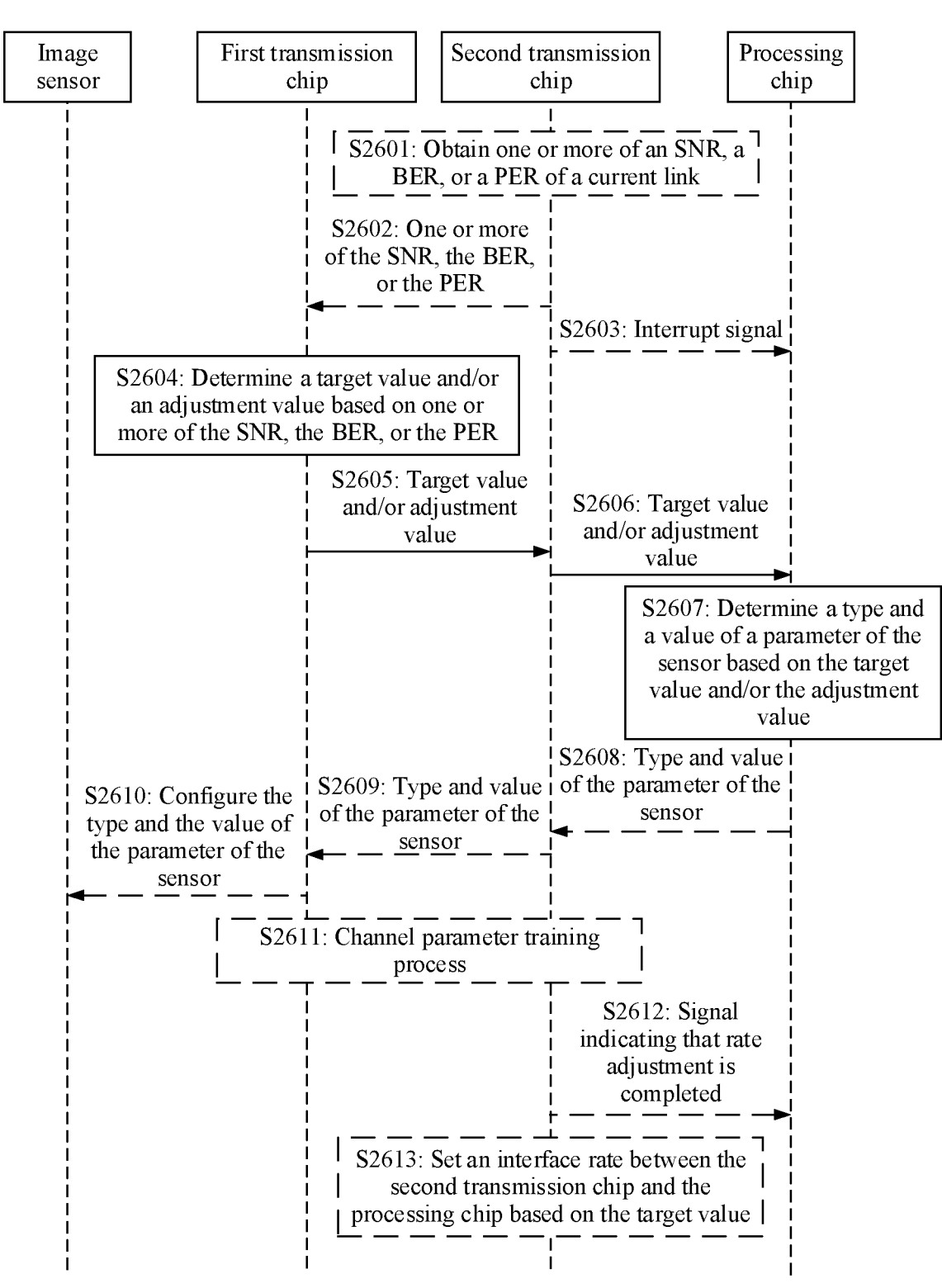
FIG. 26 is a schematic flowchart of a data processing method according to an embodiment of this application.

For example, FIG. 26 is a schematic flowchart of a data processing method according to an embodiment of this application. In the embodiment corresponding to FIG. 26, a first transmission chip may obtain a target value and/or an adjustment value of a data transmission rate through calculation, and the first transmission chip sends the target value and/or the adjustment value to a processing chip. Further, the processing chip determines a type and a value of a parameter of a sensor based on the target value and/or the adjustment value. For a specific implementation in which the processing chip determines the type and the value of the parameter of the sensor, refer to the descriptions of the foregoing steps. Details are not described herein again.

As shown in FIG. 26, the method may include the following steps.

S2601: A second transmission chip obtains one or more of an SNR, a BER, or a PER of a current link.

S2602: The second transmission chip sends one or more of the SNR, the BER, or the PER to the first transmission chip.

S2603: The second transmission chip sends an interrupt signal to the processing chip.

S2604: The first transmission chip determines the target value and/or the adjustment value of the data transmission rate based on one or more of the SNR, the BER, or the PER.

S2605: The first transmission chip sends the target value and/or the adjustment value to the second transmission chip.

S2606: The second transmission chip sends the target value and/or the adjustment value to the processing chip.

S2607: The processing chip determines the type and the value of the parameter of the sensor based on the target value and/or the adjustment value.

S2608: The processing chip sends the type and the value of the parameter of the sensor to the second transmission chip.

For example, the processing chip may send the type and the value of the parameter of the sensor through an I2C bus.

S2609: The second transmission chip sends the type and the value of the parameter of the sensor to the first transmission chip.

In this embodiment of this application, when the second transmission chip sends the type and the value of the parameter of the sensor to the first transmission chip, the type and the value of the parameter of the sensor may be carried at a physical layer, or may be carried at a MAC layer or above the MAC layer.

S2610: The first transmission chip configures the type and the value of the parameter of the sensor for the image sensor.

In this embodiment of this application, the first transmission chip may configure the parameter of the sensor through the I2C bus, and the image sensor outputs data based on the configured type and value of the parameter.

S2611: The first transmission chip and the second transmission chip train a channel parameter.

S2612: The second transmission chip sends, to the processing chip, a signal indicating that rate adjustment is completed.

S2613: The second transmission chip sets an interface rate between the second transmission chip and the processing chip based on the target value.

In this embodiment of this application, for S2601 to S2603, refer to the content adaptation descriptions of S2501 to S2503. For S2611 to S2613, refer to the content adaptation descriptions of S306 to S308. Details are not described herein again.

It should be noted that S2601 to S2603, and S2608 to S2613 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, the second transmission chip obtains one or more of the SNR, the BER, or the PER of the current link. When the first condition is met, the second transmission chip sends one or more of the SNR, the BER, or the PER to the first transmission chip, the first transmission chip determines the target value and/or the adjustment value based on one or more of the SNR, the BER, or the PER, and the first transmission chip sends the target value and/or the adjustment value to the processing chip. Further, the processing chip determines the type and the value of the parameter of the sensor based on the target value and/or the adjustment value, and the image sensor outputs the data based on the configured type and value of the parameter. This can ensure that the data can still be normally transmitted when a transmission system is interfered, to improve data transmission stability and reliability.

Figure 27:
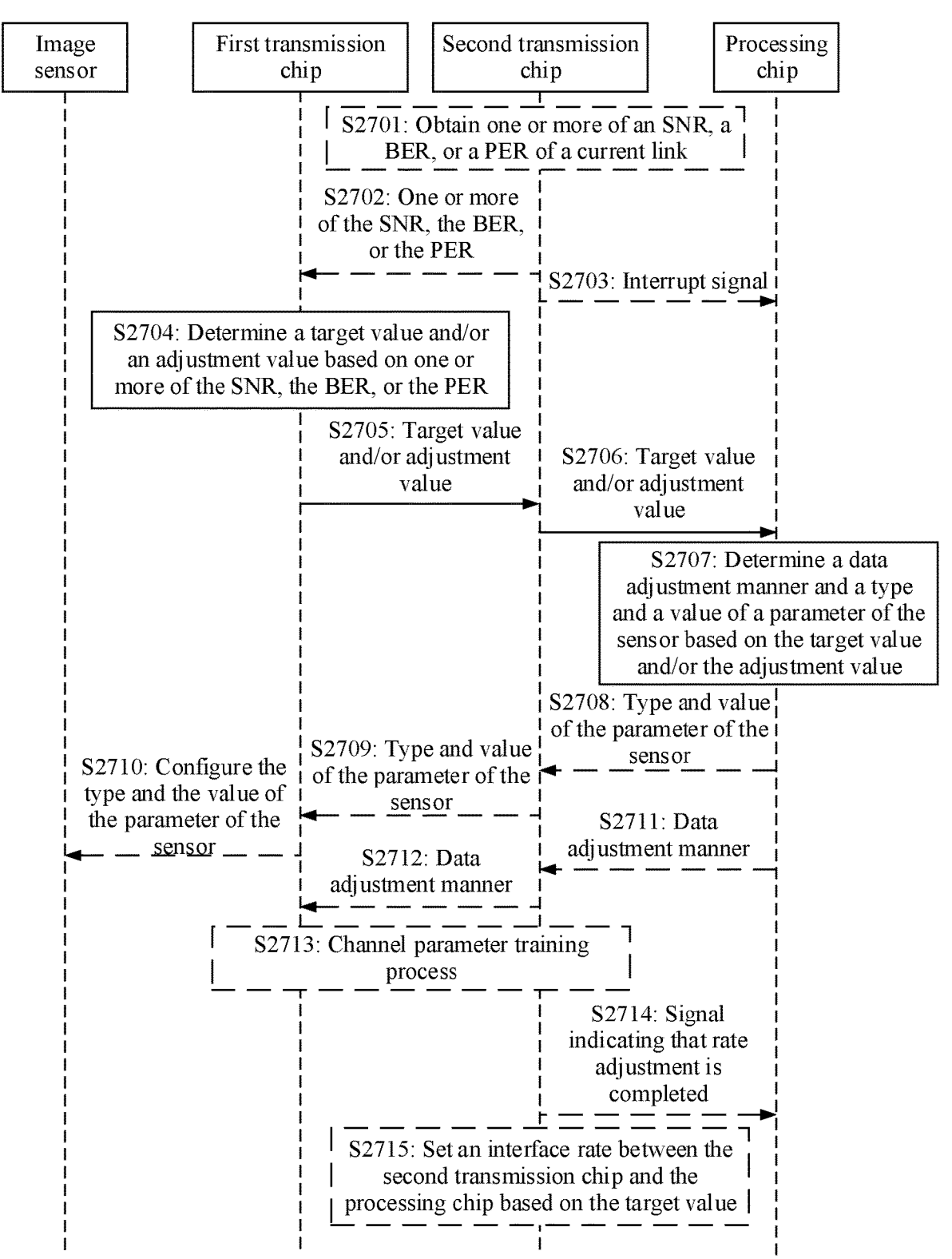
FIG. 27 is a schematic flowchart of a data processing method according to an embodiment of this application.

For example, FIG. 27 is a schematic flowchart of a data processing method according to an embodiment of this application. In the embodiment corresponding to FIG. 27, a first transmission chip may obtain a target value and/or an adjustment value of a data transmission rate through calculation, and the first transmission chip sends the target value and/or the adjustment value to a processing chip. Further, the processing chip determines a data adjustment manner and a type and a value of a parameter of a sensor based on the target value and/or the adjustment value. For a specific implementation in which the processing chip determines the data adjustment manner and the type and the value of the parameter of the sensor, refer to the descriptions of the foregoing steps. Details are not described herein again.

As shown in FIG. 27, the method may include the following steps.

S2701: A second transmission chip obtains one or more of an SNR, a BER, or a PER of a current link.

S2702: The second transmission chip sends one or more of the SNR, the BER, or the PER to the first transmission chip.

S2703: The second transmission chip sends an interrupt signal to the processing chip.

S2704: The first transmission chip determines the target value and/or the adjustment value of the data transmission rate based on one or more of the SNR, the BER, or the PER.

S2705: The first transmission chip sends the target value and/or the adjustment value to the second transmission chip.

S2706: The second transmission chip sends the target value and/or the adjustment value to the processing chip.

S2707: The processing chip determines the data adjustment manner and the type and the value of the parameter of the sensor based on the target value and/or the adjustment value.

S2708: The processing chip sends the type and the value of the parameter of the sensor to the second transmission chip.

S2709: The second transmission chip sends the type and the value of the parameter of the sensor to the first transmission chip.

S2710: The first transmission chip configures the type and the value of the parameter of the sensor for the image sensor.

S2711: The processing chip sends the data adjustment manner to the second transmission chip.

S2712: The second transmission chip sends the data adjustment manner to the first transmission chip.

S2713: The first transmission chip and the second transmission chip train a channel parameter.

S2714: The second transmission chip sends, to the processing chip, a signal indicating that rate adjustment is completed.

S2715: The second transmission chip sets an interface rate between the second transmission chip and the processing chip based on the target value.

In this embodiment of this application, for S2701 to S2703, refer to the content adaptation descriptions of S2501 to S2503. For S2708 to S2710, refer to the content adaptation descriptions of S2608 to S2610. For S2711 and S2712, refer to the content adaptation descriptions of S2508 and S22509. For S2713 to S2715, refer to the content adaptation descriptions of S306 to S308. Details are not described herein again.

It should be noted that S2701 to S2703, and S2708 to S2715 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, the second transmission chip obtains one or more of the SNR, the BER, or the PER of the current link. When the first condition is met, the second transmission chip sends one or more of the SNR, the BER, or the PER to the first transmission chip, the first transmission chip determines the target value and/or the adjustment value based on one or more of the SNR, the BER, or the PER, and the first transmission chip sends the target value and/or the adjustment value to the processing chip. Further, the processing chip determines the data adjustment manner and the type and the value of the parameter of the sensor based on the target value and/or the adjustment value, the image sensor outputs the data based on the configured type and value of the parameter, and the output data is further adjusted based on the data adjustment manner. This can ensure that the data can still be normally transmitted when a transmission system is interfered, to improve data transmission stability and reliability.

Figure 28:
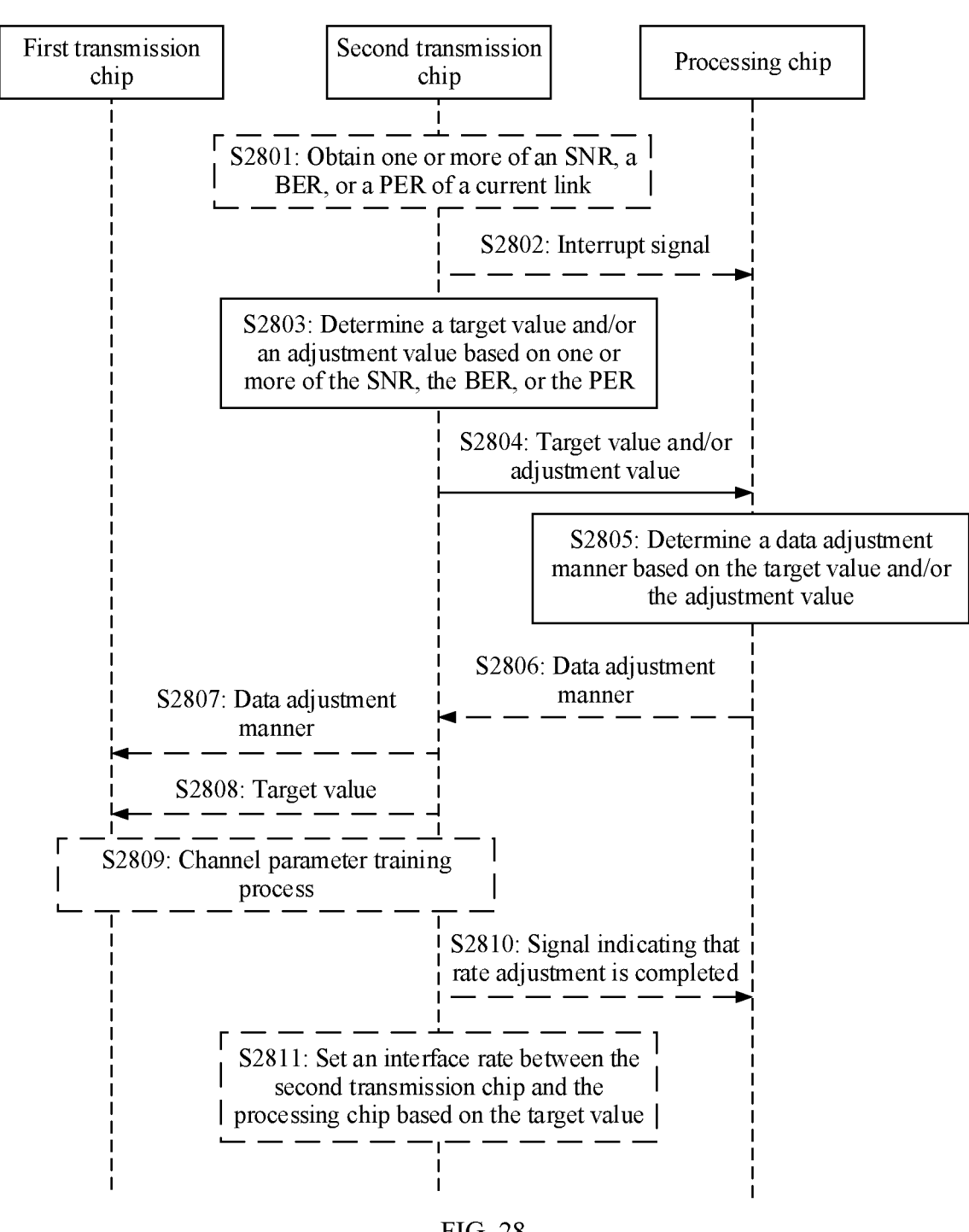
FIG. 28 is a schematic flowchart of a data processing method according to an embodiment of this application.

For example, FIG. 28 is a schematic flowchart of a data processing method according to an embodiment of this application. In the embodiment corresponding to FIG. 28, a second transmission chip may obtain a target value and/or an adjustment value of a data transmission rate through calculation, and the second transmission chip sends the target value and/or the adjustment value to a processing chip. Further, the processing chip determines a data adjustment manner based on the target value and/or the adjustment value. For a specific implementation in which the processing chip determines the data adjustment manner, refer to the descriptions of the foregoing steps. Details are not described herein again.

As shown in FIG. 28, the method may include the following steps.

S2801: The second transmission chip obtains one or more of an SNR, a BER, or a PER of a current link.

S2802: The second transmission chip sends an interrupt signal to the processing chip.

For example, the second transmission chip may send the interrupt signal to the processing chip through a GPIO interface.

S2803: The second transmission chip determines the target value and/or the adjustment value of the data transmission rate based on one or more of the obtained SNR, BER, or PER.

In this embodiment of this application, when a first condition is met, the second transmission chip determines the target value and/or the adjustment value based on one or more of the obtained SNR, BER, or PER. For a manner in which the second transmission chip determines the target value and/or the adjustment value, refer to the descriptions of the foregoing steps. Details are not described herein again.

S2804: The second transmission chip sends the target value and/or the adjustment value to the processing chip.

S2805: The processing chip determines the data adjustment manner based on the target value and/or the adjustment value.

S2806: The processing chip sends the data adjustment manner to the second transmission chip.

For example, the processing chip may send the data adjustment manner to the second transmission chip through an I2C bus.

S2807: The second transmission chip sends the data adjustment manner to a first transmission chip.

In this embodiment of this application, when the second transmission chip sends the data adjustment manner to the first transmission chip, the data adjustment manner may be carried at a physical layer, or may be carried at a MAC layer or above the MAC layer.

S2808: The second transmission chip sends the target value to the first transmission chip.

In this embodiment of this application, when the second transmission chip sends the target value to the first transmission chip, the target value may be carried at the physical layer, or may be carried at the MAC layer or above the MAC layer.

In this embodiment of this application, the first transmission chip and the second transmission chip train a channel parameter based on the target value.

S2809: The first transmission chip and the second transmission chip train the channel parameter.

S2810: The second transmission chip sends, to the processing chip, a signal indicating that rate adjustment is completed.

S2811: The second transmission chip sets an interface rate between the second transmission chip and the processing chip based on the target value.

In this embodiment of this application, for S2809 to S2811, refer to the content adaptation descriptions of S306 to S308. Details are not described herein again.

It should be noted that S2801, S2802, and S2806 to S2811 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, the second transmission chip obtains one or more of the SNR, the BER, or the PER of the current link. When the first condition is met, the second transmission chip determines the target value and/or the adjustment value based on one or more of the obtained SNR, BER, or PER, and the second transmission chip sends the target value and/or the adjustment value to the processing chip. Further, the processing chip determines the data adjustment manner based on the target value and/or the adjustment value, and data output by an image sensor may be adjusted based on the data adjustment manner. This can ensure that the data can still be normally transmitted when a transmission system is interfered, to improve data transmission stability and reliability.

Figure 29:
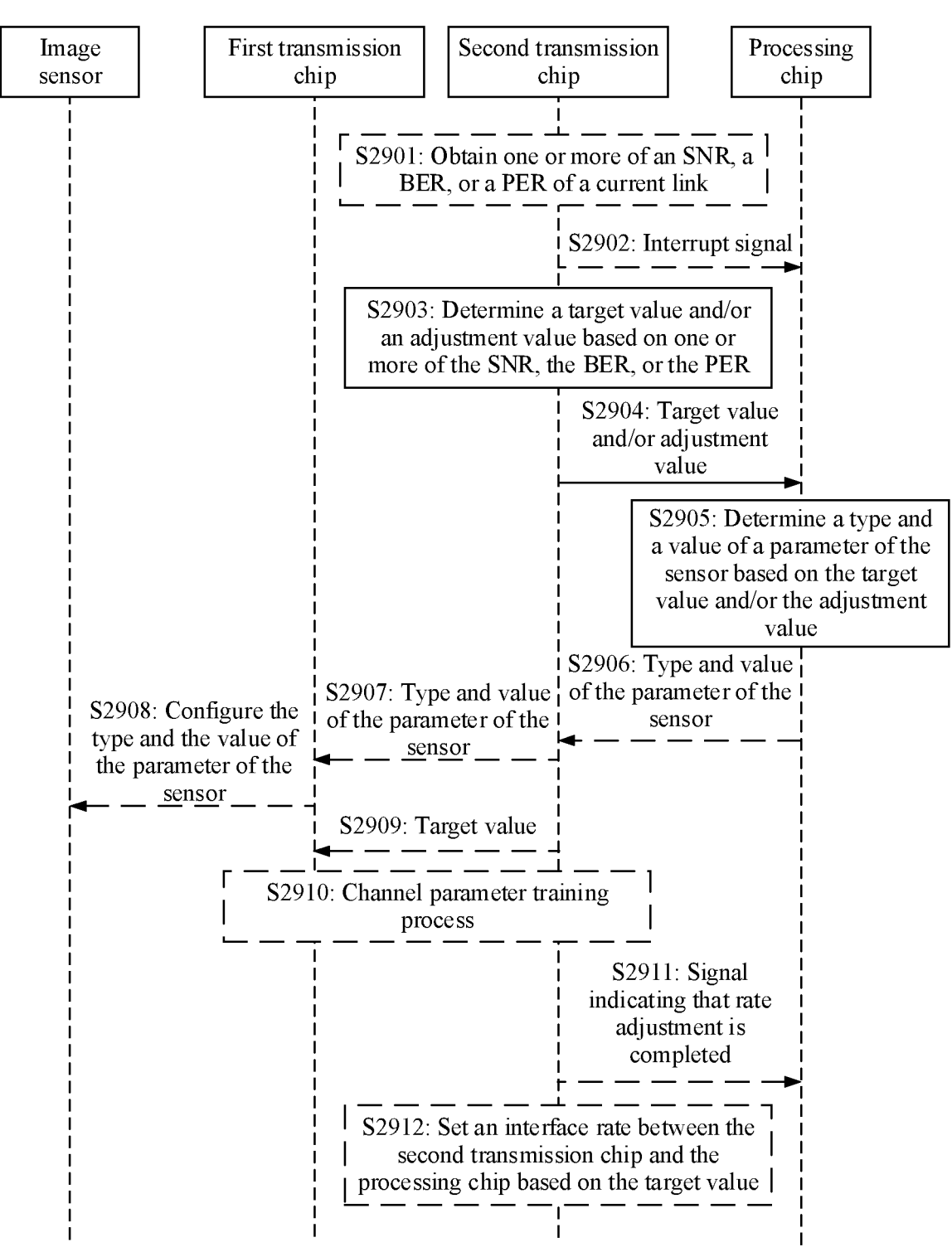
FIG. 29 is a schematic flowchart of a data processing method according to an embodiment of this application.

For example, FIG. 29 is a schematic flowchart of a data processing method according to an embodiment of this application. In the embodiment corresponding to FIG. 29, a second transmission chip may obtain a target value and/or an adjustment value of a data transmission rate through calculation, and the second transmission chip sends the target value and/or the adjustment value to a processing chip. Further, the processing chip determines a type and a value of a parameter of a sensor based on the target value and/or the adjustment value. For a specific implementation in which the processing chip determines the type and the value of the parameter of the sensor, refer to the descriptions of the foregoing steps. Details are not described herein again.

As shown in FIG. 29, the method may include the following steps.

S2901: The second transmission chip obtains one or more of an SNR, a BER, or a PER of a current link.

S2902: The second transmission chip sends an interrupt signal to the processing chip.

S2903: The second transmission chip determines the target value and/or the adjustment value of the data transmission rate based on one or more of the SNR, the BER, or the PER.

S2904: The second transmission chip sends the target value and/or the adjustment value to the processing chip.

S2905: The processing chip determines the type and the value of the parameter of the sensor based on the target value and/or the adjustment value.

S2906: The processing chip sends the type and the value of the parameter of the sensor to the second transmission chip.

In this embodiment of this application, the processing chip may send the type and the value of the parameter of the sensor through an I2C bus.

S2907: The second transmission chip sends the type and the value of the parameter of the sensor to a first transmission chip.

In this embodiment of this application, when the second transmission chip sends the type and the value of the parameter of the sensor to the first transmission chip, the type and the value of the parameter of the sensor may be carried at a physical layer, or may be carried at a MAC layer or above the MAC layer.

S2908: The first transmission chip configures the parameter of the sensor for the image sensor.

For example, the first transmission chip may configure the type and the value of the parameter of the sensor through the I2C bus.

S2909: The second transmission chip sends the target value to the first transmission chip.

S2910: The first transmission chip and the second transmission chip train a channel parameter.

S2911: The second transmission chip sends, to the processing chip, a signal indicating that rate adjustment is completed.

S2912: The second transmission chip sets an interface rate between the second transmission chip and the processing chip based on the target value.

In this embodiment of this application, for S2901 to S2903, refer to the content adaptation descriptions of S2801 to S2803. For S2909, refer to the content adaptation descriptions of S2808. For S2910 to S2912, refer to the content adaptation descriptions of S306 to S308. Details are not described herein again.

It should be noted that S2901, S2902, and S2906 to S2912 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, the second transmission chip obtains one or more of the SNR, the BER, or the PER of the current link. When the first condition is met, the second transmission chip determines the target value and/or the adjustment value based on one or more of the obtained SNR, BER, or PER, and the second transmission chip sends the target value and/or the adjustment value to the processing chip. Further, the processing chip determines the type and the value of the parameter of the sensor based on the target value and/or the adjustment value, and the image sensor outputs data based on the configured type and value of the parameter. This can ensure that the data can still be normally transmitted when a transmission system is interfered, to improve data transmission stability and reliability.

Figure 30:
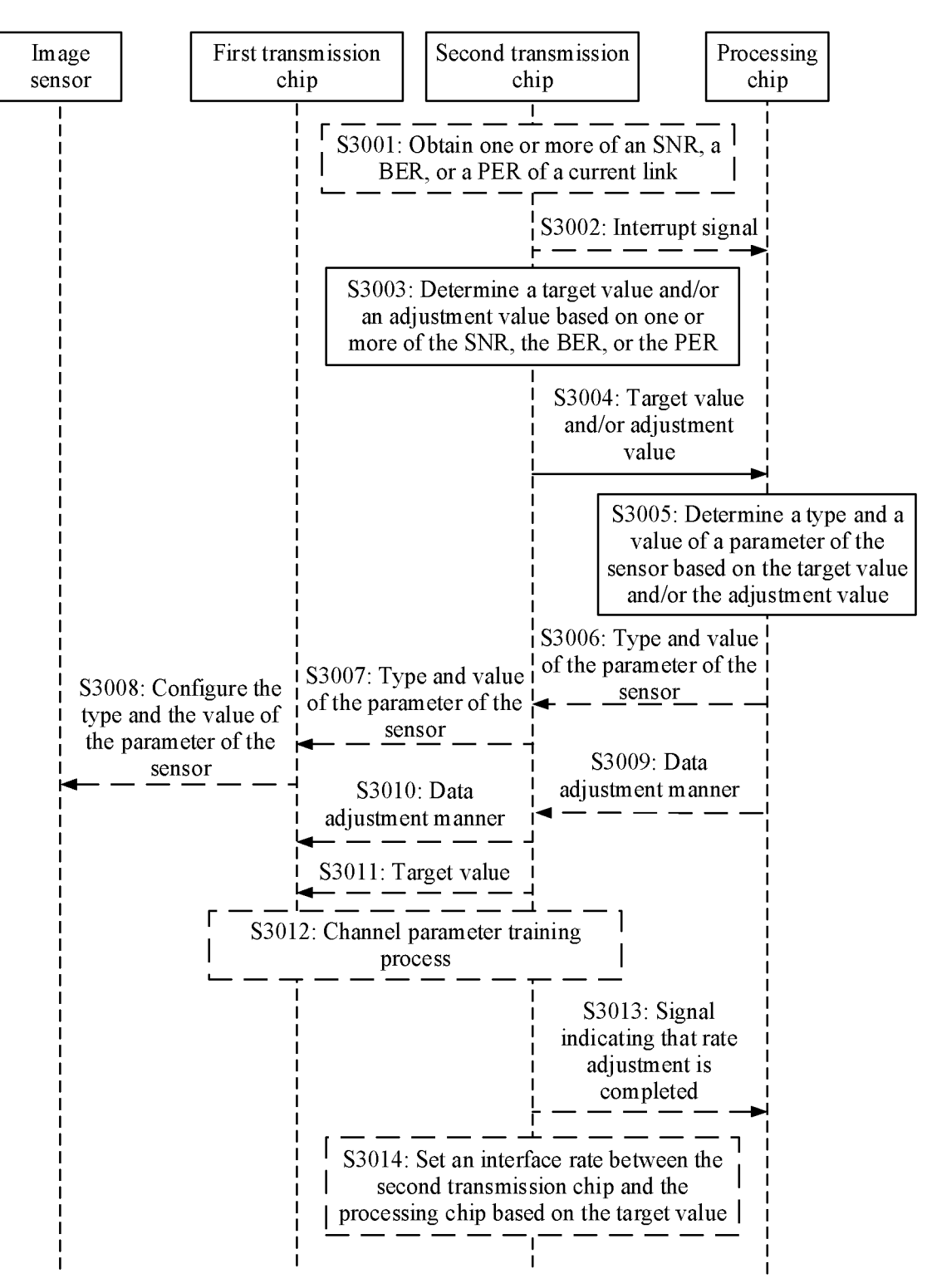
FIG. 30 is a schematic flowchart of a data processing method according to an embodiment of this application.

For example, FIG. 30 is a schematic flowchart of a data processing method according to an embodiment of this application. In the embodiment corresponding to FIG. 30, a second transmission chip may obtain a target value and/or an adjustment value of a data transmission rate through calculation, and the second transmission chip sends the target value and/or the adjustment value to a processing chip. Further, the processing chip determines a data adjustment manner and a type and a value of a parameter of a sensor based on the target value and/or the adjustment value. For a specific implementation in which the processing chip determines the data adjustment manner and the type and the value of the parameter of the sensor, refer to the descriptions of the foregoing steps. Details are not described herein again.

As shown in FIG. 30, the method may include the following steps.

S3001: The second transmission chip obtains one or more of an SNR, a BER, or a PER of a current link.

S3002: The second transmission chip sends an interrupt signal to the processing chip.

S3003: The second transmission chip determines the target value and/or the adjustment value of the data transmission rate based on one or more of the SNR, the BER, or the PER.

S3004: The second transmission chip sends the target value and/or the adjustment value to the processing chip.

S3005: The processing chip determines the data adjustment manner and the type and the value of the parameter of the sensor based on the target value and/or the adjustment value.

S3006: The processing chip sends the type and the value of the parameter of the sensor to the second transmission chip.

S3007: The second transmission chip sends the type and the value of the parameter of the sensor to a first transmission chip.

S3008: The first transmission chip configures the type and the value of the parameter of the sensor for the image sensor.

S3009: The processing chip sends the data adjustment manner to the second transmission chip.

S3010: The second transmission chip sends the data adjustment manner to the first transmission chip.

S3011: The second transmission chip sends the target value to the first transmission chip.

S3012: The first transmission chip and the second transmission chip train a channel parameter.

S3013: The second transmission chip sends, to the processing chip, a signal indicating that rate adjustment is completed.

S3014: The second transmission chip sets an interface rate between the second transmission chip and the processing chip based on the target value.

In this embodiment of this application, for S3001 to S3003, refer to the content adaptation descriptions of S2801 to S2803. For S3006 to S3008, refer to the content adaptation descriptions of S2906 to S2908. For S3009 to S3011, refer to the content adaptation descriptions of S2806 to S2808. For S3012 to S3014, refer to the content adaptation descriptions of S306 to S308. Details are not described herein again.

It should be noted that S3001, S3002, and S3006 to S3014 in this embodiment of this application are optional steps, and one or more optional steps may be set based on an actual application scenario. A sequence of the steps in this embodiment of this application may also be adjusted based on the actual application scenario. This is not limited in this embodiment of this application.

In conclusion, the second transmission chip obtains one or more of the SNR, the BER, or the PER of the current link. When the first condition is met, the second transmission chip determines the target value and/or the adjustment value based on one or more of the obtained SNR, BER, or PER, and the second transmission chip sends the target value and/or the adjustment value to the processing chip. Further, the processing chip determines the data adjustment manner and the type and the value of the parameter of the sensor based on the target value and/or the adjustment value, the image sensor outputs the data based on the configured type and value of the parameter, and the output data is further adjusted based on the data adjustment manner. This can ensure that the data can still be normally transmitted when a transmission system is interfered, to improve data transmission stability and reliability.

The foregoing describes the methods in embodiments of this application with reference to FIG. 3 to FIG. 30. The following describes a data processing apparatus that is provided in embodiments of this application and that performs the foregoing methods. A person skilled in the art may understand that the methods and the apparatus may be mutually combined and referenced. The data processing apparatus provided in embodiments of this application may perform the steps performed by the first transmission chip, the second transmission chip, or the processing chip in the foregoing data processing methods.

An example in which each function module is obtained through division based on each corresponding function is used below for description.

Figure 31:
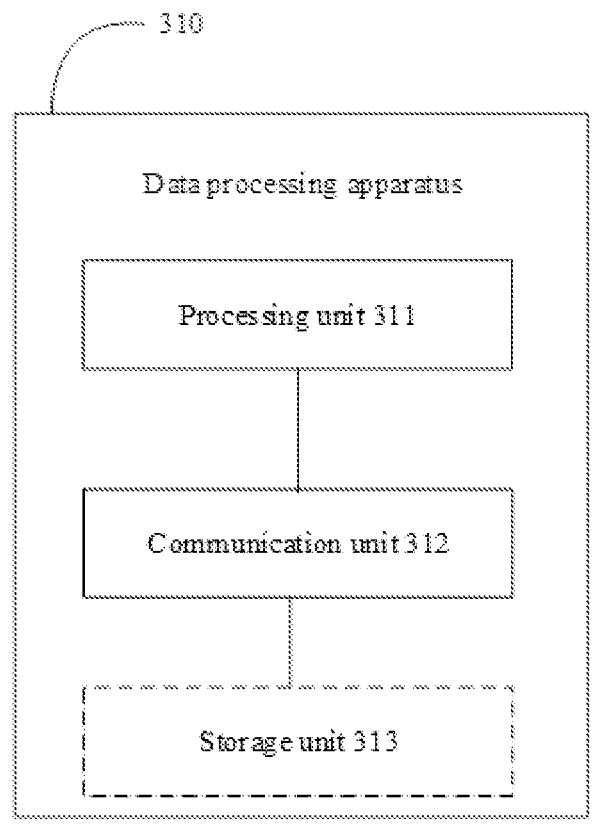
FIG. 31 is a schematic diagram of a structure of a data processing apparatus according to an embodiment of this application.

For example, FIG. 31 is a schematic diagram of a structure of a data processing apparatus 310 according to an embodiment of this application. The data processing apparatus may be the first transmission chip, the second transmission chip, or the processing chip in embodiments of this application.

In this embodiment of this application, the data processing apparatus includes a processing unit 311 and a communication unit 312. The communication unit 312 is configured to support the data processing apparatus in performing a step of sending or receiving information, and the processing unit 311 is configured to support the data processing apparatus in performing a step of processing information.

In an example, the data processing apparatus 310 is the first transmission chip. The communication unit 312 is configured to support the data processing apparatus in performing S1805 in the foregoing embodiment, and the processing unit 311 is configured to support the data processing apparatus in performing S1804 in the foregoing embodiment.

In another example, the data processing apparatus is the second transmission chip. The communication unit 312 is configured to support the data processing apparatus in performing S1802 in the foregoing embodiment, and the processing unit 311 is configured to support the data processing apparatus in performing S1806 in the foregoing embodiment.

In still another example, the data processing apparatus is the processing chip. The communication unit 312 is configured to support the data processing apparatus in performing S509 in the foregoing embodiment, and the processing unit 311 is configured to support the data processing apparatus in performing S505 in the foregoing embodiment.

In a possible embodiment, the data processing apparatus 310 may further include a storage unit 313. The storage unit 313 may include one or more memories. The memory may be a component that is configured to store a program or data and that is in one or more devices or circuits.

In this embodiment of this application, the processing unit 311, the communication unit 312, and the storage unit 313 may be connected through a communication bus. The storage unit 313 may exist independently, the storage unit 313 may be independent of the processing unit 311, or the storage unit 313 may be integrated with the processing unit 311.

In this embodiment of this application, the data processing apparatus 310 may be applied to a communication device, a circuit, or a hardware component. For example, if the data processing apparatus 310 may be the first transmission chip, the second transmission chip, or the processing chip in embodiments of this application, the communication unit 312 may include one or more of an input or output interface, a pin, or a circuit.

For example, the storage unit 313 may store computer-executable instructions corresponding to the steps performed by the first transmission chip, the second transmission chip, and/or the processing chip, so that the processing unit 311 performs the method on the first transmission chip side, the second transmission chip side, or the processing chip side in the foregoing embodiments. The storage unit 313 may be a random-access memory (RAM) or the like. The storage unit 313 may be a read-only memory (ROM) or another type of static storage device that can store static information and instructions.

This embodiment of this application provides the data processing apparatus 310. The data processing apparatus includes one or more units or modules, configured to implement the methods in the steps included in FIG. 3 to FIG. 30. The one or more units or modules may correspond to the steps in the methods in the steps included in FIG. 3 to FIG. 30.

In an embodiment of this application, for each step in the method performed by the first transmission chip, the first transmission chip includes a unit or a module for performing each step in the method. For each step in the method performed by the second transmission chip, the second transmission chip includes a unit or a module for performing each step in the method. For each step in the method performed by the processing chip, the processing chip includes a unit or a module for performing each step in the method. For example, a module for controlling or processing an action of the data processing apparatus may be referred to as a processing module, and a module that performs a step of processing a message or data on the data processing apparatus side may be referred to as a communication module.

Figure 32:
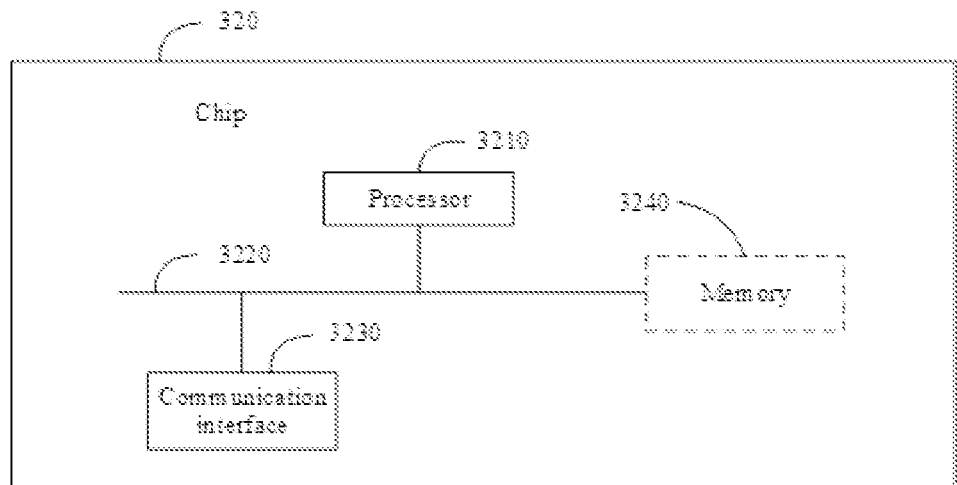
FIG. 32 is a schematic diagram of a structure of a chip according to an embodiment of this application.

For example, FIG. 32 is a schematic diagram of a structure of a chip according to an embodiment of this application. The chip 320 includes one or more (including two) processors 3210 and a communication interface 3230.

In some implementations, a memory 3240 stores the following elements such as an executable module or a data structure, a subset thereof, or an extended set thereof.

In this embodiment of this application, the memory 3240 may include a read-only memory and a random access memory, and provide instructions and data to the processor 3210. A part of the memory 3240 may further include a non-volatile random-access memory (NVRAM).

In this embodiment of this application, the processor 3210 may control, by invoking operation instructions (where the operation instructions may be stored in an operating system) stored in the memory 3240, the first transmission chip, the second transmission chip, or the processing chip to perform corresponding operations. The processor 3210 may be referred to as a central processing unit (CPU).

In this embodiment of this application, the memory 3240, the communication interface 3230, and the memory 3240 are coupled together through a bus system 3220. In addition to a data bus, the bus system 3220 may further include a power bus, a control bus, a status signal bus, and the like. For ease of description, various buses are marked as the bus system 3220 in FIG. 32.

The methods described in embodiments of this application may be applied to the processor 3210, or may be implemented by the processor 3210. The processor 3210 may be an integrated circuit chip and has a signal processing capability. In an implementation process, the steps in the foregoing methods may be implemented by using an integrated logic circuit of hardware in the processor 3210, or by using instructions in a form of software. The processor 3210 may be a general-purpose processor (for example, a microprocessor or a conventional processor), a digital signal processor (DSP), an application-specific integrated circuit (ASIC), a field-programmable gate array (FPGA), or another programmable logic device, discrete gate, transistor logic device, or discrete hardware component. The processor 3210 may implement or perform the methods, steps, and logical block diagrams that are disclosed in embodiments of the present application.

The steps in the methods disclosed with reference to embodiments of this application may be directly performed and completed by a hardware decoding processor, or may be performed and completed by using a combination of hardware and software modules in a decoding processor. The software module may be located in a mature storage medium in the art, such as a random access memory, a read-only memory, a programmable read-only memory, or an electrically erasable programmable read-only memory (EE-PROM). The storage medium is located in the memory 3240. The processor 3210 reads information in the memory 3240, and completes the steps in the foregoing methods in combination with hardware of the processor.

In the foregoing embodiment, the instructions that are stored in the memory and that are to be executed by the processor may be implemented in a form of a computer program product. The computer program product may be written into the memory in advance, or may be downloaded and installed in the memory in a form of software.

The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, for example, a server or a data center, integrating one or more usable media. For example, the usable medium may be a magnetic medium (for example, a floppy disk, a hard disk, or a magnetic tape), an optical medium (for example, a digital versatile disc (DVD), a semiconductor medium (for example, a solid-state disk (SSD)), or the like.

An embodiment of this application further provides a computer-readable storage medium. The methods described in the foregoing embodiments may be all or partially implemented by software, hardware, firmware, or any combination thereof. The computer-readable medium may include a computer storage medium and a communication medium, and may further include any medium that can transfer a computer program from one place to another place. The storage medium may be any target medium that can be accessed by a computer.

In a possible design, the computer-readable medium may include a compact disc read-only memory (CD-ROM), a RAM, a ROM, an EEPROM, or another optical disc memory. The computer-readable medium may include a magnetic disk memory or another magnetic disk storage device. In addition, any connection line is appropriately referred to as a computer-readable medium. For example, if a coaxial cable, an optical fiber cable, a twisted pair, a DSL, or wireless technologies (such as infrared, radio, and microwave) are used to transmit software from a website, a server, or another remote source, the coaxial cable, the optical fiber cable, the twisted pair, the DSL, or the wireless technologies such as infrared, radio, and microwave are included in a definition of the medium. Magnetic disks and optical discs used in this specification include a compact disc (CD), a laser disc, an optical disc, a DVD, a floppy disk, and a BLU-RAY disc. The magnetic disks usually magnetically reproduce data, and the optical discs optically reproduce data by using laser light. The foregoing combinations also need to be included within the scope of the computer-readable medium. The foregoing descriptions are merely example implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A data processing method implemented by a second chip, and comprising:

obtaining at least one of a target value of a data transmission rate or an adjustment value of the data transmission rate; and performing one or more of:

determining a data adjustment manner of data from a sensor based on at least one of the target value or the adjustment value, wherein the data adjustment manner comprises adjusting a frame rate in a frame or adjusting a quantity of rows in the frame; and configuring a parameter of the sensor based on the at least one of target value or the adjustment value.

2. The data processing method of claim 1, further comprising storing the data adjustment manner in a second register.

3. The data processing method of claim 1, wherein the parameter of the sensor comprises one or more of the frame rate, a resolution, or a pixel quantization depth.

4. The data processing method of claim 1, further comprising obtaining at least one of the target value or the adjustment value of the data transmission rate when a first condition is met, wherein the first condition comprises one or more of a signal-to-noise ratio is less than a first value, a bit error rate is greater than a second value, or a packet error rate is greater than a third value.

5. The data processing method of claim 1, wherein the obtaining comprises determining at least one of the target value or the adjustment value.

6. The data processing method of claim 1, further comprising indicating the data adjustment manner to a first chip.

7. A data processing apparatus, comprising:

a memory configured to store executable instructions; and at least one processor coupled to the memory and configured to execute the executable instructions to cause the data processing apparatus to:

obtain at least one of a target value of a data transmission rate or an adjustment value of the data transmission rate; and perform one or more of:

determining a data adjustment manner of data from a sensor based on at least one of the target value or the adjustment value; and configuring a parameter of the sensor based on at least one of the target value or the adjustment value, wherein the parameter of the sensor comprises one or more of a frame rate, a resolution, or a pixel quantization depth.

8. The data processing apparatus of claim 7, wherein the executable instructions that when executed by the at least one processor further cause the data processing apparatus to indicate the data adjustment manner to a second chip or to a first chip.

9. The data processing apparatus of claim 7, wherein the data adjustment manner comprises adjusting the frame rate or adjusting a quantity of rows in a frame.

10. The data processing apparatus of claim 7, wherein the executable instructions that when executed by the at least one processor further cause the data processing apparatus to store the data adjustment manner in a register.

11. The data processing apparatus of claim 7, wherein the executable instructions that when executed by the at least one processor further cause the data processing apparatus to obtain at least one of the target value or the adjustment value when a first condition is met, wherein the first condition comprises one or more of a signal noise ratio is less than a first value, a bit error ratio is greater than a second value, or a packet error ratio is greater than a third value.

12. The data processing apparatus of claim 7, wherein the executable instructions that when executed by the at least one processor further cause the data processing apparatus to receive, from a second chip or a first chip, at least one of the target value or the adjustment value.

13. A computer program product comprising computer-executable instructions stored on a non-transitory computer-readable storage medium and that, when executed by at least one processor, cause a data processing apparatus to:

obtain at least one of a target value of a data transmission rate or an adjustment value of the data transmission rate;

perform one or more of:

determining a data adjustment manner of data from a sensor based on at least one of the target value or the adjustment value, wherein the data adjustment manner comprises adjusting a frame rate in a frame or adjusting a quantity of rows in the frame; and configuring a parameter of the sensor based on at least one of the target value or the adjustment value.

14. The computer program product of claim 13, wherein the computer-executable instructions that when executed by the at least one processor further cause the data processing apparatus to indicate the data adjustment manner to a second processor.

15. The computer program product of claim 13, wherein the computer-executable instructions that when executed by the at least one processor further cause the data processing apparatus to store the data adjustment manner in a register.

16. The computer program product of claim 13, wherein the computer-executable instructions that when executed by the at least one processor further cause the data processing apparatus to receive at least one of the target value or the adjustment value from a second processor.

17. The computer program product of claim 13, wherein the parameter of the sensor comprises one or more of the frame rate, a resolution, or a pixel quantization depth.

18. The computer program product of claim 13, wherein the computer-executable instructions that when executed by the at least one processor further cause the data processing apparatus to obtain at least one of the target value or the adjustment value when a first condition is met, wherein the first condition comprises one or more of a signal-to-noise ratio is less than a first value, a bit error rate is greater than a second value, or a packet error rate is greater than a third value.

19. The computer program product of claim 13, wherein the computer-executable instructions that when executed by the at least one processor further cause the data processing apparatus to determine the target value or the adjustment value.

20. The computer program product of claim 13, wherein the computer-executable instructions that when executed by the at least one processor further cause the data processing apparatus to store the data adjustment manner in a second memory.

\* \* \* \* \*